(12) United States Patent
LePoudre et al.

(10) Patent No.: US 11,732,972 B2
(45) Date of Patent: Aug. 22, 2023

(54) LIQUID PANEL ASSEMBLY

(71) Applicant: Nortek Air Solutions Canada, Inc., Saskatoon (CA)

(72) Inventors: Philip Paul LePoudre, Saskatoon (CA); Kenneth Paul Coutu, Saskatoon (CA); Howard Brian Hemingson, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 120 days.

(21) Appl. No.: 17/231,634

(22) Filed: Apr. 15, 2021

(65) Prior Publication Data

US 2021/0231384 A1 Jul. 29, 2021

Related U.S. Application Data

(63) Continuation of application No. 15/590,685, filed on May 9, 2017, now Pat. No. 11,035,618, which is a
(Continued)

(51) Int. Cl.
*F24F 3/147* (2006.01)
*F28D 15/00* (2006.01)
(Continued)

(52) U.S. Cl.
CPC .............. *F28D 15/00* (2013.01); *F24F 3/147* (2013.01); *F24F 3/1417* (2013.01);
(Continued)

(58) Field of Classification Search
CPC ...... F28D 15/00; F28D 1/0333; F28D 9/0031; F28D 9/0043; F28D 9/0062;
(Continued)

(56) References Cited

U.S. PATENT DOCUMENTS

| 1,015,831 | A | 1/1912 | Pielock et al. |
| 2,186,844 | A | 1/1940 | Smith |

(Continued)

FOREIGN PATENT DOCUMENTS

| AU | 2011286700 A1 | 12/2012 |
| AU | 2011268661 A1 | 1/2013 |

(Continued)

OTHER PUBLICATIONS

US 10,739,032 B2, 08/2020, LePoudre et al. (withdrawn)
(Continued)

*Primary Examiner* — Travis Ruby
(74) *Attorney, Agent, or Firm* — Schwegman Lundberg & Woessner, P.A.

(57) ABSTRACT

A liquid panel assembly configured to be used with an energy exchanger may include a support frame having one or more fluid circuits and at least one membrane secured to the support frame. Each of the fluid circuits may include an inlet channel connected to an outlet channel through one or more flow passages. A liquid is configured to flow through the fluid circuits and contact interior surfaces of the membrane(s). The fluid circuits are configured to at least partially offset liquid hydrostatic pressure with friction loss of the liquid flowing within the fluid circuits to minimize, eliminate, or otherwise reduce pressure within the liquid panel assembly.

15 Claims, 11 Drawing Sheets

Related U.S. Application Data continuation of application No. 13/797,152, filed on Mar. 12, 2013, now Pat. No. 9,816,760.

(60) Provisional application No. 61/774,192, filed on Mar. 7, 2013, provisional application No. 61/692,798, filed on Aug. 24, 2012.

(51) Int. Cl.

| | |
|---|---|
| *F28F 9/02* | (2006.01) |
| *F28F 9/26* | (2006.01) |
| *F28D 9/00* | (2006.01) |
| *F28D 21/00* | (2006.01) |
| *F24F 12/00* | (2006.01) |
| *F24F 3/14* | (2006.01) |
| *F28F 3/10* | (2006.01) |
| *F28F 27/02* | (2006.01) |
| *F28F 3/08* | (2006.01) |

(52) U.S. Cl.
CPC .......... *F24F 12/002* (2013.01); *F28D 9/0043* (2013.01); *F28D 21/0015* (2013.01); *F28F 3/10* (2013.01); *F28F 9/026* (2013.01); *F28F 9/26* (2013.01); *F28F 27/02* (2013.01); *F24F 2003/1435* (2013.01); *F28F 3/08* (2013.01); *Y02B 30/56* (2013.01)

(58) Field of Classification Search
CPC .. F28D 9/0068; F28D 21/0015; F24F 3/1411; F24F 3/1417; F24F 3/147; F24F 12/002; F24F 2003/1435; F28F 9/026; F28F 9/26; F28F 3/04; F28F 3/046; F28F 3/048; F28F 3/08; Y02B 30/563
See application file for complete search history.

(56) References Cited

U.S. PATENT DOCUMENTS

| | | |
|---|---|---|
| 2,290,465 A | 7/1942 | Crawford et al. |
| 2,562,811 A | 7/1951 | Muffly |
| 2,946,201 A | 7/1960 | Munters |
| 2,968,165 A | 1/1961 | Gunnar |
| 3,009,684 A | 11/1961 | Georg |
| 3,018,231 A | 1/1962 | Valentine et al. |
| 3,144,901 A | 8/1964 | Meek |
| 3,247,679 A | 4/1966 | Gershon |
| 3,291,206 A | 12/1966 | Peter |
| 3,401,530 A | 9/1968 | Gershon |
| 3,467,072 A | 9/1969 | Toesca |
| 3,735,559 A | 5/1973 | Salemme |
| 4,011,731 A | 3/1977 | Meckler |
| 4,113,004 A | 9/1978 | Rush et al. |
| 4,171,620 A | 10/1979 | Turner |
| 4,180,985 A | 1/1980 | Northrup, Jr. |
| 4,233,796 A | 11/1980 | Mazzoni et al. |
| 4,235,081 A | 11/1980 | Dowling |
| 4,257,169 A | 3/1981 | Pierce |
| 4,259,849 A | 4/1981 | Griffiths |
| 4,373,347 A | 2/1983 | Howell et al. |
| 4,380,910 A | 4/1983 | Hood et al. |
| 4,430,864 A | 2/1984 | Mathiprakasam |
| 4,434,845 A | 3/1984 | Steeb |
| 4,474,021 A | 10/1984 | Harband |
| 4,538,426 A | 9/1985 | Bock |
| 4,594,860 A | 6/1986 | Coellner et al. |
| 4,691,530 A | 9/1987 | Meckler |
| 4,700,550 A | 10/1987 | Rhodes |
| 4,719,761 A | 1/1988 | Cromer |
| 4,723,417 A | 2/1988 | Meckler |
| 4,729,428 A | 3/1988 | Yasutake et al. |
| 4,729,774 A | 3/1988 | Cohen et al. |
| 4,841,733 A | 6/1989 | Dussault et al. |
| 4,887,438 A | 12/1989 | Meckler |
| 4,900,448 A | 2/1990 | Bonne et al. |
| 4,905,479 A | 3/1990 | Wilkinson |
| 4,909,810 A | 3/1990 | Nakao et al. |
| 4,930,322 A | 6/1990 | Ashley et al. |
| 4,936,107 A | 6/1990 | Kitagaki et al. |
| 4,939,906 A | 7/1990 | Spatz et al. |
| 4,941,324 A | 7/1990 | Peterson et al. |
| 4,982,575 A | 1/1991 | Besik |
| 5,003,961 A | 4/1991 | Besik |
| 5,020,334 A | 6/1991 | Wilkinson |
| 5,020,335 A | 6/1991 | Albers et al. |
| 5,022,241 A | 6/1991 | Wilkinson |
| 5,120,445 A | 6/1992 | Colman |
| 5,131,238 A | 7/1992 | Meckler |
| 5,148,374 A | 9/1992 | Coellner |
| 5,170,633 A | 12/1992 | Kaplan |
| 5,176,005 A | 1/1993 | Kaplan |
| 5,181,387 A | 1/1993 | Meckler |
| 5,191,771 A | 3/1993 | Meckler |
| 5,203,161 A | 4/1993 | Lehto |
| 5,206,002 A | 4/1993 | Skelley et al. |
| 5,297,398 A | 3/1994 | Meckler |
| 5,311,929 A | 5/1994 | Verret |
| 5,325,676 A | 7/1994 | Meckler |
| 5,337,574 A | 8/1994 | Dick |
| 5,351,497 A | 10/1994 | Lowenstein |
| 5,353,606 A | 10/1994 | Yoho et al. |
| 5,373,704 A | 12/1994 | Mcfadden |
| 5,387,376 A | 2/1995 | Gasser |
| 5,448,895 A | 9/1995 | Coellner et al. |
| 5,460,004 A | 10/1995 | Tsimerman |
| 5,471,852 A | 12/1995 | Meckler |
| 5,482,625 A | 1/1996 | Shimizu et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,542,968 A | 8/1996 | Belding et al. |
| 5,551,245 A | 9/1996 | Calton et al. |
| 5,564,281 A | 10/1996 | Calton et al. |
| 5,579,647 A | 12/1996 | Calton et al. |
| 5,580,369 A | 12/1996 | Belding et al. |
| 5,632,954 A | 5/1997 | Coellner et al. |
| 5,638,900 A | 6/1997 | Lowenstein et al. |
| 5,649,428 A | 7/1997 | Calton et al. |
| 5,650,221 A | 7/1997 | Belding et al. |
| 5,653,115 A | 8/1997 | Brickley et al. |
| 5,660,048 A | 8/1997 | Belding et al. |
| 5,661,983 A | 9/1997 | Groten et al. |
| 5,685,897 A | 11/1997 | Belding et al. |
| 5,701,762 A | 12/1997 | Akamatsu et al. |
| 5,718,286 A | 2/1998 | Damsohn et al. |
| 5,727,394 A | 3/1998 | Belding et al. |
| 5,732,562 A | 3/1998 | Moratalla |
| 5,749,230 A | 5/1998 | Coellner et al. |
| 5,758,508 A | 6/1998 | Belding et al. |
| 5,758,511 A | 6/1998 | Yoho et al. |
| 5,761,915 A | 6/1998 | Rao |
| 5,761,923 A | 6/1998 | Maeda |
| 5,791,153 A | 8/1998 | Belding et al. |
| 5,791,157 A | 8/1998 | Maeda |
| 5,816,065 A | 10/1998 | Maeda |
| 5,825,641 A | 10/1998 | Mangtani |
| 5,826,434 A | 10/1998 | Belding et al. |
| 5,826,641 A | 10/1998 | Bierwirth et al. |
| 5,832,736 A | 11/1998 | Yoshioka et al. |
| 5,860,284 A | 1/1999 | Goland et al. |
| 5,890,372 A | 4/1999 | Belding et al. |
| 5,911,273 A | 6/1999 | Brenner et al. |
| 5,931,016 A | 8/1999 | Yoho |
| 5,943,874 A | 8/1999 | Maeda |
| 5,946,931 A | 9/1999 | Lomax et al. |
| 5,950,447 A | 9/1999 | Maeda et al. |
| 5,992,160 A | 11/1999 | Bussjager et al. |
| 6,003,327 A | 12/1999 | Belding et al. |
| 6,018,953 A | 2/2000 | Belding et al. |
| 6,018,954 A | 2/2000 | Assaf |
| 6,029,462 A | 2/2000 | Denniston |
| 6,029,467 A | 2/2000 | Moratalla |

(56) References Cited

U.S. PATENT DOCUMENTS

| | | |
|---|---|---|
| 6,050,100 A | 4/2000 | Belding et al. |
| 6,079,481 A | 6/2000 | Lowenstein et al. |
| 6,094,835 A | 8/2000 | Cromer |
| 6,138,470 A | 10/2000 | Potnis et al. |
| 6,141,979 A | 11/2000 | Dunlap |
| 6,145,588 A | 11/2000 | Martin et al. |
| 6,156,102 A | 12/2000 | Conrad et al. |
| 6,176,101 B1 | 1/2001 | Lowenstein |
| 6,176,305 B1 | 1/2001 | Haglid |
| 6,178,762 B1 | 1/2001 | Flax |
| 6,199,388 B1 | 3/2001 | Fischer |
| 6,199,392 B1 | 3/2001 | Maeda |
| 6,237,354 B1 | 5/2001 | Cromer |
| 6,269,650 B1 | 8/2001 | Shaw |
| 6,318,106 B1 | 11/2001 | Maeda |
| RE37,464 E | 12/2001 | Meckler |
| 6,363,218 B1 | 3/2002 | Lowenstein et al. |
| 6,412,295 B2 | 7/2002 | Weiss et al. |
| 6,442,951 B1 | 9/2002 | Maeda et al. |
| 6,494,053 B1 | 12/2002 | Forkosh |
| 6,497,107 B2 | 12/2002 | Maisotsenko et al. |
| 6,532,763 B1 | 3/2003 | Gupte |
| 6,546,746 B2 | 4/2003 | Forkosh et al. |
| 6,568,466 B2 | 5/2003 | Lowenstein et al. |
| 6,575,228 B1 | 6/2003 | Ragland et al. |
| 6,598,862 B2 | 7/2003 | Merrill et al. |
| 6,635,104 B2 | 10/2003 | Komkova et al. |
| 6,644,059 B2 | 11/2003 | Maeda et al. |
| 6,684,649 B1 | 2/2004 | Thompson |
| 6,709,492 B1 | 3/2004 | Spadaccini et al. |
| 6,720,990 B1 | 4/2004 | Walker et al. |
| 6,739,142 B2 | 5/2004 | Korin |
| 6,745,826 B2 | 6/2004 | Lowenstein et al. |
| 6,751,964 B2 | 6/2004 | Fischer |
| 6,800,118 B2 | 10/2004 | Kusunose et al. |
| 6,841,601 B2 | 1/2005 | Serpico et al. |
| 6,848,265 B2 | 2/2005 | Lowenstein et al. |
| 6,854,278 B2 | 2/2005 | Maisotsenko et al. |
| 6,864,005 B2 | 3/2005 | Mossman |
| 6,935,416 B1 | 8/2005 | Tsunoda et al. |
| 6,973,795 B1 | 12/2005 | Moffitt |
| 6,976,365 B2 | 12/2005 | Forkosh et al. |
| 6,978,633 B2 | 12/2005 | Yamazaki |
| 7,000,427 B2 | 2/2006 | Mathias et al. |
| 7,017,356 B2 | 3/2006 | Moffitt |
| 7,092,006 B2 | 8/2006 | Walker et al. |
| 7,093,452 B2 | 8/2006 | Chee et al. |
| 7,093,649 B2 | 8/2006 | Dawson |
| RE39,288 E | 9/2006 | Assaf |
| 7,178,355 B2 | 2/2007 | Moffitt |
| 7,181,918 B2 | 2/2007 | Reinders et al. |
| 7,231,967 B2 | 6/2007 | Haglid |
| 7,269,966 B2 | 9/2007 | Lowenstein et al. |
| 7,306,650 B2 | 12/2007 | Slayzak et al. |
| 7,331,376 B2 | 2/2008 | Gagnon et al. |
| 7,340,906 B2 | 3/2008 | Moffitt |
| 7,389,646 B2 | 6/2008 | Moffitt |
| 7,389,652 B1 | 6/2008 | Fair |
| 7,593,033 B2 | 9/2009 | Walker et al. |
| 7,602,414 B2 | 10/2009 | Walker et al. |
| 7,605,840 B2 | 10/2009 | Walker et al. |
| 7,717,404 B2 | 5/2010 | Hasegawa et al. |
| 7,719,565 B2 | 5/2010 | Walker et al. |
| 7,737,224 B2 | 6/2010 | Willis et al. |
| 7,753,991 B2 | 7/2010 | Kertzman |
| 7,781,034 B2 | 8/2010 | Yializis et al. |
| 7,817,182 B2 | 10/2010 | Walker et al. |
| D638,925 S | 5/2011 | Charlebois et al. |
| 7,942,387 B2 | 5/2011 | Forkosh |
| 7,966,841 B2 | 6/2011 | Lowenstein et al. |
| 8,002,023 B2 | 8/2011 | Murayama |
| 8,033,532 B2 | 10/2011 | Yabu |
| 8,137,436 B2 | 3/2012 | Calis et al. |
| 8,157,891 B2 | 4/2012 | Montie et al. |
| 8,318,824 B2 | 11/2012 | Matsuoka et al. |
| 8,469,782 B1 | 6/2013 | Roy |
| 8,470,071 B2 | 6/2013 | Ehrenberg et al. |
| 8,511,074 B2 | 8/2013 | Kuehnel et al. |
| 8,550,151 B2 | 10/2013 | Murayama et al. |
| 8,685,142 B2 | 4/2014 | Claridge et al. |
| 8,769,971 B2 | 7/2014 | Kozubal et al. |
| 8,783,053 B2 | 7/2014 | McCann |
| 8,887,523 B2 | 11/2014 | Gommed et al. |
| 8,899,061 B2 | 12/2014 | Reytblat |
| 8,915,092 B2 | 12/2014 | Gerber et al. |
| 8,920,699 B2 | 12/2014 | Marutani et al. |
| 8,943,848 B2 | 2/2015 | Phannavong et al. |
| 8,966,924 B2 | 3/2015 | Pichai |
| 9,021,821 B2 | 5/2015 | Dunnavant |
| 9,027,764 B2 | 5/2015 | Murutani et al. |
| 9,109,808 B2 | 8/2015 | Gerber et al. |
| 9,140,460 B2 | 9/2015 | Woods et al. |
| 9,188,349 B2 | 11/2015 | Warmerdam et al. |
| 9,234,665 B2 | 1/2016 | Erb et al. |
| 9,243,810 B2 | 1/2016 | Vandermeulen et al. |
| 9,273,877 B2 | 3/2016 | Vandermeulen |
| 9,429,332 B2 | 8/2016 | Vandermeulen et al. |
| 9,429,366 B2 | 8/2016 | Dubois |
| 9,664,452 B2 | 5/2017 | Takada et al. |
| 9,810,439 B2 | 11/2017 | Coutu et al. |
| 9,816,760 B2 | 11/2017 | LePoudre et al. |
| 9,909,768 B2 | 3/2018 | Gerber et al. |
| 10,197,310 B2 | 2/2019 | Ghadiri Moghaddam et al. |
| 10,302,317 B2 | 5/2019 | Besant et al. |
| 10,352,628 B2 | 7/2019 | Erb et al. |
| 10,480,801 B2 | 11/2019 | Gerber et al. |
| 10,584,884 B2 | 3/2020 | Coutu et al. |
| 10,712,024 B2 | 7/2020 | LePoudre et al. |
| 10,782,045 B2 | 9/2020 | LePoudre et al. |
| 10,808,951 B2 | 10/2020 | LePoudre et al. |
| 10,928,082 B2 | 2/2021 | Coutu et al. |
| 10,962,252 B2 | 3/2021 | LePoudre et al. |
| 11,035,618 B2 | 6/2021 | Lepoudre et al. |
| 11,300,364 B2 | 4/2022 | Erb et al. |
| 11,408,681 B2 | 8/2022 | Lepoudre |
| 2001/0003902 A1 | 6/2001 | Kopko |
| 2002/0005271 A1 | 1/2002 | Weiss et al. |
| 2002/0038552 A1 | 4/2002 | Maisotsenko |
| 2002/0074105 A1 | 6/2002 | Hayashi et al. |
| 2002/0158023 A1 | 10/2002 | Wurzburger |
| 2003/0014983 A1 | 1/2003 | Maisotsenko et al. |
| 2003/0037905 A1 | 2/2003 | Weng |
| 2003/0070787 A1 | 4/2003 | Moffitt |
| 2003/0121271 A1 | 7/2003 | Dinnage et al. |
| 2003/0132166 A1 | 7/2003 | Rey |
| 2004/0000152 A1 | 1/2004 | Fischer |
| 2004/0055329 A1 | 3/2004 | Mathias et al. |
| 2004/0061245 A1 | 4/2004 | Maisotsenko et al. |
| 2004/0134211 A1 | 7/2004 | Lee et al. |
| 2004/0134212 A1 | 7/2004 | Lee et al. |
| 2004/0168462 A1 | 9/2004 | Assaf |
| 2004/0226685 A1 | 11/2004 | Gagnon et al. |
| 2005/0056042 A1 | 3/2005 | Bourne et al. |
| 2005/0072303 A1 | 4/2005 | Weidenmann |
| 2005/0230080 A1 | 10/2005 | Paul et al. |
| 2005/0249901 A1 | 11/2005 | Yializis et al. |
| 2005/0262862 A1 | 12/2005 | Moffitt |
| 2005/0279115 A1 | 12/2005 | Lee et al. |
| 2006/0021615 A1 | 2/2006 | Kertzman |
| 2006/0032258 A1 | 2/2006 | Pruitt et al. |
| 2006/0042295 A1 | 3/2006 | Assaf |
| 2006/0118979 A1 | 6/2006 | Beck et al. |
| 2006/0205301 A1 | 9/2006 | Klare et al. |
| 2007/0029685 A1 | 2/2007 | Lin |
| 2007/0056894 A1 | 3/2007 | Connors |
| 2007/0068663 A1 | 3/2007 | Thomer et al. |
| 2007/0095519 A1 | 5/2007 | Hombucher |
| 2007/0234743 A1 | 10/2007 | Assaf |
| 2007/0279861 A1 | 12/2007 | Doll et al. |
| 2008/0023182 A1 | 1/2008 | Beamer et al. |
| 2008/0066888 A1 | 3/2008 | Tong et al. |
| 2008/0085437 A1 | 4/2008 | Dean et al. |
| 2008/0099184 A1 | 5/2008 | Han |
| 2008/0283217 A1 | 11/2008 | Gagnon et al. |

(56) References Cited

U.S. PATENT DOCUMENTS

| | | |
|---|---|---|
| 2009/0071638 A1 | 3/2009 | Sugiyama et al. |
| 2009/0095162 A1 | 4/2009 | Hargis et al. |
| 2009/0126913 A1 | 5/2009 | Lee et al. |
| 2009/0133866 A1 | 5/2009 | Campbell et al. |
| 2009/0193974 A1 | 8/2009 | Montie et al. |
| 2009/0211977 A1 | 8/2009 | Miller |
| 2009/0294110 A1 | 12/2009 | Foust |
| 2009/0324929 A1 | 12/2009 | Yamakawa et al. |
| 2010/0090356 A1 | 4/2010 | Sines et al. |
| 2010/0170655 A1 | 7/2010 | Kronvall et al. |
| 2010/0170776 A1 | 7/2010 | Ehrenberg et al. |
| 2010/0181062 A1 | 7/2010 | Mccann |
| 2010/0192605 A1 | 8/2010 | Fang et al. |
| 2010/0200068 A1 | 8/2010 | D'arcy et al. |
| 2010/0275629 A1 | 11/2010 | Erickson |
| 2010/0300123 A1 | 12/2010 | Park et al. |
| 2010/0319370 A1 | 12/2010 | Kozubal et al. |
| 2010/0326914 A1 | 12/2010 | Drost et al. |
| 2011/0056384 A1 | 3/2011 | Kadota |
| 2011/0101549 A1 | 5/2011 | Miyauchi et al. |
| 2011/0192579 A1 | 8/2011 | Sotokawa et al. |
| 2011/0223486 A1 | 9/2011 | Zhang et al. |
| 2011/0232485 A1 | 9/2011 | Ellsworth |
| 2011/0232633 A1 | 9/2011 | Lima |
| 2011/0259572 A1 | 10/2011 | Muratani et al. |
| 2011/0283720 A1 | 11/2011 | Martin |
| 2011/0308265 A1 | 12/2011 | Phannavong et al. |
| 2012/0000227 A1 | 1/2012 | Matsuura et al. |
| 2012/0016700 A1 | 1/2012 | Jabbour et al. |
| 2012/0023988 A1 | 2/2012 | Togano et al. |
| 2012/0031133 A1 | 2/2012 | Kuwabara et al. |
| 2012/0061045 A1 | 3/2012 | Huizing |
| 2012/0073791 A1 | 3/2012 | Dubois |
| 2012/0085112 A1 | 4/2012 | Wintemute |
| 2012/0106073 A1 | 5/2012 | Wu et al. |
| 2012/0125020 A1 | 5/2012 | Vandermeulen et al. |
| 2012/0125021 A1 | 5/2012 | Vandermeulen et al. |
| 2012/0125023 A1 | 5/2012 | Kopko et al. |
| 2012/0125031 A1 | 5/2012 | Vandermeulen et al. |
| 2012/0125405 A1 | 5/2012 | Vandermeulen et al. |
| 2012/0125581 A1 | 5/2012 | Allen et al. |
| 2012/0131934 A1 | 5/2012 | Vandermeulen et al. |
| 2012/0131937 A1 | 5/2012 | Vandermeulen et al. |
| 2012/0131938 A1 | 5/2012 | Vandermeulen et al. |
| 2012/0131939 A1 | 5/2012 | Vandermeulen et al. |
| 2012/0131940 A1 | 5/2012 | Vandermeulen et al. |
| 2012/0132513 A1 | 5/2012 | Vandermeulen et al. |
| 2012/0162918 A1 | 6/2012 | Thyni et al. |
| 2012/0167600 A1 | 7/2012 | Dunnavant |
| 2012/0168369 A1 | 7/2012 | Van Medevoort et al. |
| 2012/0180505 A1 | 7/2012 | Gerber et al. |
| 2012/0186281 A1 | 7/2012 | Vandermeulen et al. |
| 2012/0247132 A1 | 10/2012 | Lakdawala et al. |
| 2012/0298340 A1 | 11/2012 | Al-Otaibi |
| 2013/0056177 A1 | 3/2013 | Coutu et al. |
| 2013/0075066 A1 | 3/2013 | Reytblat |
| 2013/0186121 A1 | 7/2013 | Erb et al. |
| 2013/0199220 A1 | 8/2013 | Ma et al. |
| 2013/0240438 A1 | 9/2013 | Willis et al. |
| 2013/0248147 A1 | 9/2013 | Wintemute et al. |
| 2013/0283837 A1 | 10/2013 | Takahashi et al. |
| 2013/0340449 A1 | 12/2013 | Kozubal et al. |
| 2014/0054004 A1 | 2/2014 | LePoudre et al. |
| 2014/0054013 A1 | 2/2014 | Lepoudre et al. |
| 2014/0069134 A1 | 3/2014 | Grabon |
| 2014/0083648 A1 | 3/2014 | Wawryk |
| 2014/0190037 A1 | 7/2014 | Erb et al. |
| 2014/0190198 A1 | 7/2014 | Slessman et al. |
| 2014/0242900 A1 | 8/2014 | Takada et al. |
| 2014/0138851 A1 | 9/2014 | LePoudre |
| 2014/0245769 A1 | 9/2014 | Vandermeulen et al. |
| 2014/0250935 A1 | 9/2014 | Prochaska et al. |
| 2014/0260367 A1 | 9/2014 | Coutu et al. |
| 2014/0260369 A1 | 9/2014 | Lepoudre et al. |
| 2014/0260373 A1 | 9/2014 | Gerber et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0326433 A1 | 11/2014 | Kozubal |
| 2014/0340842 A1 | 11/2014 | Towner et al. |
| 2015/0096714 A1 | 4/2015 | Dagley |
| 2015/0184876 A1 | 7/2015 | Vandermeulen et al. |
| 2015/0253018 A1 | 9/2015 | Eguchi et al. |
| 2015/0292754 A1 | 10/2015 | Mongar |
| 2015/0323203 A1 | 11/2015 | Gerber et al. |
| 2016/0054012 A1 | 2/2016 | Lepoudre et al. |
| 2016/0084512 A1 | 3/2016 | Erb et al. |
| 2016/0018701 A1 | 6/2016 | Vandermeulen |
| 2016/0209087 A1 | 7/2016 | Reytblat et al. |
| 2016/0290666 A1 | 10/2016 | Coutu et al. |
| 2016/0298865 A1 | 10/2016 | Gerber et al. |
| 2016/0327345 A1 | 11/2016 | Lowenstein |
| 2017/0241655 A1 | 8/2017 | Lepoudre et al. |
| 2018/0073753 A1 | 3/2018 | Lepoudre et al. |
| 2018/0012851 A1 | 5/2018 | Lepoudre et al. |
| 2018/0135880 A1 | 5/2018 | Ghadiri Moghaddam et al. |
| 2018/0187918 A1 | 7/2018 | Lepoudre et al. |
| 2019/0113247 A1 | 4/2019 | Lepoudre et al. |
| 2019/0212020 A1 | 7/2019 | Besant et al. |
| 2019/0346212 A1 | 11/2019 | Norman Erb et al. |
| 2020/0173672 A1 | 6/2020 | Coutu et al. |
| 2021/0332993 A1 | 10/2021 | Coutu et al. |
| 2022/0003436 A1 | 1/2022 | Besant et al. |
| 2022/0333868 A1 | 10/2022 | Lepoudre |
| 2022/0333869 A1 | 10/2022 | Lepoudre |

FOREIGN PATENT DOCUMENTS

| | | |
|---|---|---|
| AU | 2014231672 B2 | 3/2018 |
| AU | 2015230799 B2 | 3/2018 |
| AU | 2013305427 B2 | 4/2018 |
| AU | 2014231681 B2 | 6/2018 |
| AU | 2013305428 B2 | 9/2018 |
| AU | 2014231668 B2 | 2/2019 |
| AU | 2014231667 B2 | 6/2019 |
| AU | 2017204552 B2 | 7/2019 |
| AU | 2018236791 B2 | 10/2020 |
| AU | 2018204774 B2 | 11/2020 |
| CA | 2283089 A1 | 11/2000 |
| CA | 2801352 A1 | 12/2011 |
| CA | 2798928 A1 | 2/2012 |
| CA | 2843763 A1 | 3/2013 |
| CA | 2904224 A1 | 9/2014 |
| CA | 2901483 C | 4/2019 |
| CA | 2880353 C | 9/2020 |
| CA | 3034592 C | 2/2021 |
| CA | 2904224 | 4/2022 |
| CA | 2901484 | 7/2022 |
| CH | 193732 A | 10/1937 |
| CN | 1163389 A | 10/1997 |
| CN | 1343292 A | 4/2002 |
| CN | 1456855 A | 11/2003 |
| CN | 151761 | 8/2004 |
| CN | 1518477 A | 8/2004 |
| CN | 1666081 A | 9/2005 |
| CN | 1711448 A | 12/2005 |
| CN | 2821506 Y | 9/2006 |
| CN | 200958820 Y | 10/2007 |
| CN | 101368754 A | 2/2009 |
| CN | 201203217 Y | 3/2009 |
| CN | 101405559 A | 4/2009 |
| CN | 101421580 A | 4/2009 |
| CN | 101469090 A | 7/2009 |
| CN | 101776406 A | 7/2010 |
| CN | 101900385 A | 12/2010 |
| CN | 101918777 A | 12/2010 |
| CN | 102076401 A | 5/2011 |
| CN | 201906567 U | 7/2011 |
| CN | 102149979 A | 8/2011 |
| CN | 102165268 A | 8/2011 |
| CN | 102232015 A | 11/2011 |
| CN | 102345909 A | 2/2012 |
| CN | 102395419 A | 3/2012 |
| CN | 202202899 U | 4/2012 |

(56) References Cited

FOREIGN PATENT DOCUMENTS

| | | |
|---|---|---|
| CN | 102548727 A | 7/2012 |
| CN | 102549361 A | 7/2012 |
| CN | 102713154 A | 10/2012 |
| CN | 102933931 A | 2/2013 |
| CN | 102939397 A | 2/2013 |
| CN | 103068246 A | 4/2013 |
| CN | 103069246 A | 4/2013 |
| CN | 103245018 A | 8/2013 |
| CN | 203116208 U | 8/2013 |
| CN | 103827595 A | 5/2014 |
| CN | 104048434 A | 9/2014 |
| CN | 203893703 U | 10/2014 |
| CN | 104136855 A | 11/2014 |
| CN | 104583706 A | 4/2015 |
| CN | 103261801 B | 11/2015 |
| CN | 105121989 A | 12/2015 |
| CN | 105164474 A | 12/2015 |
| CN | 105164484 A | 12/2015 |
| CN | 105202795 A | 12/2015 |
| CN | 105283715 A | 1/2016 |
| CN | 101512238 A | 8/2016 |
| CN | 103827595 B | 4/2017 |
| CN | 105164484 B | 6/2017 |
| CN | 105121989 B | 9/2017 |
| CN | 107249715 A | 10/2017 |
| CN | 107300230 A | 10/2017 |
| CN | 107560482 A | 1/2018 |
| CN | 107850335 A | 3/2018 |
| CN | 107923647 A | 4/2018 |
| CN | 108027221 A | 5/2018 |
| CN | 109028519 A | 12/2018 |
| CN | 109073265 A | 12/2018 |
| CN | 110345803 A | 10/2019 |
| CN | 107300230 B | 11/2019 |
| CN | 107560482 B | 2/2020 |
| CN | 107249715 B | 11/2020 |
| CN | 107850335 B | 2/2021 |
| CN | 108027221 B | 3/2021 |
| CN | 109073265 | 9/2021 |
| CN | 107923647 | 12/2021 |
| DE | 10143092 A1 | 3/2003 |
| EP | 0448991 A2 | 10/1991 |
| EP | 0661502 A2 | 7/1995 |
| EP | 0678321 A2 | 10/1995 |
| EP | 1108575 A1 | 6/2001 |
| EP | 1347260 A1 | 9/2003 |
| EP | 2351639 A1 | 8/2011 |
| EP | 2397787 A2 | 12/2011 |
| EP | 2751493 B1 | 3/2018 |
| EP | 3314188 A1 | 5/2018 |
| EP | 2893283 B1 | 12/2018 |
| EP | 2972039 B1 | 12/2018 |
| EP | 2971993 B1 | 8/2019 |
| EP | 2971992 B1 | 1/2020 |
| EP | 3421921 B1 | 3/2020 |
| EP | 3183051 B1 | 4/2020 |
| EP | 3486577 B1 | 4/2020 |
| EP | 2972046 B1 | 6/2020 |
| EP | 3499168 B1 | 2/2021 |
| EP | 3314188 B1 | 5/2021 |
| EP | 3295089 | 10/2021 |
| EP | 3295088 | 1/2022 |
| FR | 2291457 A1 | 6/1976 |
| GB | 1354502 A | 6/1974 |
| GB | 2015384 A | 9/1979 |
| HK | 40009311 A1 | 6/2020 |
| HK | 4009311 B | 4/2021 |
| IN | 201717044889 A | 3/2018 |
| IN | 201717044890 A | 3/2018 |
| IN | 201817002765 A | 4/2018 |
| IN | 201817037404 A | 12/2018 |
| JP | 6152594 A | 3/1986 |
| JP | 05157282 A | 6/1993 |
| JP | H09113167 A | 5/1997 |
| JP | 09196482 A | 7/1997 |
| JP | 10170177 A | 6/1998 |
| JP | 2004116419 A | 4/2004 |
| JP | 2004257588 A | 9/2004 |
| JP | 2008070046 A | 3/2008 |
| JP | 2009275955 A | 11/2009 |
| JP | 4870843 B1 | 11/2011 |
| KR | 100607204 B1 | 8/2006 |
| KR | 20110092773 A | 8/2011 |
| SG | 10201809840 | 12/2018 |
| SG | 11201807692 | 2/2020 |
| SG | 10201913923 | 3/2020 |
| TW | I271499 B | 1/2007 |
| WO | WO-9641107 A1 | 12/1996 |
| WO | WO-1996041107 A1 | 12/1996 |
| WO | WO-1999014535 A1 | 3/1999 |
| WO | WO-0135039 A1 | 5/2001 |
| WO | WO-0171260 A1 | 9/2001 |
| WO | WO-0201132 A2 | 1/2002 |
| WO | WO-03049835 A1 | 6/2003 |
| WO | WO-2004065875 A1 | 8/2004 |
| WO | WO-2005100243 A1 | 10/2005 |
| WO | WO-2008037079 A1 | 4/2008 |
| WO | WO-2008053367 A2 | 5/2008 |
| WO | WO-2008089484 A1 | 7/2008 |
| WO | WO-2009000974 A1 | 12/2008 |
| WO | WO-2009094032 A1 | 7/2009 |
| WO | WO-2009158030 A1 | 12/2009 |
| WO | WO-2010006968 A1 | 1/2010 |
| WO | WO-2011062808 A1 | 5/2011 |
| WO | WO-2011150081 A2 | 12/2011 |
| WO | WO-2011161547 A2 | 12/2011 |
| WO | WO-2011161547 A3 | 12/2011 |
| WO | WO-2012018089 A1 | 2/2012 |
| WO | WO-2012042553 A1 | 4/2012 |
| WO | WO-2012050860 A1 | 4/2012 |
| WO | WO-2012087273 A1 | 6/2012 |
| WO | WO-2012097445 A1 | 7/2012 |
| WO | WO-2012167366 A1 | 12/2012 |
| WO | WO-2013029148 A1 | 3/2013 |
| WO | WO-2013094206 A1 | 6/2013 |
| WO | WO-2013107554 A1 | 7/2013 |
| WO | WO-2013192397 A1 | 12/2013 |
| WO | WO-2014029003 A1 | 2/2014 |
| WO | WO-2014029004 A1 | 2/2014 |
| WO | WO-2014107790 A1 | 7/2014 |
| WO | WO-2014138846 A1 | 9/2014 |
| WO | WO-2014138847 A1 | 9/2014 |
| WO | WO-2014138851 A1 | 9/2014 |
| WO | WO-2014138859 A1 | 9/2014 |
| WO | WO-2014138860 A1 | 9/2014 |
| WO | WO-2014142277 A1 | 9/2014 |
| WO | WO-2015192249 A1 | 12/2015 |
| WO | WO-2016026042 A1 | 2/2016 |
| WO | WO-2016183667 A1 | 11/2016 |
| WO | WO-2016183668 A1 | 11/2016 |
| WO | WO-2016207864 A1 | 12/2016 |
| WO | WO-2017152268 A1 | 9/2017 |

OTHER PUBLICATIONS

"U.S. Appl. No. 14/187,413, Appeal Decision mailed Mar. 10, 2022", 11 pgs.

"European Application Serial No. 21154403.6, Response filed Dec. 9, 2021 to Extended European Search Report dated Apr. 26, 2021", 15 pgs.

"U.S. Appl. No. 16/784,822, Non Final Office Action dated Mar. 14, 2022", 9 pgs.

"U.S. Appl. No. 17/345,852 Supplemental Preliminary Amendment", 6 pgs.

"U.S. Appl. No. 16/431,397, Notice of Allowance dated Dec. 10, 2021", 11 pgs.

"U.S. Appl. No. 16/431,397, Supplemental Notice of Allowability dated Dec. 24, 2021", 2 pgs.

"U.S. Appl. No. 16/784,822, Restriction Requirement dated Dec. 27, 2021", 6 pgs.

"Canadian Application Serial No. 2,901,484, Response filed Aug. 26, 2021 to Office Action dated Apr. 27, 2021", 9 pgs.

(56) References Cited

OTHER PUBLICATIONS

"European Application Serial No. 17762365.9, Communication Pursuant to Article 94(3) EPC dated Dec. 9, 2021", 6 pgs.
"Indian Application Serial No. 201817037404, Response filed Aug. 16, 2021 to First Examination Report dated Feb. 19, 2021", 24 pgs.
"Australian Application Serial No. 2017228937, First Examination Report dated Jan. 6, 2022", 3 pgs.
"European Application Serial No. 11797695.1, Communication Pursuant to Article 94(3) EPC dated Jan. 12, 2022", 7 pgs.
"Canadian Application Serial No. 2,958,480, Response filed Jan. 17, 2022 to Office Action dated Sep. 16, 2021", 12 pgs.
"U.S. Appl. No. 14/190,715, Response filed Jul. 20, 2018 to Final Office Action dated Feb. 20, 2018", 14 pgs.
"U.S. Appl. No. 13/797,062 , Appeal Decision mailed Jun. 18, 2021", 12 pgs.
"U.S. Appl. No. 13/797,062, Final Office Action dated Jul. 13, 2018", 22 pgs.
"U.S. Appl. No. 14/171,951, Notice of Allowability dated Jul. 18, 2018", 2 pgs.
"U.S. Appl. No. 14/171,951, Notice of Allowance dated May 23, 2018", 5 pgs.
"U.S. Appl. No. 14/187,413, Examiner's Answer dated Jun. 11, 2021", 10 pgs.
"U.S. Appl. No. 15/185,180, Restriction Requirement dated Jun. 21, 2018", 10 pgs.
"U.S. Appl. No. 15/574,201, Non Final Office Action dated Jan. 15, 2020", 8 pgs.
"U.S. Appl. No. 15/574,201, Non Final Office Action dated Jan. 26, 2021", 8 pgs.
"U.S. Appl. No. 15/574,201, Non Final Office Action dated Jan. 29, 2019", 6 pgs.
"U.S. Appl. No. 15/574,201, Notice of Allowance dated May 21, 2020", 5 pgs.
"U.S. Appl. No. 15/574,201, Notice of Allowance dated Aug. 20, 2019", 7 pgs.
"U.S. Appl. No. 15/574,201, Notice of Allowance dated Sep. 10, 2020", 6 pgs.
"U.S. Appl. No. 15/574,201, Response Filed Jan. 7, 2019 to Restriction Requirement dated Sep. 5, 2018", 8 pgs.
"U.S. Appl. No. 15/574,201, Response filed May 15, 2020 to Non Final Office Action dated Jan. 15, 2020", 13 pgs.
"U.S. Appl. No. 15/574,201, Response filed Jul. 29, 2019 to Non-Final Office Action dated Jan. 29, 2019", 12 pgs.
"U.S. Appl. No. 15/574,205, Corrected Notice of Allowability dated Apr. 17, 2020", 2 pgs.
"U.S. Appl. No. 15/574,205, Non Final Office Action dated Jun. 17, 2019", 3 pgs.
"U.S. Appl. No. 15/574,205, Notice of Allowance dated Feb. 13, 2019", 6 pgs.
"U.S. Appl. No. 15/574,205, Notice of Allowance dated Apr. 9, 2020", 5 pgs.
"U.S. Appl. No. 15/574,205, Notice of Allowance dated Dec. 2, 2019", 5 pgs.
"U.S. Appl. No. 15/574,205, Response filed Jan. 11, 2019 to Non-Final Office Action dated Sep. 11, 2018", 12 pgs.
"U.S. Appl. No. 15/574,205, Response filed Nov. 18, 2019 to Non-Final Office Action dated Jun. 17, 2019", 8 pgs.
"U.S. Appl. No. 15/814,153, Non Final Office Action dated Jul. 6, 2020", 12 pgs.
"U.S. Appl. No. 15/814,153, Non Final Office Action dated Oct. 9, 2019", 16 pgs.
"U.S. Appl. No. 15/814,153, Notice of Allowance dated Apr. 8, 2021", 10 pgs.
"U.S. Appl. No. 15/814,153, Response filed Jan. 6, 2021 to Non Final Office Action dated Jul. 6, 2020", 12 pgs.
"U.S. Appl. No. 15/814,153, Response filed Apr. 9, 2020 to Non Final Office Action dated Oct. 9, 2019", 15 pgs.
"U.S. Appl. No. 15/814,153, Response filed Jul. 15, 2019 to Restriction Requirement dated May 15, 2019", 9 pgs.
"U.S. Appl. No. 15/814,153, Restriction Requirement dated May 15, 2019", 6 pgs.
"U.S. Appl. No. 16/083,280, Corrected Notice of Allowability dated Aug. 3, 2020", 2 pgs.
"U.S. Appl. No. 16/083,280, Corrected Notice of Allowability dated Sep. 18, 2020", 2 pgs.
"U.S. Appl. No. 16/083,280, Non Final Office Action dated Jan. 28, 2020", 6 pgs.
"U.S. Appl. No. 16/083,280, Notice of Allowance dated Jun. 12, 2020", 5 pgs.
"U.S. Appl. No. 16/083,280, Response filed May 28, 2020 to Non Final Office Action dated Jan. 28, 2020", 8 pgs.
"U.S. Appl. No. 16/431,397, Response filed Aug. 23, 2021 to Restriction Requirement dated Jun. 23, 2021", 7 pgs.
"U.S. Appl. No. 16/431,397, Restriction Requirement dated Jun. 23, 2021", 6 pgs.
"U.S. Appl. No. 17/168,928, Supplemental Preliminary Amendment filed Aug. 12, 2021", 5 pages.
"U.S. Appl. No. 17/345,852 Preliminary Amendment Filed with Application", 3 pgs.
"Canadian Application Serial No. 2,880,350, Response filed Oct. 28, 2020 to Examiner's Rule 30(2) Requisition dated May 1, 2019", 36 pgs.
"Canadian Application Serial No. 2,880,350, Voluntary Amendment filed Apr. 29, 2021", 7 pgs.
"Canadian Application Serial No. 2,901,484, Office Action dated Apr. 27, 2021", 4 pgs.
"Canadian Application Serial No. 2,901,495, Response filed May 13, 2021 to Office Action dated Jan. 29, 2020", 23 pgs.
"Canadian Application Serial No. 2,904,224, Response filed May 11, 2021 to Office Action dated Jan. 3, 2020", 36 pgs.
"Canadian Application Serial No. 2,958,480, Office Action dated Sep. 16, 2021", 4 pgs.
"Chinese Application Serial No. 201680038135.4, Office Action dated Apr. 8, 2021", with English Machine Translation, 7 pages.
"Chinese Application Serial No. 201780027034.1, Office Action dated Mar. 5, 2021", with English translation, 7 pages.
"Chinese Application Serial No. 201910516006.7, Office Action dated Mar. 1, 2021", with English Summary, 9 pages.
"Chinese Application Serial No. 201910516006.7, Response filed Jan. 18, 2021 to Office Action dated Jul. 2, 2020", with English claims, 21 pages.
"European Application Serial No. 11797695.1, Response filed Mar. 26, 2021 to Communication Pursuant to Article 94(3) EPC dated Nov. 19, 2020", 3 pgs.
"European Application Serial No. 16813836.0, Response filed Aug. 21, 2018 to Communication Pursuant to Rules 161(2) and 162 EPC dated Feb. 13, 2018", 37 pgs.
"European Application Serial No. 18160812.6, Response filed Mar. 2, 2021 to Communication Pursuant to Article 94(3) EPC dated Nov. 19, 2020", 2 pgs.
"European Application Serial No. 20180081.0, Response filed Apr. 20, 2021 to Extended European Search Report dated Sep. 28, 2020", 11 pgs.
"Indian Application Serial No. 201717044889, Response filed Jun. 14, 2021 to First Examination Report dated Dec. 17, 2020", with English translation, 82 pages.
"Indian Application Serial No. 201817037404, First Examination Report dated Feb. 19, 2021", with English translation, 7 pages.
"International Application Serial No. PCT/CA2015/050570, International Search Report dated Sep. 1, 2015", 5 pgs.
"International Application Serial No. PCT/CA2015/050570, Written Opinion dated Sep. 1, 2015", 4 pgs.
"Machine Translation of JP 09113167 A", Espacenet Patent Translate, [Online] Retrieved from the internet: <URL: https://worldwide.espacenet.com/publicationDetails/description?CC=JP&NR=H09113167A&KC=A&FT=D&ND=3&date=19970502&DB=&locale=en_EP>, (retrieved Dec. 24, 2018), 7 pgs.
"Munters PFC Polymer Fluid Cooler", Munters Corp., (Sep. 2015), 2 pgs.
"Oasis PFC Polymer Fluid Cooler Product Information", Munters Corp., (Nov. 2013), 2 pgs.

(56) References Cited

OTHER PUBLICATIONS

"Translation of CN 201906567 U", Espacenet Patent Translate, [Online] Retrieved from the internet: <URL: http://translationportal.epo.org/emtp/translate/?ACTION=description-retrieval&COUNTRY=CN&ENGINE=google&FORMAT=docdb&KIND=U&LOCALE=en_EP&NUMBER=201906567&OPS=ops.epo.org/3.2&SRCLANG=zh&TRGLANG=en>, (Feb. 2, 2018), 4 pgs.
Philip, Lepoudre, et al., "U.S. Appl. No. 15/574,205", Specification, (Nov. 15, 2017), 32 pgs.
Philip, Lepoudre, et al., "U.S. Appl. No. 15/574,205", Drawings, (Nov. 15, 2017), 9 pgs.
Philip, Lepoudre, et al., "U.S. Appl. No. 15/574,205", Claims, (Nov. 15, 2017), 5 pgs.
U.S. Appl. No. 14/830,492 U.S. Pat. No. 10,712,024, filed Aug. 19, 2015, Liquid to Air Membrane Energy Exchangers.
U.S. Appl. No. 16/891,857, filed Jun. 3, 2020, Liquid to Air Membrane Energy Exchangers.
U.S. Appl. No. 16/918,722, filed Jul. 1, 2020, Three-Fluid Liquid to Air Membrane Energy Exchanger.
U.S. Appl. No. 15/739,016 U.S. Pat. No. 10,962,252, filed Dec. 21, 2017, Three-Fluid Liquid to Air Membrane Energy Exchanger.
U.S. Appl. No. 13/449,598 U.S. Pat. No. 9,810,439, filed Apr. 18, 2012, Energy Exchange System for Conditioning Air in an Enclosed Structure.
U.S. Appl. No. 15/185,180 U.S. Pat. No. 10,928,082, filed Jun. 17, 2016, Energy Exchange System for Conditioning Air in an Enclosed Structure.
U.S. Appl. No. 17/168,928, filed Feb. 5, 2021, Energy Exchange System for Conditioning Air in an Enclosed Structure.
U.S. Appl. No. 13/702,596 U.S. Pat. No. 9,234,665, filed Apr. 15, 2013, Liquid-To-Air Membrane Energy Exchanger.
U.S. Appl. No. 14/957,795 U.S. Pat. No. 10,302,317, filed Dec. 3, 2015, Liquid-To-Air Membrane Energy Exchanger.
U.S. Appl. No. 16/351,046, filed Mar. 12, 2019, Liquid-To-Air Membrane Energy Exchanger.
U.S. Appl. No. 17/345,852, filed Jun. 11, 2021, Liquid-To-Air Membrane Energy Exchanger.
U.S. Appl. No. 13/737,473, filed Jan. 9, 2013, System and Method for Providing Conditioned Air to an Enclosed Structure.
U.S. Appl. No. 13/797,152 U.S. Pat. No. 9,816,760, filed Mar. 12, 2013, Liquid Panel Assembly.
U.S. Appl. No. 15/590,685 U.S. Pat. No. 11,035,618, filed May 9, 2017, Liquid Panel Assembly.
U.S. Appl. No. 13/797,062, filed Mar. 12, 2013, Membrane Support Assembly for an Energy Exchanger.
U.S. Appl. No. 14/187,413, filed Feb. 24, 2014, Evaporative Cooling System With Liquid-To-Air Membrane Energy Exchanger.
U.S. Appl. No. 13/801,280 U.S. Pat. No. 9,109,808, filed Mar. 13, 2013, Variable Desiccant Control Energy Exchange System and Method.
U.S. Appl. No. 14/804,953 U.S. Pat. No. 9,909,768, filed Jul. 21, 2015, Variable Desiccant Control Energy Exchange System and Method.
U.S. Appl. No. 15/185,155 U.S. Pat. No. 10,480,801, filed Jun. 17, 2016, Variable Desiccant Control Energy Exchange System and Method.
U.S. Appl. No. 16/661,463, filed Oct. 23, 2019, Variable Desiccant Control Energy Exchange System and Method.
U.S. Appl. No. 14/192,019, filed Feb. 27, 2014, Energy Exchange Assembly With Microporous Membrane.
U.S. Appl. No. 14/190,715 U.S. Pat. No. 10,352,628, filed Feb. 26, 2014, Membrane-Integrated Energy Exchange Assembly.
U.S. Appl. No. 16/431,397, filed Jun. 4, 2019, Membrane-Integrated Energy Exchange Assembly.
U.S. Appl. No. 14/171,951 U.S. Pat. No. 10,584,884, filed Feb. 4, 2014, Control System and Method for a Liquid Desiccant Air Delivery System.
U.S. Appl. No. 16/784,822, filed Feb. 7, 2020, Control System and Method for a Liquid Desiccant Air Delivery System.
U.S. Appl. No. 60/163,731, filed Nov. 5, 1999, Humidity Pump.
U.S. Appl. No. 10/048,797 U.S. Pat. No. 6,684,649, filed Jan. 31, 2002, Enthalpy Pump.
"AAONAIRE Energy Recovery Units Users Information Manual", AAON, Inc., (Aug. 2006), 16 pgs.
"Advances in Desiccant-Based Dehumidification", American Standard, TRANE Engineers Newsletter, vol. 34-4, (2005), 8 pgs.
"U.S. Appl. No. 10/048,797, Amendment and Response filed Apr. 29, 2003 to Non-Final Office dated Mar. 11, 2003", 10 pgs.
"U.S. Appl. No. 10/048,797, Non-Final Office dated Mar. 11, 2003", 4 pgs.
"U.S. Appl. No. 10/048,797, Notice of Allowance dated May 13, 2003", 5 pgs.
"U.S. Appl. No. 13/350,902, Appeal Brief filed Apr. 4, 2014", 24 pgs.
"U.S. Appl. No. 13/350,902, Appeal Decision mailed Sep. 30, 2016", 6 pgs.
"U.S. Appl. No. 13/350,902, Examiner's Answer dated Jun. 16, 2014", 17 pgs.
"U.S. Appl. No. 13/350,902, Final Office Action dated Dec. 30, 2013", 13 pgs.
"U.S. Appl. No. 13/350,902, Non Final Office Action dated Oct. 1, 2013", 13 pgs.
"U.S. Appl. No. 13/350,902, Notice of Allowance dated Mar. 1, 2017", 7 pgs.
"U.S. Appl. No. 13/350,902, Notice of Allowance dated Nov. 9, 2016", 9 pgs.
"U.S. Appl. No. 13/350,902, Reply Brief filed Jul. 8, 2014", 9 pgs.
"U.S. Appl. No. 13/350,902, Response filed Aug. 5, 2013 to Restriction Requirement dated Jul. 23, 2013", 2 pgs.
"U.S. Appl. No. 13/350,902, Response filed Oct. 29, 2013 to Non Final Office Action dated Oct. 1, 2013", 15 pgs.
"U.S. Appl. No. 13/350,902, Restriction Requirement dated Jul. 23, 2013", 8 pgs.
"U.S. Appl. No. 13/449,598, Final Office Action dated Feb. 4, 2016", 23 pgs.
"U.S. Appl. No. 13/449,598, Non Final Office Action dated Apr. 24, 2015", 18 pgs.
"U.S. Appl. No. 13/449,598, Non Final Office Action dated Aug. 27, 2015", 20 pgs.
"U.S. Appl. No. 13/449,598, Notice of Allowance dated Mar. 10, 2017", 7 pgs.
"U.S. Appl. No. 13/449,598, Notice of Allowance dated Jul. 6, 1207", 7 pgs.
"U.S. Appl. No. 13/449,598, Notice of Allowance dated Nov. 4, 2016", 9 pgs.
"U.S. Appl. No. 13/449,598, Response filed Jan. 29, 2015 to Restriction Requirement dated Jan. 5, 2015", 2 pgs.
"U.S. Appl. No. 13/449,598, Response filed Jul. 17, 2015 to Non Final Office Action dated Apr. 24, 2015", 17 pgs.
"U.S. Appl. No. 13/449,598, Response filed Nov. 16, 2015 to Non Final Office Action dated Aug. 27, 2015", 18 pgs.
"U.S. Appl. No. 13/449,598, Restriction Requirement dated Jan. 5, 2015", 10 pgs.
"U.S. Appl. No. 13/702,596, Appeal Brief filed Jun. 15, 2015", 82 pgs.
"U.S. Appl. No. 13/702,596, Final Office Action dated Jan. 30, 2015", 15 pgs.
"U.S. Appl. No. 13/702,596, Non Final Office Action dated Oct. 30, 2014", 16 pgs.
"U.S. Appl. No. 13/702,596, Notice of Allowance dated Oct. 1, 2015", 7 pgs.
"U.S. Appl. No. 13/702,596, Notice of Allowance dated Nov. 25, 2015", 2 pgs.
"U.S. Appl. No. 13/702,596, Post Allowance Amendment filed Oct. 7, 2015", 13 pgs.
"U.S. Appl. No. 13/702,596, PTO Response to Rule 312 Communication dated Oct. 19, 2015", 2 pgs.
"U.S. Appl. No. 13/702,596, Response filed Dec. 15, 2014 to Non Final Office Action dated Oct. 30, 2014", 21 pgs.
"U.S. Appl. No. 13/797,062, Amendment and Response Under 37 C.F.R. 1.116 Filed Jan. 22, 2018 to Final Office Action dated Feb. 24, 2016", 11 pgs.

(56) References Cited

OTHER PUBLICATIONS

"U.S. Appl. No. 13/797,062, Appeal Brief filed Mar. 25, 2020", 27 pgs.
"U.S. Appl. No. 13/797,062, Appeal Brief filed Jun. 9, 2016", 33 pgs.
"U.S. Appl. No. 13/797,062, Appeal Decision dated Nov. 22, 2017", 15 pgs.
"U.S. Appl. No. 13/797,062, Final Office Action dated Feb. 24, 2016", 29 pgs.
"U.S. Appl. No. 13/797,062, Final Office Action dated Jul. 25, 2019", 50 pgs.
"U.S. Appl. No. 13/797,062, Non Final Office Action dated Feb. 21, 2018", 21 pgs.
"U.S. Appl. No. 13/797,062, Non Final Office Action dated May 7, 2015", 19 pgs.
"U.S. Appl. No. 13/797,062, Non Final Office Action dated Sep. 25, 2015", 24 pgs.
"U.S. Appl. No. 13/797,062, Non Final Office Action dated Dec. 28, 2018", 50 pgs.
"U.S. Appl. No. 13/797,062, Respnose filed Jun. 28, 2019 to Non Final Office Action dated Jun. 28, 2019", 12 pgs.
"U.S. Appl. No. 13/797,062, Response filed Apr. 23, 2015 to Restriction Requirement dated Mar. 13, 2015", 3 pgs.
"U.S. Appl. No. 13/797,062, Response filed Jul. 17, 2015 to Non Final Office Action dated May 7, 2015", 16 pgs.
"U.S. Appl. No. 13/797,062, Response filed Nov. 30, 2015 to Non Final Office Action dated Sep. 25, 2015", 16 pgs.
"U.S. Appl. No. 13/797,062, Response filed Dec. 13, 2018 to Final Office Action dated Jul. 13, 2018", 12 pgs.
"U.S. Appl. No. 13/797,062, Response filed May 21, 2018 to Non Final Office Action dated Feb. 21, 2018", 12 pgs.
"U.S. Appl. No. 13/797,062, Restriction Requirement dated Mar. 13, 2015", 8 pgs.
"U.S. Appl. No. 13/797,152, Appeal Brief filed Jun. 9, 2016", 29 pgs.
"U.S. Appl. No. 13/797,152, Corrected Notice of Allowance dated Mar. 9, 2017", 7 pgs.
"U.S. Appl. No. 13/797,152, Final Office Action dated Feb. 25, 2016", 14 pgs.
"U.S. Appl. No. 13/797,152, Non Final Office Action dated Aug. 25, 2015", 10 pgs.
"U.S. Appl. No. 13/797,152, Notice of Allowance dated Mar. 9, 2017", 7 pgs.
"U.S. Appl. No. 13/797,152, Notice of Allowance dated Jun. 27, 2017", 8 pgs.
"U.S. Appl. No. 13/797,152, Notice of Allowance dated Oct. 31, 2016", 7 pgs.
"U.S. Appl. No. 13/797,152, Response filed Nov. 20, 2015 to Non Final Office Action dated Aug. 25, 2015", 12 pgs.
"U.S. Appl. No. 13/801,280, 312 Amendment filed Jun. 18, 2015", 8 pgs.
"U.S. Appl. No. 13/801,280, Non Final Office Action dated Feb. 12, 2015", 7 pgs.
"U.S. Appl. No. 13/801,280, Notice of Allowance dated May 19, 2015", 7 pgs.
"U.S. Appl. No. 13/801,280, PTO Response to 312 Amendment dated Jul. 9, 2015", 2 pgs.
"U.S. Appl. No. 13/801,280, Response filed Jan. 7, 2015 to Restriction Requirement dated Dec. 10, 2014", 1 pg.
"U.S. Appl. No. 13/801,280, Response filed Mar. 31, 2015 to Non Final Office Action dated Feb. 12, 2015", 9 pgs.
"U.S. Appl. No. 13/801,280, Restriction Requirement dated Dec. 10, 2014", 9 pgs.
"U.S. Appl. No. 14/171,951, Advisory Action dated Nov. 10, 2016", 3 pgs.
"U.S. Appl. No. 14/171,951, Final Office Action dated Jun. 28, 2016", 36 pgs.
"U.S. Appl. No. 14/171,951, Non Final Office Action dated Jan. 5, 2016", 20 pgs.
"U.S. Appl. No. 14/171,951, Non Final Office Action dated May 2, 2016", 35 pgs.
"U.S. Appl. No. 14/171,951, Notice of Allowance dated Jan. 9, 2019", 6 pgs.
"U.S. Appl. No. 14/171,951, Notice of Allowance dated Jan. 19, 2018", 5 pgs.
"U.S. Appl. No. 14/171,951, Notice of Allowance dated Feb. 3, 2017", 5 pgs.
"U.S. Appl. No. 14/171,951, Notice of Allowance dated Jun. 8, 2017", 5 pgs.
"U.S. Appl. No. 14/171,951, Notice of Allowance dated Oct. 3, 2017", 5 pgs.
"U.S. Appl. No. 14/171,951, Notice of Allowance dated Nov. 6, 2019", 6 pgs.
"U.S. Appl. No. 14/171,951, Response filed Mar. 28, 2016 to Non Final Office Action dated Jan. 5, 2016", 18 pgs.
"U.S. Appl. No. 14/171,951, Response filed Jun. 9, 2016 to Non Final Office Action dated May 2, 2016", 24 pgs.
"U.S. Appl. No. 14/171,951, Response filed Oct. 28, 2016 to Final Office Action dated Jun. 28, 2016", 15 pgs.
"U.S. Appl. No. 14/171,951, Response filed Dec. 3, 2015 to Restriction Requirement dated Nov. 16, 2015", 6 pgs.
"U.S. Appl. No. 14/171,951, Response filed Dec. 15, 2016 to Advisory Action dated Nov. 10, 2016", 16 pgs.
"U.S. Appl. No. 14/171,951, Restriction Requirement dated Nov. 16, 2015", 13 pgs.
"U.S. Appl. No. 14/186,420, Notice of Allowance dated Jan. 27, 2017", 7 pgs.
"U.S. Appl. No. 14/187,413 Response to Non-Final Office Action filed Jun. 2, 2020", 25 pgs.
"U.S. Appl. No. 14/187,413, Advisory Action dated Nov. 10, 2016", 4 pgs.
"U.S. Appl. No. 14/187,413, Advisory Action dated Dec. 17, 2018", 5 pgs.
"U.S. Appl. No. 14/187,413, Amendment and Response filed Nov. 30, 2018 to Final Office Action dated Jul. 26, 2018", 19 pgs.
"U.S. Appl. No. 14/187,413, Final Office Action dated Jun. 15, 2020", 19 pgs.
"U.S. Appl. No. 14/187,413, Final Office Action dated Jun. 27, 2017", 16 pgs.
"U.S. Appl. No. 14/187,413, Final Office Action dated Jul. 26, 2018", 16 pgs.
"U.S. Appl. No. 14/187,413, Final Office Action dated Jul. 28, 2016", 20 pgs.
"U.S. Appl. No. 14/187,413, Non Final Office Action dated Feb. 8, 2017", 15 pgs.
"U.S. Appl. No. 14/187,413, Non Final Office Action dated Mar. 17, 2016", 15 pgs.
"U.S. Appl. No. 14/187,413, Non Final Office Action dated Jul. 31, 2019", 22 pgs.
"U.S. Appl. No. 14/187,413, Non Final Office Action dated Dec. 18, 2017", 20 pgs.
"U.S. Appl. No. 14/187,413, Response filed Feb. 25, 2015 to Restriction Requirement dated Feb. 16, 2016", 3 pgs.
"U.S. Appl. No. 14/187,413, Response filed May 26, 2016 to Non Final Office Action dated Mar. 17, 2016", 15 pgs.
"U.S. Appl. No. 14/187,413, Response filed Jun. 8, 2017 to Non Final Office Action dated Feb. 8, 2017", 15 pgs.
"U.S. Appl. No. 14/187,413, Response filed Oct. 28, 2016 to Final Office Action dated Jul. 28, 2016", 17 pgs.
"U.S. Appl. No. 14/187,413, Response filed Nov. 27, 2017 to Final Office Action dated Jun. 27, 2017", 14 pgs.
"U.S. Appl. No. 14/187,413, Response filed Dec. 21, 2016 to Final Office Action dated Jul. 28, 2016 and Advisory Action dated Nov. 10, 2016", 15 pgs.
"U.S. Appl. No. 14/187,413, Restriction Requirement dated Feb. 16, 2016", 6 pgs.
"U.S. Appl. No. 14/190,715, Advisory Action dated Aug. 16, 2018", 6 pgs.
"U.S. Appl. No. 14/190,715, Examiner Interview Summary dated Oct. 31, 2018", 3 pgs.
"U.S. Appl. No. 14/190,715, Final Office Action dated Feb. 20, 2018", 9 pgs.

(56) References Cited

OTHER PUBLICATIONS

"U.S. Appl. No. 14/190,715, Non Final Office Action dated Aug. 10, 2017", 9 pgs.
"U.S. Appl. No. 14/190,715, Notice of Allowance dated Mar. 4, 2019", 7 pgs.
"U.S. Appl. No. 14/190,715, Response filed Jul. 12, 2017 to Restriction Requirement dated Apr. 12, 2017", 7 pgs.
"U.S. Appl. No. 14/190,715, Response filed Nov. 9, 2017 to Non Final Office Action dated Aug. 10, 2017", 10 pgs.
"U.S. Appl. No. 14/190,715, Restriction Requirement dated Apr. 13, 2017", 7 pgs.
"U.S. Appl. No. 14/192,019, Final Office Action dated Jan. 10, 2019", 16 pgs.
"U.S. Appl. No. 14/192,019, Final Office Action dated Nov. 28, 2017", 16 pgs.
"U.S. Appl. No. 14/192,019, Non Final Office Action dated May 11, 2018", 16 pgs.
"U.S. Appl. No. 14/192,019, Non Final Office Action dated May 19, 2017", 15 pgs.
"U.S. Appl. No. 14/192,019, Non Final Office Action dated Jun. 25, 2019", 13 pgs.
"U.S. Appl. No. 14/192,019, Response filed Jun. 10, 2019 to Final Office Action dated Jan. 20, 2019", 10 pgs.
"U.S. Appl. No. 14/192,019, Response filed Aug. 21, 2017 to Non Final Office Action dated May 19, 2017", 13 pgs.
"U.S. Appl. No. 14/192,019, Response filed Sep. 11, 2018 to Non Final Office Action dated May 11, 2018", 12 pgs.
"U.S. Appl. No. 14/192,019, Response filed Apr. 27, 2018 to Final Office Action dated Nov. 28, 2017", 11 pgs.
"U.S. Appl. No. 14/804,953, Corrected Notice of Allowance dated Jan. 25, 2018", 4 pgs.
"U.S. Appl. No. 14/804,953, Non Final Office Action dated Sep. 15, 2016", 8 pgs.
"U.S. Appl. No. 14/804,953, Notice of Allowance dated Feb. 27, 2017", 7 pgs.
"U.S. Appl. No. 14/804,953, Notice of Allowance dated May 9, 2017", 7 pgs.
"U.S. Appl. No. 14/804,953, Notice of Allowance dated Sep. 7, 2017", 7 pgs.
"U.S. Appl. No. 14/804,953, Response filed Dec. 15, 2016 to Non Final Office Action dated Sep. 15, 2016", 7 pgs.
"U.S. Appl. No. 14/830,492, Corrected Notice of Allowability dated Jun. 15, 2020", 2 pgs.
"U.S. Appl. No. 14/830,492, Final Office Action dated Dec. 28, 2018", 9 pgs.
"U.S. Appl. No. 14/830,492, Non-Final Action dated Mar. 15, 2018", 9 pgs.
"U.S. Appl. No. 14/830,492, Notice of Allowance dated Feb. 27, 2020", 5 pgs.
"U.S. Appl. No. 14/830,492, Notice of Allowance dated Sep. 24, 2019", 7 pgs.
"U.S. Appl. No. 14/830,492, Response filed Feb. 15, 2018 to Restriction Requirement dated Dec. 15, 2017", 7 pgs.
"U.S. Appl. No. 14/830,492, Response filed Jun. 29, 2019 to Final Office Action dated Dec. 28, 2018", 6 pgs.
"U.S. Appl. No. 14/830,492, Response filed Aug. 15, 2018 to Non Final Office Action dated Mar. 15, 2018", 12 pgs.
"U.S. Appl. No. 14/830,492, Restriction Requirement dated Dec. 15, 2017", 6 pgs.
"U.S. Appl. No. 14/957,795, Corrected Notice of Allowability dated Feb. 1, 2019", 4 pgs.
"U.S. Appl. No. 14/957,795, Corrected Notice of Allowance dated May 16, 2018", 4 pgs.
"U.S. Appl. No. 14/957,795, Final Office Action dated Nov. 6, 2017", 17 pgs.
"U.S. Appl. No. 14/957,795, Non Final Office Action dated Apr. 3, 2017", 19 pgs.
"U.S. Appl. No. 14/957,795, Notice of Allowance dated Jan. 17, 2019", 7 pgs.
"U.S. Appl. No. 14/957,795, Notice of Allowance dated Apr. 27, 2018", 8 pgs.
"U.S. Appl. No. 14/957,795, Notice of Allowance dated Sep. 11, 2018", 9 pgs.
"U.S. Appl. No. 14/957,795, Response filed Apr. 3, 2018 to Final Office Action dated Nov. 6, 2017", 11 pgs.
"U.S. Appl. No. 14/957,795, Response filed Aug. 3, 2017 to Non Final Office Action dated Apr. 3, 2017", 17 pgs.
"U.S. Appl. No. 15/185,155, Corrected Notice of Allowability dated May 15, 2019", 2 pgs.
"U.S. Appl. No. 15/185,155, Corrected Notice of Allowability dated May 22, 2019", 2 pgs.
"U.S. Appl. No. 15/185,155, Examiner Interview Summary dated Feb. 21, 2019", 3 pgs.
"U.S. Appl. No. 15/185,155, Final Office Action dated Dec. 5, 2018", 11 pgs.
"U.S. Appl. No. 15/185,155, Non Final Office Action dated Apr. 10, 2018", 13 pgs.
"U.S. Appl. No. 15/185,155, Notice of Allowance dated Mar. 25, 2019", 7 pgs.
"U.S. Appl. No. 15/185,155, Notice of Allowance dated Jul. 17, 2019", 8 pgs.
"U.S. Appl. No. 15/185,155, Response filed Aug. 6, 2018 to Non Final Office Action dated Apr. 10, 2018", 10 pgs.
"U.S. Appl. No. 15/185,155, Response filed Mar. 5, 2019 to Final Office Action dated Dec. 5, 2018", 9 pgs.
"U.S. Appl. No. 15/185,180, Final Office Action dated Jul. 31, 2019", 15 pgs.
"U.S. Appl. No. 15/185,180, Non Final Office Action dated Jan. 8, 2019", 14 pgs.
"U.S. Appl. No. 15/185,180, Notice of Allowance dated Oct. 15, 2020", 6 pgs.
"U.S. Appl. No. 15/185,180, Response filed Nov. 19, 2018 to Restriction Requirement dated Jun. 21, 2018", 9 pgs.
"U.S. Appl. No. 15/185,180, Response filed May 1, 2019 to Non Final Office Action dated Jan. 8, 2019", 11 pgs.
"U.S. Appl. No. 15/574,201, Restriction Requirement dated Sep. 5, 2018", 6 pgs.
"U.S. Appl. No. 15/574,205, Non Final Office Action dated Sep. 11, 2018", 6 pgs.
"U.S. Appl. No. 15/590,685, Advisory Action dated Dec. 12, 2018", 3 pgs.
"U.S. Appl. No. 15/590,685, Examiner Interview Summary dated Dec. 11, 2020", 3 pgs.
"U.S. Appl. No. 15/590,685, Final Office Action dated Jun. 7, 2018", 12 pgs.
"U.S. Appl. No. 15/590,685, Final Office Action dated Jun. 26, 2019", 14 pgs.
"U.S. Appl. No. 15/590,685, Non Final Office Action dated Jan. 7, 2020", 15 pgs.
"U.S. Appl. No. 15/590,685, Non Final Office Action dated Jan. 11, 2019", 13 pgs.
"U.S. Appl. No. 15/590,685, Non Final Office Action dated Oct. 6, 2017", 11 pgs.
"U.S. Appl. No. 15/590,685, Notice of Allowance dated Feb. 9, 2021", 6 pgs.
"U.S. Appl. No. 15/590,685, PTO Response to Rule 312 Communication dated Apr. 27, 2021", 2 pgs.
"U.S. Appl. No. 15/590,685, Response filed Feb. 20, 2018 to Non Final Office Action dated Oct. 6, 2017", 7 pgs.
"U.S. Appl. No. 15/590,685, Response filed Apr. 18, 2019 to NonFinal Office Action dated Jan. 11, 2019", 11 pgs.
"U.S. Appl. No. 15/590,685, Response filed Nov. 30, 2018 to Final Office Action dated Jun. 7, 2018", 10 pgs.
"U.S. Appl. No. 15/590,685, Response filed Dec. 19, 2019 to Final Office Action dated Jun. 26, 2019", 11 pgs.
"U.S. Appl. No. 15/739,016, Corrected Notice of Allowability dated Jul. 1, 2020", 2 pgs.
"U.S. Appl. No. 15/739,016, Non Final Office Action dated Feb. 13, 2019", 6 pgs.
"U.S. Appl. No. 15/739,016, Notice of Allowance dated Mar. 25, 2020", 5 pgs.

(56) References Cited

OTHER PUBLICATIONS

"U.S. Appl. No. 15/739,016, Notice of Allowance dated Aug. 1, 2019", 6 pgs.
"U.S. Appl. No. 15/739,016, Notice of Allowance dated Nov. 20, 2019", 7 pgs.
"U.S. Appl. No. 15/739,016, Response filed Jan. 28, 2019 to Restriction Requirement dated Nov. 26, 2018", 8 pgs.
"U.S. Appl. No. 15/739,016, Restriction Requirement dated Nov. 26, 2018", 5 pgs.
"U.S. Appl. No. 16/351,046, Non Final Office Action dated Dec. 21, 2020", 8 pgs.
"U.S. Appl. No. 16/431,397, Supplemental Preliminary Amendment filed Aug. 2, 2019", 6 pgs.
"U.S. Appl. No. 16/784,822, Supplemental Preliminary Amendment filed Feb. 14, 2020", 6 pgs.
"Australian Application Serial No. 2011268661, First Examiner Report dated Sep. 24, 2014", 5 pgs.
"Australian Application Serial No. 2011268661, Response filed Jul. 20, 2015 to First Examiner Report dated Sep. 24, 2014", 8 pgs.
"Australian Application Serial No. 2011268661, Response filed Sep. 23, 2015 to Second Examiner Report dated Aug. 18, 2015", 5 pgs.
"Australian Application Serial No. 2011268661, Second Examiner Report dated Aug. 18, 2015", 6 pgs.
"Australian Application Serial No. 2012208921, First Examiner Report dated Jun. 2, 2016", 7 pgs.
"Australian Application Serial No. 2012304223, First Examiner Report dated Aug. 5, 2016", 4 pgs.
"Australian Application Serial No. 2012304223, Response filed Feb. 16, 2017 to First Examiner Report dated Aug. 5, 2016", 25 pgs.
"Australian Application Serial No. 2013305427, Examination Report dated Mar. 3, 2017", 4 pgs.
"Australian Application Serial No. 2013305427, Response filed Oct. 10, 2017 to Examination Report dated Mar. 3, 2017", 30 pgs.
"Australian Application Serial No. 2013305428, Office Action dated May 30, 2017", 5 pgs.
"Australian Application Serial No. 2013305428, Response filed May 15, 2018 to Office Action dated May 30, 2017", 23 pgs.
"Australian Application Serial No. 2014231667, First Examination Report dated Apr. 5, 2018", 4 pgs.
"Australian Application Serial No. 2014231667, Response filed Jan. 15, 2019 to Subsequent Examiners Report dated Aug. 29, 2018", 12 pgs.
"Australian Application Serial No. 2014231667, Response filed Jul. 20, 2018 to First Examination Report dated Apr. 5, 2018", 19 pgs.
"Australian Application Serial No. 2014231667, Subsequent Examiners Report dated Aug. 29, 2018", 4 pgs.
"Australian Application Serial No. 2014231668, First Examination Report dated Dec. 6, 2017", 6 pgs.
"Australian Application Serial No. 2014231668, Response filed Mar. 14, 2018 to First Examination Report dated Dec. 6, 2017", 31 pgs.
"Australian Application Serial No. 2014231668, Subsequent Examiners Report dated Apr. 5, 2018", 3 pgs.
"Australian Application Serial No. 2014231672, First Examiners Report dated Jul. 14, 2017", 4 pgs.
"Australian Application Serial No. 2014231672, Response filed Oct. 9, 2017 to First Examiners Report dated Jul. 14, 2017", 24 pgs.
"Australian Application Serial No. 2014231680, First Examiners Report dated Aug. 4, 2017", 4 pgs.
"Australian Application Serial No. 2014231681, First Examiners Report dated Jul. 12, 2017", 4 pgs.
"Australian Application Serial No. 2014231681, Response filed Jan. 30, 2018 to Subsequent Examiners Report dated Sep. 26, 2017", 15 pgs.
"Australian Application Serial No. 2014231681, Response filed Apr. 26, 2018 to Subsequent Examiners Report dated Mar. 13, 2018", 3 pgs.
"Australian Application Serial No. 2014231681, Response filed Sep. 15, 2017 to First Examiners Report dated Jul. 12, 2017", 9 pgs.
"Australian Application Serial No. 2014231681, Subsequent Examiners Report dated Mar. 13, 2018", 4 pgs.
"Australian Application Serial No. 2014231681, Subsequent Examiners Report dated Sep. 26, 2017", 4 pgs.
"Australian Application Serial No. 2015230799, First Examiner Report dated Mar. 27, 2017", 10 pgs.
"Australian Application Serial No. 2015230799, Response filed Feb. 16, 2018 to First Examiner Report dated Mar. 27, 2017", 24 pgs.
"Australian Application Serial No. 2015306040, First Examination Report dated Nov. 8, 2019", 4 pgs.
"Australian Application Serial No. 2016265882, First Examination Report dated Aug. 5, 2020", 4 pgs.
"Australian Application Serial No. 2016265883, First Examination Report dated Sep. 22, 2020", 4 pgs.
"Australian Application Serial No. 2016281963, First Examination Report dated Oct. 15, 2020", 5 pgs.
"Australian Application Serial No. 2017204552, First Examination Report dated Oct. 9, 2018", 3 pgs.
"Australian Application Serial No. 2018202342, First Examination Report dated Jun. 17, 2019", 5 pgs.
"Australian Application Serial No. 2018202342, Response filed Aug. 1, 2019 to First Examination Report dated Jun. 17, 2019", 17 pgs.
"Australian Application Serial No. 2018202342, Subsequent Examiners Report dated Aug. 23, 2019", 4 pgs.
"Australian Application Serial No. 2018204774, First Examination Report dated Jul. 18, 2019", 4 pgs.
"Australian Application Serial No. 2018204774, Response filed May 28, 2020 to First Examination Report dated Jul. 18, 2019", 14 pgs.
"Australian Application Serial No. 2018226496, First Examination Report dated Jul. 25, 2019", 4 pgs.
"Australian Application Serial No. 2018236791, First Examination Report dated Mar. 2, 2020", 3 pgs.
"Australian Application Serial No. 2018236791, Response filed Jun. 9, 2020 to First Examination Report dated Mar. 2, 2020", 12 pgs.
"Australian Application Serial No. 2018236791, Voluntary Amendment filed Dec. 3, 2018", 8 pgs.
"Australian Application Serial No. 2019201063, First Examination Report dated Aug. 6, 2019", 7 pgs.
"Australian Application Serial No. 2019250148, First Examination Report dated Nov. 23, 2020", 5 pgs.
"Canadian Application Serial No. 2,801,352, Office Action dated Jul. 4, 2017", 3 pgs.
"Canadian Application Serial No. 2,801,352, Office Action dated Aug. 2, 2018", 3 pgs.
"Canadian Application Serial No. 2,801,352, Office Action dated Aug. 15, 2016", 3 pgs.
"Canadian Application Serial No. 2,801,352, Response filed Jan. 29, 2019 to Office Action dated Aug. 2, 2018", 12 pgs.
"Canadian Application Serial No. 2,801,352, Response filed Feb. 8, 2017 to Office Action dated Aug. 15, 2016", 89 pgs.
"Canadian Application Serial No. 2,801,352, Response filed Dec. 18, 2017 to Office Action dated Jul. 4, 2017", 8 pgs.
"Canadian Application Serial No. 2,843,763, Office Action dated Dec. 4, 2014", 3 pgs.
"Canadian Application Serial No. 2,843,763, Response filed May 12, 2015 to Office Action dated Dec. 4, 2014", 31 pgs.
"Canadian Application Serial No. 2,880,350, Examiner's Rule 30(2) Requisition dated May 1, 2019", 4 pgs.
"Canadian Application Serial No. 2,880,353, Office Action dated Apr. 29, 2019", 4 pgs.
"Canadian Application Serial No. 2,880,353, Response filed Oct. 29, 2019 to Office Action dated Apr. 29, 2019", 28 pgs.
"Canadian Application Serial No. 2,901,483, Office Action dated Jul. 19, 2017", 3 pgs.
"Canadian Application Serial No. 2,901,483, Office Action dated Nov. 23, 2016", 4 pgs.
"Canadian Application Serial No. 2,901,483, Response filed Jan. 16, 2018 to Office Action dated Jul. 19, 2017", 28 pgs.
"Canadian Application Serial No. 2,901,483, Response filed May 23, 2017 to Office Action dated Nov. 23, 2016", 40 pgs.

(56) References Cited

OTHER PUBLICATIONS

"Canadian Application Serial No. 2,901,484, Office Action dated Jun. 5, 2020", 6 pgs.
"Canadian Application Serial No. 2,901,484, Office Action dated Dec. 11, 2019", 6 pgs.
"Canadian Application Serial No. 2,901,484, Response filed Apr. 7, 2020 to Office Action dated Dec. 11, 2019", 25 pgs.
"Canadian Application Serial No. 2,901,484, Response filed Sep. 29, 2020 to Office Action dated Jun. 5, 2020", 20 pgs.
"Canadian Application Serial No. 2,901,492, Office Action dated Jan. 29, 2020", 4 pgs.
"Canadian Application Serial No. 2,901,495, Office Action dated Jan. 29, 2020", 4 pgs.
"Canadian Application Serial No. 2,904,224, Office Action dated Jan. 3, 2020", 4 pgs.
"Canadian Application Serial No. 3,034,592, Office Action dated Mar. 17, 2020", 5 pgs.
"Canadian Application Serial No. 3,034,592, Response filed Jul. 14, 2020 to Office Action dated Mar. 17, 2020", 20 pgs.
"Canadian Application Serial No. 3,046,529, Office Action dated Mar. 5, 2020", 4 pgs.
"Canadian Application Serial No. 3,046,529, Office Action dated Sep. 18, 2019", 6 pgs.
"Canadian Application Serial No. 3,046,529, Response filed Nov. 14, 2019 to Office Action dated Sep. 18, 2019", 9 pgs.
"Chapter 8—Heating, Ventilating, and Air Conditioning (HVAC) Demonstration", HVAC Demonstration, (published prior to Feb. 21, 2014), 16 pgs.
"Chinese Application Serial No. 201280006006.9, Office Action dated Feb. 2, 2016", w/ English Summary, 19 pgs.
"Chinese Application Serial No. 201280006006.9, Response filed Apr. 8, 2016 to Office Action dated Feb. 2, 2016", w/ English Translation of Claims, 64 pgs.
"Chinese Application Serial No. 201280006006.9, Voluntary Amendment filed Apr. 14, 2014", w/ English Translation of Claims, 83 pgs.
"Chinese Application Serial No. 201180031103.9, Office Action dated Feb. 11, 2015", w/ English Translation, 16 pgs.
"Chinese Application Serial No. 201180031103.9, Office Action dated Jun. 13, 2014", w/ English Translation, 19 pgs.
"Chinese Application Serial No. 201180031103.9, Office Action dated Sep. 9, 2015", w/ English Translation, 7 pgs.
"Chinese Application Serial No. 201180031103.9, Office Action dated Nov. 6, 2015", w/ English Translation, 5 pgs.
"Chinese Application Serial No. 201180031103.9, Response filed Apr. 27, 2015 to Office Action dated Feb. 11, 2015", w/ English Translation, 15 pgs.
"Chinese Application Serial No. 201180031103.9, Response filed Sep. 26, 2014 to Office Action dated Jun. 13, 2014", w/ English Translation, 12 pgs.
"Chinese Application Serial No. 201180031103.9, Response filed Sep. 29, 2015 to Office Action dated Sep. 9, 2015", w/ English Translation, 78 pgs.
"Chinese Application Serial No. 201280006006.9, Office Action dated May 13, 2015", w/ English Translation, 7 pgs.
"Chinese Application Serial No. 201280006006.9, Office Action dated Aug. 15, 2016", w/ English Translation, 18 pgs.
"Chinese Application Serial No. 201280006006.9, Response filed Sep. 28, 2015 to Office Action dated May 13, 2015", w/ English Translation of Claims, 71 pgs.
"Chinese Application Serial No. 201280006006.9, Response filed Dec. 30, 2016 to Office Action dated Aug. 15, 2016", w/ English Translation of Claims, 69 pgs.
"Chinese Application Serial No. 201280042778.8, Office Action dated Feb. 3, 2016", w/ English Translation, 9 pgs.
"Chinese Application Serial No. 201280042778.8, Office Action dated Sep. 7, 2016", w/ English Translation of Claims, 17 pgs.
"Chinese Application Serial No. 201280042778.8, Response filed May 25, 2016 to Office Action dated Feb. 3, 2016", w/ English Translation, 11 pgs.
"Chinese Application Serial No. 201280042778.8, Response filed Nov. 16, 2016 to Office Action dated Sep. 7, 2016", w/ English Translation, 44 pgs.
"Chinese Application Serial No. 201380042926.0, Decision of Reexamination—Upholding Decision of Rejection dated Mar. 15, 2019", w/ English Translation, 18 pgs.
"Chinese Application Serial No. 201380042926.0, Decision of Rejection dated Jan. 5, 2018", w/ English Claims, 11 pgs.
"Chinese Application Serial No. 201380042926.0, Notice of Reexamination dated Aug. 23, 2018", w/ English Machine Translation, 18 pgs.
"Chinese Application Serial No. 201380042926.0, Office Action dated Feb. 26, 2016", w/ English Translation, 15 pgs.
"Chinese Application Serial No. 201380042926.0, Office Action dated May 11, 2017", W/ English Translation, 13 pgs.
"Chinese Application Serial No. 201380042926.0, Office Action dated Sep. 28, 2016", w/ English Translation, 12 pgs.
"Chinese Application Serial No. 201380042926.0, Request for Reexamination filed Apr. 20, 2018 to Decision of Rejection dated Jan. 5, 2018", w/ English claims, 52 pgs.
"Chinese Application Serial No. 201380042926.0, Response filed Feb. 13, 2017 to Office Action dated Sep. 28, 2016", w/ English Translation of Amended Claims, 56 pgs.
"Chinese Application Serial No. 201380042926.0, Response filed Jul. 7, 2016 to Office Action dated Feb. 26, 2016", w/ English Translation of Claims, 40 pgs.
"Chinese Application Serial No. 201380042926.0, Response filed Sep. 26, 2017 to Office Action dated May 11, 2017", w/ English Translation of Claims (not amended), 13 pgs.
"Chinese Application Serial No. 201380042926.0, Response filed Dec. 7, 2018 to Notice of Reexamination dated Aug. 23, 2018", w/ English Translation, 15 pgs.
"Chinese Application Serial No. 201380044484.3, Examiner Interview Summary Jan. 3, 2018", w/ English Translation, 1 pg.
"Chinese Application Serial No. 201380044484.3, Office Action dated Jan. 13, 2017", w/ English Translation, 16 pgs.
"Chinese Application Serial No. 201380044484.3, Office Action dated Mar. 28, 2016", w/ English Translation, 16 pgs.
"Chinese Application Serial No. 201380044484.3, Office Action dated Jul. 31, 2017", w/ English Translation, 21 pgs.
"Chinese Application Serial No. 201380044484.3, Response filed Jan. 3, 2018 to Examiner Interview Summary dated Jan. 3, 2018", w/ English claims, 53 pgs.
"Chinese Application Serial No. 201380044484.3, Response filed Mar. 28, 2017 to Office Action dated Jan. 13, 2017", w/ English Translation of Claims, 58 pgs.
"Chinese Application Serial No. 201380044484.3, Response filed Oct. 12, 2016 to Office Action dated Mar. 28, 2016", w/ English Translation of Claims, 54 pgs.
"Chinese Application Serial No. 201380044484.3, Response filed Oct. 12, 2017 to Office Action dated Jul. 31, 2017", w/ English Translation of Claims, 54 pgs.
"Chinese Application Serial No. 201480014783.7, Office Action dated Mar. 26, 2018", w/ English Translation, 16 pgs.
"Chinese Application Serial No. 201480014783.7, Office Action dated Jun. 30, 2017", w/ English Translation, 19 pgs.
"Chinese Application Serial No. 201480014783.7, Response filed Jun. 11, 2018 to Office Action dated Mar. 26, 2018", w/ English claims, 18 pgs.
"Chinese Application Serial No. 201480014783.7, Response filed Nov. 10, 2017 to Office Action dated Jun. 30, 2017", w/ English Claims, 48 pgs.
"Chinese Application Serial No. 201480015355.6, Decision of Rejection dated Mar. 18, 2019", w/ English Translation, 7 pgs.
"Chinese Application Serial No. 201480015355.6, Office Action dated Jun. 14, 2018", w/ English Translation, 16 pgs.
"Chinese Application Serial No. 201480015355.6, Office Action dated Oct. 13, 2017", w/ English Translation, 18 pgs.
"Chinese Application Serial No. 201480015355.6, Office Action dated Nov. 28, 2016", w/ English Translation, 16 pgs.
"Chinese Application Serial No. 201480015355.6, Response filed Feb. 28, 2018 to Office Action dated Oct. 13, 2017", w/ English claims, 36 pgs.

(56) References Cited

OTHER PUBLICATIONS

"Chinese Application Serial No. 201480015355.6, Response filed Jun. 13, 2017 to Office Action dated Nov. 28, 2016", w/ English Translation of Claims, 36 pgs.
"Chinese Application Serial No. 201480015355.6, Response filed Dec. 4, 2018 to Office Action dated Jun. 14, 2018", w/ English claims, 16 pgs.
"Chinese Application Serial No. 201480015422.4, Office Action dated Nov. 1, 2016", w/ English Translation, 13 pgs.
"Chinese Application Serial No. 201480015422.4, Response filed May 12, 2017 to Office Action dated Nov. 1, 2016", w/ English Translation of Claims, 47 pgs.
"Chinese Application Serial No. 201480015766.5, Office Action dated Oct. 19, 2016", w/ English Translation, 9 pgs.
"Chinese Application Serial No. 201480015766.5, Response filed Jan. 20, 2017 to Office Action dated Oct. 19, 2016", w/ English Translation of Claims, 52 pgs.
"Chinese Application Serial No. 201480016150.X, Office Action dated Jun. 19, 2017", w/ English Translation, 22 pgs.
"Chinese Application Serial No. 201480016150.X, Response filed Nov. 2, 2017 to Office Action dated Jun. 19, 2017", w/ English Claims, 82 pgs.
"Chinese Application Serial No. 201580053421.3, Office Action dated Sep. 17, 2019", w/ English Translation, 31 pgs.
"Chinese Application Serial No. 201680038134.X, Office Action dated Apr. 7, 2020", with English translation, 29 pages.
"Chinese Application Serial No. 201680038134.X, Office Action dated Jul. 8, 2019", w/ English Translation, 30 pgs.
"Chinese Application Serial No. 201680038134.X, Response filed Jan. 23, 2020 to Office Action dated Jul. 8, 2019", with English claims, 32 pages.
"Chinese Application Serial No. 201680038134.X, Response filed Aug. 24, 2020 to Office Action dated Apr. 7, 2020", with English claims, 24 pages.
"Chinese Application Serial No. 201680038134.X, Response to Examiner Telephone Interview filed Oct. 20, 2020", with English claims, 26 pages.
"Chinese Application Serial No. 201680038135.4, Office Action dated Jun. 28, 2020", with English translation, 25 pages.
"Chinese Application Serial No. 201680038135.4, Office Action dated Aug. 26, 2019", w/ English Translation, 23 pgs.
"Chinese Application Serial No. 201680038135.4, Response filed Mar. 10, 2020 to First Office Action dated Aug. 26, 2019", with English claims, 12 pages.
"Chinese Application Serial No. 201680038135.4, Response filed Nov. 13, 2020 to Office Action dated Jun. 28, 2020", with current English claims, claims not amended in response filed, 8 pages.
"Chinese Application Serial No. 201680048895.3, Office Action dated Apr. 15, 2020", with English translation, 12 pages.
"Chinese Application Serial No. 201680048895.3, Office Action dated Apr. 17, 2019", w/ English Translation, 33 pgs.
"Chinese Application Serial No. 201680048895.3, Response filed Aug. 31, 2020 to Office Action dated Apr. 15, 2020", with English claims, 25 pages.
"Chinese Application Serial No. 201680048895.3, Response filed Nov. 4, 2019 to Office Action dated Apr. 17, 2019", with English claims, 29 pages.
"Chinese Application Serial No. 201680048895.3, Response to Examiner Telephone Interview filed Oct. 22, 20", with English claims, 22 pages.
"Chinese Application Serial No. 201710339973.1, Office Action dated Apr. 26, 2019", w/ English Translation, 9 pgs.
"Chinese Application Serial No. 201710339973.1, Response filed Jul. 3, 2019 to Office Action dated Apr. 26, 2019", w/ English Claims, 14 pgs.
"Chinese Application Serial No. 201710708143.1, Office Action dated Aug. 16, 2019", w/ English Translation, 10 pgs.
"Chinese Application Serial No. 201710708143.1, Office Action dated Dec. 29, 2018", w/ English Translation, 9 pgs.
"Chinese Application Serial No. 201710708143.1, Response filed Apr. 29, 2019 to Office Action dated Dec. 29, 2018", w/ English Claims, 10 pgs.
"Chinese Application Serial No. 201710708143.1, Response filed Sep. 27, 2019 to Office Action dated Aug. 16, 2019", with English claims, 10 pages.
"Chinese Application Serial No. 201780027034.1, Office Action dated Apr. 13, 2020", with English translation, 35 pages.
"Chinese Application Serial No. 201780027034.1, Response filed Oct. 28, 2020 to Office Action dated Apr. 13, 2020", with English claims, 46 pages.
"Chinese Application Serial No. 201780027034.1, Response filed Oct. 28, 2020 to Office Action dated Apr. 13, 2020", with English claims, 39 pages.
"Chinese Application Serial No. 201810432187.0, Office Action dated Jan. 16, 2020", with English translation, 12 pages.
"Chinese Application Serial No. 201910516006.7, Office Action dated Jul. 2, 2020", with English translation, 16 pages.
"Chinese Application Serial No. 201910516006.7, Voluntary Amendment filed Feb. 10, 2020", with English claims, 15 pages.
"Dehumidification Solutions", Des Champs Laboratories, Inc., (2001), 18 pgs.
"Desi-WringerTM Precision Desiccant Dehumidification Systems", Des Champs Technologies, (2007), 12 pgs.
"Energy Recovery—Fresh In Air Quality", SEMCO Inc., (published before Apr. 12, 2012), 131 pgs.
"European Application Serial No. 11797695.1, Communication Pursuant to Article 94(3) EPC dated Aug. 24, 2018", 5 pgs.
"European Application Serial No. 11797695.1, Communication Pursuant to Article 94(3) EPC dated Nov. 19, 2020", 5 pgs.
"European Application Serial No. 11797695.1, Extended European Search Report dated Jan. 25, 2016", 11 pgs.
"European Application Serial No. 11797695.1, Partial Supplementary European Search Report dated Oct. 7, 2015", 6 pgs.
"European Application Serial No. 11797695.1, Response filed Jan. 9, 2019 to Communication Pursuant to Article 94(3) EPC dated Aug. 24, 2018", 11 pgs.
"European Application Serial No. 11797695.1, Response filed Aug. 22, 2016 to Office Action dated Feb. 11, 2016", 9 pgs.
"European Application Serial No. 12736074.1, Extended European Search Report dated Jul. 13, 2015", 8 pgs.
"European Application Serial No. 12736074.1, Response filed Oct. 2, 2015 to Extended European Search Report dated Jul. 13, 2015", 10 pgs.
"European Application Serial No. 12827918.9, Extended European Search Report dated Jul. 6, 2015", 6 pgs.
"European Application Serial No. 12827918.9, Response filed Sep. 28, 2015 to Extended European Search Report dated Jul. 6, 2015", 8 pgs.
"European Application Serial No. 13830357.3, Extended European Search Report dated Jun. 8, 2016", 5 pgs.
"European Application Serial No. 13830357.3, Response filed Dec. 23, 2016 to Extended European Search Report dated Jun. 8, 2016", 11 pgs.
"European Application Serial No. 13830940.6, Extended European Search Report dated Jul. 4, 2016", 5 pgs.
"European Application Serial No. 13830940.6, Response filed Jan. 16, 2017 to Communication Pursuant to Rules 70(2) and 70a(2) EPC dated Jul. 21, 2016", 1 pg.
"European Application Serial No. 14764192.2, Extended European Search Report dated Oct. 27, 2016", 7 pgs.
"European Application Serial No. 14764192.2, Response filed Jan. 30, 2017 to Extended European Search Report dated Oct. 27, 2016", 19 pgs.
"European Application Serial No. 14764192.2, Response filed Apr. 13, 2016 to Communication Pursuant Rules 161(2) and 162 EPC dated Nov. 19, 2015", 9 pgs.
"European Application Serial No. 14764305.0, Communication Pursuant to Article 94(3) EPC dated Feb. 14, 2019", 4 pgs.
"European Application Serial No. 14764305.0, Extended European Search Report dated Apr. 4, 2017", 8 pgs.

(56) References Cited

OTHER PUBLICATIONS

"European Application Serial No. 14764305.0, Response filed Apr. 13, 2016 to Communication Pursuant to Article 94(3) EPC dated Oct. 8, 2015", 10 pgs.
"European Application Serial No. 14764305.0, Response filed Jun. 21, 2019 to Communication Pursuant to Article 94(3) EPC dated Feb. 14, 2019", 24 pgs.
"European Application Serial No. 14764305.0, Response filed Oct. 31, 2017 to Extended European Search Report dated Apr. 4, 2017", 7 pgs.
"European Application Serial No. 14764318.3, Extended European Search Report dated Mar. 15, 2017", 10 pgs.
"European Application Serial No. 14764318.3, Response filed Jan. 28, 2016 to Communication pursuant to Rules 161(1) and 162 EPC dated Nov. 19, 2015", 17 pgs.
"European Application Serial No. 14764318.3, Response filed Oct. 10, 2017 to Extended European Search Report dated Mar. 15, 2017", 11 pgs.
"European Application Serial No. 14764713.5, Communication pursuant to Article 94(3) EPC dated Dec. 18, 2018", 3 pgs.
"European Application Serial No. 14764713.5, Extended European Search Report dated Dec. 9, 2016", 6 pgs.
"European Application Serial No. 14764713.5, Response filed Jan. 28, 2016 to Communication pursuant to Rules 161(1) and 162 EPC dated Dec. 2, 2015", 9 pgs.
"European Application Serial No. 14764713.5, Response filed Jun. 28, 2019 to Communication pursuant to Article 94(3) EPC dated Dec. 18, 2018", 8 pgs.
"European Application Serial No. 14764713.5, Response filed Jul. 13, 2017 to Extended European Search Report dated Dec. 9, 2016", 9 pgs.
"European Application Serial No. 14765396.8, Communication Pursuant to Article 94(3) EPC dated Dec. 5, 2018", 4 pgs.
"European Application Serial No. 14765396.8, Extended European Search Report dated Oct. 28, 2016", 6 pgs.
"European Application Serial No. 14765396.8, Office Action dated Nov. 20, 2015", 2 pgs.
"European Application Serial No. 14765396.8, Response filed Jan. 29, 2016 to Office Action dated Nov. 20, 2015", 12 pgs.
"European Application Serial No. 14765396.8, Response filed May 23, 2019 to Communication Pursuant to Article 94(3) EPC dated Dec. 5, 2018", 16 pgs.
"European Application Serial No. 14765396.8, Response filed May 25, 2017 to Extended European Search Report dated Oct. 28, 2016", 5 pgs.
"European Application Serial No. 15834201.4, Extended European Search Report dated Mar. 16, 2018", 8 pgs.
"European Application Serial No. 15834201.4, Response filed Oct. 9, 2017 to Communication Pursuant to Rules 161(2) and 162 EPC dated Mar. 29, 2017", 15 pgs.
"European Application Serial No. 15834201.4, Response filed Oct. 15, 2018 to Extended European Search Report dated Mar. 16, 2018", 17 pgs.
"European Application Serial No. 16795581.4, Extended European Search Report dated Feb. 12, 2019", 9 pgs.
"European Application Serial No. 16795581.4, Response filed Aug. 6, 2018 to Communication Pursuant to Rules 161(2) and 162 EPC dated Jan. 26, 2018", 16 pgs.
"European Application Serial No. 16795581.4, Response filed Sep. 11, 2019 to Extended European Search Report dated Feb. 12, 2019", 14 pgs.
"European Application Serial No. 16795582.2, Extended European Search Report dated Nov. 20, 2018", 8 pgs.
"European Application Serial No. 16795582.2, Response filed Jun. 17, 2019 to Extended European Search Report dated Nov. 20, 2018", 16 pgs.
"European Application Serial No. 16795582.2, Response filed Jul. 17, 2018 to Communication Pursuant to Rules 161(2) and 162 EPC dated Jan. 8, 2018", 12 pgs.

"European Application Serial No. 16813836.0, Communication Pursuant to Article 94(3) EPC dated Mar. 24, 2020", 5 pgs.
"European Application Serial No. 16813836.0, Extended European Search Report dated Mar. 25, 2019", 9 pgs.
"European Application Serial No. 16813836.0, Partial Supplementary European Search Report dated Dec. 5, 2018", 11 pgs.
"European Application Serial No. 16813836.0, Response filed Aug. 3, 2020 to Communication Pursuant to Article 94(3) EPC dated Mar. 24, 2020", 8 pgs.
"European Application Serial No. 16813836.0, Response to Extended European Search Report dated Mar. 25, 2019", 11 pgs.
"European Application Serial No. 17762365.9, Extended European Search Report dated Oct. 17, 2019", 8 pgs.
"European Application Serial No. 17762365.9, Response filed Apr. 25, 2019 to Communication Pursuant to Rules 161 and 162 dated Oct. 16, 2018", 12 pgs.
"European Application Serial No. 17762365.9, Response filed May 15, 2020 to Extended European Search Report dated Oct. 17, 2019", 13 pgs.
"European Application Serial No. 18153408.2, Communication Pursuant to Rule 55 EPC dated May 17, 2018", 2 pgs.
"European Application Serial No. 18153408.2, Extended European Search Report dated Dec. 4, 2018", 5 pgs.
"European Application Serial No. 18153408.2, Response filed Jul. 2, 2019 to Extended European Search Report dated Dec. 4, 2018", 12 pgs.
"European Application Serial No. 18160812.6, Communication Pursuant to Article 94(3) EPC dated Nov. 19, 2020", 4 pgs.
"European Application Serial No. 18160812.6, Extended European Search Report dated Feb. 11, 2019", 6 pgs.
"European Application Serial No. 18160812.6, Response filed Aug. 6, 2019 to Extended European Search Report dated Feb. 11, 2019", 23 pgs.
"European Application Serial No. 18211142.7, Extended European Search Report dated Apr. 11, 2019", 6 pgs.
"European Application Serial No. 18211142.7, Response filed Aug. 8, 2019 to Extended European Search Report dated Apr. 11, 2019", 10 pgs.
"European Application Serial No. 18214518.5, Extended European Search Report dated Apr. 17, 2019", 5 pgs.
"European Application Serial No. 18214518.5, Response filed Jul. 16, 2019 to Extended European Search Report dated Apr. 17, 2019", 3 pgs.
"European Application Serial No. 20180081.0, Extended European Search Report dated Sep. 28, 2020", 7 pgs.
"European Application Serial No. 21154403.6, Extended European Search Report dated Apr. 26, 2021", 8 pgs.
"Indian Application Serial No. 201717044889, First Examination Report dated Dec. 17, 2020", with English translation, 6 pages.
"Indian Application Serial No. 201717044890, First Examination Report dated Oct. 23, 2020", with English translation, 6 pages.
"Indian Application Serial No. 201817002765, First Examination Report dated Dec. 24, 2019", with English translation, 6 pages.
"Indian Application Serial No. 201817002765, Response filed Sep. 24, 2020 to First Examination Report dated Dec. 24, 2019", with English translation, 30 pages.
"International Application Serial No. PCT/CA2012/000055, International Preliminary Report on Patentability dated Aug. 1, 2013", 9 pgs.
"International Application Serial No. PCT/CA2012/000055, International Search Report dated May 24, 2012", 4 pgs.
"International Application Serial No. PCT/CA2012/000055, Invitation to Pay Add'l Fees and Partial Search Report dated Mar. 23, 2012", 2 pgs.
"International Application Serial No. PCT/CA2012/000055, Written Opinion dated May 24, 2012", 7 pgs.
"International Application Serial No. PCT/CA2012/00055, International Preliminary Report on Patentability dated Aug. 1, 2013", 9 pgs.
"International Application Serial No. PCT/CA2012/00055, International Search Report dated May 24, 2012", 4 pgs.
"International Application Serial No. PCT/CA2012/00055, Written Opinion dated May 24, 2012", 7 pgs.

(56) References Cited

OTHER PUBLICATIONS

"International Application Serial No. PCT/CA2012/000749, International Search Report dated Oct. 26, 2012", 3 pgs.
"International Application Serial No. PCT/CA2012/000749, Written Opinion dated Oct. 26, 2012", 5 pgs.
"International Application Serial No. PCT/CA2013/000608, International Preliminary Report on Patentability dated Mar. 5, 2015", 7 pgs.
"International Application Serial No. PCT/CA2013/000608, International Search Report dated Sep. 23, 2013", 3 pgs.
"International Application Serial No. PCT/CA2013/000608, Written Opinion dated Sep. 23, 2013", 5 pgs.
"International Application Serial No. PCT/CA2013/000609, International Preliminary Report on Patentability dated Mar. 5, 2015", 7 pgs.
"International Application Serial No. PCT/CA2013/000609, International Search Report dated Sep. 17, 2013", 3 pgs.
"International Application Serial No. PCT/CA2013/000609, Written Opinion dated Sep. 17, 2013", 5 pgs.
"International Application Serial No. PCT/CA2013/000964, International Search Report dated Feb. 7, 2014", 3 pgs.
"International Application Serial No. PCT/CA2013/000964, Written Opinion dated Feb. 7, 2014", 6 pgs.
"International Application Serial No. PCT/CA2014/000048, International Preliminary Report on Patentability dated Sep. 24, 2015", 8 pgs.
"International Application Serial No. PCT/CA2014/000048, International Search Report dated Apr. 29, 2014", 3 pgs.
"International Application Serial No. PCT/CA2014/000048, Written Opinion dated Apr. 29, 2014", 6 pgs.
"International Application Serial No. PCT/CA2014/000083, International Preliminary Report on Patentability dated Sep. 24, 2015", 9 pgs.
"International Application Serial No. PCT/CA2014/000083, International Search Report dated May 14, 2014", 3 pgs.
"International Application Serial No. PCT/CA2014/000083, Written Opinion dated May 14, 2014", 7 pgs.
"International Application Serial No. PCT/CA2014/000148, International Preliminary Report on Patentability dated Sep. 24, 2015", 5 pgs.
"International Application Serial No. PCT/CA2014/000148, International Search Report dated May 9, 2014", 4 pgs.
"International Application Serial No. PCT/CA2014/000148, Written Opinion dated May 9, 2014", 3 pgs.
"International Application Serial No. PCT/CA2014/000169, International Preliminary Report on Patentability dated Sep. 24, 2015", 8 pgs.
"International Application Serial No. PCT/CA2014/000169, International Search Report dated May 27, 2014", 3 pgs.
"International Application Serial No. PCT/CA2014/000169, Written Opinion dated May 27, 2014", 6 pgs.
"International Application Serial No. PCT/CA2014/000171, International Preliminary Report on Patentability dated Sep. 24, 2015", 7 pgs.
"International Application Serial No. PCT/CA2014/000171, International Search Report dated May 27, 2014", 3 pgs.
"International Application Serial No. PCT/CA2014/000171, Written Opinion dated May 27, 2014", 5 pgs.
"International Application Serial No. PCT/CA2015/050787, International Search Report dated Nov. 4, 2015", 3 pgs.
"International Application Serial No. PCT/CA2015/050787, Written Opinion dated Nov. 4, 2015", 3 pgs.
"International Application Serial No. PCT/CA2016/050252, International Preliminary Report on Patentability dated Nov. 30, 2017", 6 pgs.
"International Application Serial No. PCT/CA2016/050252, International Search Report dated May 26, 2016", 3 pgs.
"International Application Serial No. PCT/CA2016/050252, Written Opinion dated May 26, 2016", 4 pgs.
"International Application Serial No. PCT/CA2016/050507, International Preliminary Report on Patentability dated Nov. 30, 2017", 5 pgs.
"International Application Serial No. PCT/CA2016/050507, International Search Report dated Jul. 21, 2016", 3 pgs.
"International Application Serial No. PCT/CA2016/050507, Written Opinion dated Jul. 21, 2016", 3 pgs.
"International Application Serial No. PCT/CA2017/050180, International Preliminary Report on Patentability dated Sep. 20, 2018", 6 pgs.
"International Application Serial No. PCT/CA2017/050180, International Search Report dated Apr. 26, 2017", 3 pgs.
"International Application Serial No. PCT/CA2017/050180, Written Opinion dated Apr. 26, 2017", 4 pgs.
"International Application Serial No. PCT/IB2011/002145, International Preliminary Report on Patentability dated Jan. 10, 2013", 13 pgs.
"International Application Serial No. PCT/IB2011/002145, International Search Report dated Feb. 15, 2012", 7 pgs.
"International Application Serial No. PCT/IB2011/002145, Written Opinion dated Feb. 15, 2012", 11 pgs.
"International Application Serial No. PCT/IB2016/053799, International Preliminary Report on Patentability dated Jan. 4, 2018", 8 pgs.
"International Application Serial No. PCT/IB2016/053799, International Search Report dated Aug. 26, 2016", 3 pgs.
"International Application Serial No. PCT/IB2016/053799, Written Opinion dated Aug. 26, 2016", 6 pgs.
"International Application Serial No. PCT/US00/02956, International Preliminary Report on Patentability dated Jul. 9, 2001", 3 pgs.
"International Application Serial No. PCT/US00/02956, International Search Report dated Nov. 8, 2000", 1 pg.
"Meeting Programs", ASHRAE Technical Committee, (1997-2001), 13 pgs.
"Plane plate membrane contactor prototypes", University of Genoa, (Published prior to Mar. 28, 2013), 1 pg.
"Singapore Application Serial No. 11201710777Y, Office Action dated Jan. 31, 2019", in English, 7 pgs.
"Singapore Application Serial No. 11201710777Y, Response filed Jul. 1, 2019 to Office Action dated Jan. 31, 2019", in English, 31 pgs.
"Singaporean Application Serial No. 11201709404P, Response filed Jul. 22, 2019 to Written Opinion dated Feb. 22, 2019", in English, 62 pgs.
"Singaporean Application Serial No. 11201709404P, Written Opinion dated Feb. 22, 2019", in English, 8 pgs.
"Two-Wheel Desiccant Dehumidification System—Technology for Dehumidification and Improving Indoor Air Quality", Federal Technology Alert, (Apr. 1997), 24 pgs.
Abdel-Salam, Mohamed R.H., et al., "Design and testing of a novel 3-fluid liquid-to-air membrane energy exchanger (3-fluid LAMEE)", International Journal of Heat and Mass Transfer 92, (2016), 312-329.
Abdel-Salam, Mohamed R. H., et al., "Experimental Study of Effects of Phase-Change Energy and Operating Parameters on Performances of Two-Fluid and Three-Fluid Liquid-to-Air Membrane Energy Exchangers", ASHRAE Transactions, vol. 122, Part 1, (Jan. 2016), 134-145.
Abdel-Salam, Mohamed R. H., et al., "Performance testing of 2-fluid and 3-fluid liquid-to-air membrane energy exchangers for HVAC applications in cold-dry climates", International Journal of Heat and Mass Transfer, 106, (2017), 12 pgs.
Abdel-Salam, Mohamed R.H., et al., "Performance Testing of a Novel 3-Fluid Liquid-to-Air Membrane Energy Exchanger (3-Fluid LAMEE) for HVAC Applications", 28th Intl. Conference on Efficiency, Cost, Optimization, Simulation and Environmental Impact of Energy Systems (ECOS), Pau, France, (Jun. 30, 2015), 12 pgs.
Abdel-Salam, Mohamed R. H., et al., "Performance testing of a novel 3-fluid liquid-to-air membrane energy exchanger (3-fluid LAMEE) under desiccant solution regeneration operating conditions", International Journal of Heat and Mass Transfer, 95, (2015), 14 pgs.

(56) References Cited

OTHER PUBLICATIONS

Acker, William, "Industrial Dehumidification: Water Vapor Load Calculations and System Descriptions", HPAC Heating/Piping/Air Conditioning, (Mar. 1999), 49-59.
Bellia, L., et al., "Air Conditioning Systems With Desiccant Wheel for Italian Climates", International Journal on Architectural Science, vol. 1 No. 4, (2000), 193-213.
Bergero, Stefano, et al., "On the performances of a hybrid air-conditioning system in different climatic conditions", Energy 36(8), (2011), 13 pgs.
Bergero, Stefano, et al., "Performance analysis of a liquid desiccant and membrane contactor hybrid air-conditioning system", Energy and Buildings 42, (2010), 11 pgs.
Chant, Eileen E., et al., "A Steady-State Simulation of an Advanced Desiccant-Enhanced Cooling and Dehumidification System", ASHRAE Transactions: Research, (Jul. 1992), 339-347.
Coad, William J., "Conditioning Ventilation Air for Improved Performance and Air Quality", HPAC Heating/Piping/Air Conditioning, (Sep. 1999), 6 pgs.
Diblasio, Robert, "Desiccants in Hospitals—Conditioning a Research Facility", Engineered Systems, (Sep. 1995), 4 pgs.
Downing, et al., "Operation and Maintenance for Quality Indoor Air", Proc. of the 7th Symposium on Improving Building Systems in Hot and Humid Climates, Ft. Worth, TX, (Oct. 9, 1990), 5 pgs.
Downing, Chris, "Humidity Control—No Place Like Home", Engineered Systems, (1996), 4 pgs.
Erb, Blake, et al., "Experimental Measurements of a Run-Around Membrane Energy Exchanger (RAMEE) with Comparison to a Numerical Model", ASHRAE Transactions, vol. 115, Part 2, (2009), 689-705.
Fischer, J., et al., "Active Desiccant Dehumidification Module Integration With Rooftop Packaged HVAC Units—Final Report Phase 3B", Oak Ridge National Laboratory, Final Report: Phase 3B, (Mar. 2002), 36 pgs.
Fischer, John C., "Optimizing IAQ, Humidity Control, and Energy Efficiency in School Environments Through the Application of Desiccant-Based Total Energy Recovery Systems", IAQ Atlanta: Paths to Better Building Environments/Environmental Effects on Heath and Productivity, (1996), 16 pgs.
Harriman, III, et al., "Dehumidification and Cooling Loads From Ventilation Air", ASHRAE Journal, (Nov. 1997), 7 pgs.
Harriman, III, et al., "Evaluating Active Desiccant Systems for Ventilating Commercial Buildings", ASHRAE Journal, (Oct. 1999), 7 pgs.
Harriman, III, et al., "New Weather Data for Energy Calculations", ASHRAE Journal, (Mar. 1999), 7 pgs.
Jeong, et al., "Energy Conservation Benefits of a Dedicated Outdoor Air System with Parallel Sensible Cooling by Ceiling Radiant Panels", ASHRAE Transactions; vol. 109—Part 2, (2003), 10 pgs.
Karniadakis, George E., et al., "Minimum-dissipation transport enhancement by flow destabilization: Reynolds' analogy revisited", J. Fluid Meeh vol. 192, (1988), 365-391.
Kosar, Douglas R., et al., "Dehumidification Issues of Standard 62-1989", ASHRAE Journal, (Mar. 1998), 71-75.
Larson, Michael D., et al., "The elastic and moisture transfer properties of polyethylene and polypropylene membranes for use in liquid-to-air energy exchangers", Journal of Membrane Science 302, (2007), 14 pgs.
Larson, Michael David, et al., "The Performance of Membranes in a Newly Proposed Run-Around Heat and Moisture Exchanger", MS Thesis in Mechanical Engineering, University of Saskatchewan, Saskatoon, Canada, [Online] Retrieved from the internet: <URL: http://libran.usask.ca/theses/available/etd-12192006-094159/umestricted/LarsonThesis.pdf>, (Dec. 2006), 177 pgs.
Lepoudre, P., et al., "Channel Flow with Sinusoidal Screen Insert", Dept. of Meeh Engineering, Univ. of Saskatchewan, Proceedings of the 19th Annual Conference of the CFD Society of Canada, Montreal, (Apr. 2011), 6 pgs.
Mahmud, Khizir, "Design and Performance Testing of Counter-Cross-Flow Run-Around Membrane Energy Exchanger System", MS Thesis in Mechanical Engineering, University of Saskatchewan, Saskatoon, Canada, [Online] Retrieved form the internet: <URL: http://libranusask.ca/theses/ available/ etd-09092009-223833/umestricted/KhizirMahmud2009-Sep-28a.pdf>, (Sep. 2009), 168 pgs.
Mahmud, Khizir, et al., "Performance testing of a counter-cross-flow run-around membrane energy exchanger (RAMEE) system for HVAC applications", Energy and Buildings, 42, (2010), 9 pgs.
Mcgahey, Kevin, et al., "Desiccants: Benefits for the Second Century of Air Conditioning", Proceedings of the 10th Symposium on Improving Building Systems in Hot and Humid Climates, Ft. Worth, Texas, (May 14, 1996), 9 pgs.
Mcgahey, Kevin, "New Commercial Applications for Desiccant-Based Cooling", ASHRAE Journal, (Jul. 1998), 41-45.
Mumma, Stanley A., et al., "Achieving Dry Outside Air in an Energy-Efficient Manner", ASHRAE Transactions 2001, vol. 107, Part 1, (2001), 8 pgs.
Mumma, Stanley A., "Dedicated Outdoor Air-Dual Wheel System Control Requirements", ASHRAE Transactions, vol. 107, Part 1, (2001), 9 pgs.
Mumma, Stanley A., et al., "Extension of the Multiple Spaces Concept of ASH RAE Standard 62 to Include Infiltration, Exhaust/Exfiltration, Interzonal Transfer, and Additional Short-Circuit Paths", ASHRAE Transactions: Symposia, (1998), 1232-1241.
Mumma, Stanley A, "Overview of Integrating Dedicated Outdoor Air Systems With Parallel Terminal Systems", ASHRAE Transactions vol. 107, Part 1, (2001), 7 pgs.
Nimmo, B. G., et al., "DEAC: Desiccant Enhancement of Cooling-Based Dehumidification", ASHRAE Transactions: Symposia, (1993), 842-848.
Qin, C. K., et al., "Engine-driven Desiccant-assisted Hybrid Air-conditioning System", 23rd World Gas Conference, Amsterdam, (2006), 15 pgs.
Ryan, K., et al., "Three-dimensional transition in the wake of bluff elongated cylinders", J. Fluid Mech., vol. 538, (2005), 29 pgs.
Scofield, C. Mike, et al., "HVAC Design for Classrooms: Divide and Conquer", Heating/Piping/Air Conditioning, (May 1993), 53-59.
Sevigny, Scoot P., et al., "Air Handling Unit Direct Digital Control System Retrofit to Provide Acceptable Indoor Air Quality and Global Energy Optimization", Energy Engineering, vol. 94, No. 5, (1997), 24-43.
Shank, Kurt M., et al., "Selecting the Supply Air Conditions for a Dedicated Outdoor Air System Working in Parallel with Distributed Sensible Cooling Terminal Equipment", ASHRAE Transactions, vol. 107, Part 1, (2001), 10 pgs.
Smith, Christopher S., et al., "Outdoor Air, Heat Wheels and JC Penny: A New Approach to Retail Ventilation", Proc. of the 11th Symposium on Improving Building Systems in Hot and Humid Climates, Ft. Worth, Texas, (Jun. 2, 1998), 1 pg.
Smith, James C., "Schools Resolve IAQ/Humidity Problems with Desiccant Preconditioning", Heating/Piping/Air Conditioning, (Apr. 1996), 6 pgs.
Sonin, Ain A., et al., "Optimization of Flow Design in Forced Flow Electrochemical Systems, with Special Application to Electrodialysis", Ind. Eng. Chern, Process Des. Develop vol. 13, No. 3, (1974), 8 pgs.
Swails, James F., et al., "A Cure for Growing Pains", Consulting Specifying Engineer, [Online] Retrieved from the internet: <URL: https://www.csemag.com>, (Jun. 1997), 4 pgs.
Turpin, Joanna, "Dehumidification: The Problem No One Wants to Talk About", [Online] Retrieved from the internet: <URL: http//www.esmagazine.com/copyrighVde12c1c879ba8010VgnVCM100000f932a8c0_?>, (Apr. 5, 2000), 6 pgs.
Vali, Alireza, "Modeling a Run-Around Heat and Moisture Exchanger Using Two Counter/Cross Flow Exchangers", MS Thesis in Mechanical Engineering, University of Saskatchewan, Saskatoon, Canada, [Online] Retrieved from the internet: <URL: http://library.usask.ca/theses/mailable/etd-06032009-15-J.6-J.-1./unrestricted/Vali.AlirezaThesis.pdf>, (2009), 193 pgs.
Vali, Alireza, et al., "Numerical model and effectiveness correlations fora run-around heat recovery system with combined counter and cross flow exchangers", International Journal of Heat and Mass Transfer 52, (2009), 14 pgs.

(56) References Cited

OTHER PUBLICATIONS

Woods, J, et al., "Desiccant Enhanced Evaporative Air Conditioning: Parametric Analysis and Design", 2nd International Conference on Building Energy and Environment (COBEE), (Oct. 2012), 10 pgs.

Yborra, Stephen C., "Field Evaluation of Desiccant-Integrated HVAC Systems: A Review of Case Studies in Multiple Commercial/Institutional Building Types", Proc. of the 11th Symposium on Improving Building Systems in Hot and Humid Climates, Ft. Worth, Texas, (Jun. 2, 1998), 10 pgs.

"Canadian Application Serial No. 3,016,808, Non Final Office Action dated Mar. 9, 2022", 3 pages.

"U.S. Appl. No. 14/187,413, Notice of Allowance dated Mar. 29, 2022", 7 pages.

"European Application Serial No. 17762365.9, Response filed Apr. 19, 2022 to Communication Pursuant to Article 94(3) EPC dated Dec. 9, 2021", 29 pages.

"Canadian Application Serial No. 3,046,529, Response Filed Aug. 26, 2021 to Office Action dated Mar. 5, 2020", 15 pages.

"Canadian Application Serial No. 3,016,808, Voluntary Amendment dated Feb. 11, 2022.", 31 pages.

"U.S. Appl. No. 16/784,822, Response filed Feb. 28, 2022 to Restriction Requirement dated Dec. 27, 2021", 6 pages.

"Canadian Application Serial No. 2,880,350 Examiner's Rule 86 2 Requisition dated Jun. 20, 2022", 3 pgs.

"U.S. Appl. No. 17/855,344 Preliminary Amendment Filed with Application", 7 pgs.

"U.S. Appl. No. 17/855,413 Preliminary Amendment Filed with Application", 7 pgs.

"U.S. Appl. No. 16/784,822, Response filed Jul. 11, 2022 to Non Final Office Action dated Mar. 14, 2022", 9 pgs.

".S. Appl. No. 16/784,822, Final Office Action dated Jul. 26, 2022", 7 pgs.

"European Application Serial No. 21212796.3, Extended European Search Report dated Aug. 1, 2022", 11 pgs.

"European Application Serial No. 11797695.1, Response filed Jul. 20, 2022 to Communication Pursuant to Article 94(3) EPC dated Jan. 12, 2022", 10 pgs.

"Canadian Application Serial No. 2,986,058, Office Action dated Jul. 27, 2022", 3 pgs.

"Canadian Application Serial No. 3148296, Voluntary Amendment filed Jun. 30, 2022", 17 pgs.

"Canadian Application Serial No. 3,016,808, Response filed Jul. 11, 2022 to Non Final Office Action dated Mar. 9, 2022", wo Claims, 2 pgs.

"Canadian Application Serial No. 2,880,350, Response filed Oct. 6, 2022 to Examiner's Rule 86 2 Requisition dated May 20, 2022", 25 pgs.

"U.S. Appl. No. 16/784,822, Response filed Oct. 25, 2022 to Final Office Action dated Jul. 26, 2022", 5 pgs.

"U.S. Appl. No. 16/784,822, Notice of Allowance dated Nov. 9, 2022", 5 pgs.

"U.S. Appl. No. 17/168,928, Restriction Requirement dated Nov. 25, 2022", 9 pgs.

"Canadian Application Serial No. 3129123 Examinerts Rule 86 2 Report dated Nov. 25, 2022", 3 pgs.

"Canadian Application Serial No. 2,986,055, Office Action dated Dec. 12, 2022", 5 pgs.

"Canadian Application Serial No. 3148296, Examiners Rule 86(2) Requisition dated Dec. 9, 2022", 3 pgs.

"U.S. Appl. No. 17/855,344, Non Final Office Action dated Jan. 27, 2023", 15 pgs.

"U.S. Appl. No. 17/855,413, Non Final Office Action dated Jan. 27, 2023", 15 pgs.

"European Application Serial No. 21154403.6, Communication Pursuant to Article 94(3) EPC dated Mar. 21, 2023", 3 pgs.

LIQUID PANEL ASSEMBLY

CROSS REFERENCE TO RELATED APPLICATION

The present application is a continuation of U.S. application Ser. No. 15/590,685, filed May 9, 2017, entitled "Liquid Panel Assembly," which is a continuation of U.S. application Ser. No. 13/797,152, filed Mar. 12, 2013, entitled "Liquid Panel Assembly," which is a Non-Provisional and claims priority from U.S. Provisional Application Ser. No. 61/774,192 filed Mar. 7, 2013, entitled "Liquid Panel Assembly", which related and claims priority from U.S. Provisional Application Ser. No. 61/692,798 filed Aug. 24, 2012, entitled "Liquid Panel Assembly," which are hereby expressly incorporated by reference in their entirety.

BACKGROUND OF THE DISCLOSURE

Embodiments of the present disclosure generally relate to a liquid panel assembly, and more particularly, to a liquid panel assembly configured for use with an energy exchanger.

Enclosed structures, such as occupied buildings, factories and the like, generally include a heating/ventilation/air conditioning (HVAC) system for conditioning outdoor ventilated and/or recirculated air. The HVAC system includes a supply air flow path and an exhaust air flow path. The supply air flow path receives pre-conditioned air, for example outside air or outside air mixed with re-circulated air, and channels and distributes the pre-conditioned air into the enclosed structure. The pre-conditioned air is conditioned by the HVAC system to provide a desired temperature and humidity of supply air discharged into the enclosed structure. The exhaust air flow path discharges air back to the environment outside the structure. Without energy recovery, conditioning the supply air typically requires a significant amount of auxiliary energy, particularly in environments having extreme outside air conditions that are much different than the required supply air temperature and humidity. Accordingly, energy exchange or recovery systems are used to recover energy from the exhaust air flow path. Energy recovered from air in the exhaust flow path is utilized to reduce the energy required to condition the supply air.

Conventional energy exchange systems may utilize energy recovery devices (for example, energy wheels and permeable plate exchangers) or heat exchange devices (for example, heat wheels, plate exchangers, heat-pipe exchangers and run-around heat exchangers) positioned in both the supply air flow path and the return air flow path. Liquid-to-air membrane energy exchangers (LAMEEs) may be fluidly coupled so that a desiccant liquid flows between the LAMEEs in a run-around loop, similar to run-around heat exchangers that typically use aqueous glycol as a coupling fluid.

In general, a LAMEE transfers heat and moisture between a liquid desiccant solution and air through a thin flexible membrane. A flat plate LAMEE includes a series of alternating liquid desiccant and air channels separated by the membrane. Typically, the pressure of the liquid within a liquid channel between membranes is higher than that of the air pressure outside of the membranes. As such, the flexible membranes tend to outwardly bow or bulge into the air channel(s).

In order to avoid excessive restriction of the air flow due to membrane bulge, air channels of a LAMEE are relatively wide compared to the liquid channels. Moreover, a support structure is generally provided between membranes to limit the amount of membrane bulge. However, the relatively wide air channels and support structures typically diminish the performance of the LAMEE. In short, resistance to heat and moisture transfer in the air channel is relatively high due to the large air channel width, and the support structure may block a significant amount of membrane transfer area. Accordingly, a large amount of membrane area is needed to meet performance objectives, which adds costs and results in a larger LAMEE. Moreover, the support structure within an air channel may produce an excessive pressure drop, which also adversely affects operating performance and efficiency of the LAMEE.

Typically, desiccant flows through a solution panel, which may include membranes that contain the desiccant between air channels. In general, the solution panel is uniformly full of desiccant during operation. Known energy exchangers force flow of desiccant upwardly through the solution panel, against the force of gravity. As such, the desiccant is typically pumped from the bottom of the solution panel to the top with enough pressure to overcome the relatively large amount of static head pressure, as well as the friction in the panel. However, the pumping pressure causes the membranes of the solution panel to outwardly bow or bulge. Moreover, the pumping pressure is often great enough to cause leaks in the membranes. Further, the pressure of the desiccant being pumped through the solution panel often causes membrane creep and degradation over time.

A typical solution panel also includes a filler material, such as a wick or woven plastic screen, configured to ensure proper spacing between membrane surfaces within the solution panel. The flow of the desiccant through the filler material is generally uncontrolled. For example, the filler material is generally unable to direct the desiccant over a particular path. Instead, the flow of desiccant through the filler material follows the path of least resistance, which generally follows a Hele-Shaw pattern between closed-spaced plates. Further, the flow pattern of the desiccant is sensitive to variations in the spacing within the solution panel caused by even small amounts of membrane bulge. Also, fluid instabilities from concentration and temperature gradients may cause additional flow irregularities and maldistributions. The winding flow pattern within a typical solution panel produces flow dead zones at or proximate corners of the solution panel.

As noted, in order to ensure that desiccant completely fills the solution panel from bottom to top, a relatively high pumping pressure is used. However, the pumping pressure may often generate membrane bulge and bowing, which may adversely affect the energy exchanger.

SUMMARY OF THE DISCLOSURE

Certain embodiments of the present disclosure provide a liquid panel assembly, which may be configured to be used with an energy exchanger, for example. The liquid panel assembly may include a support frame having one or more fluid circuits and at least one membrane secured to the support frame. Each fluid circuit may include an inlet channel connected to an outlet channel through one or more flow passages, such as counterflow passages (in that liquid in the counterflow passages counterflows with respect to another fluid, such as air, outside of the at least one membrane). A liquid, such as a desiccant, is configured to flow through the fluid circuit(s) and contact interior surfaces of the membrane(s). The fluid circuit(s) is configured to offset hydrostatic pressure gain with friction pressure loss of the liquid that flows within the one or more fluid circuits to reduce pressure within the liquid panel assembly.

The shape, porosity, and/or hydraulic diameter of one or both of the inlet and outlet channels may be determined by a weight, viscosity, and/or flow speed of the liquid that is configured to flow through the fluid circuit(s). For example, if the liquid is heavy, the diameters of the channels may be reduced in order to promote faster liquid flow therethrough, which generates increased friction that offsets the liquid hydrostatic pressure.

The flow passages may include a set of a plurality of flow passages connected to the inlet channel and the outlet channel. A number of flow passages within the set of a plurality of flow passages may be determined by a weight and/or viscosity of the liquid that is configured to flow through the fluid circuit(s).

The fluid circuit(s) may include a plurality of fluid circuits. The lengths of each of the fluid circuits may be equal. The plurality of fluid circuits may include a first set of a plurality of flow passages connected to a first inlet channel and a first outlet channel, and a second set of a plurality of flow passages connected to a second inlet channel and a second outlet channel. The first set of a plurality of flow passages may be staggered with respect to the second set of a plurality of flow passages.

Each of the inlet and outlet channels may provide a flow alignment vane configured to direct the liquid to flow along a particular path. The inlet and outlet channels may be configured to provide support to the membrane(s). The inlet and outlet channels may be configured to provide a sealing surface for at least a portion of the membrane(s). The inlet and outlet channels may be configured to maximize a length of the flow passages.

The membrane(s) may be continuously bonded around a perimeter of the support frame. The fluid circuits may be configured to provide uniform liquid flow distribution across and/or through the liquid panel assembly. The support frame and the membrane may be configured to be vertically oriented within an energy exchange cavity of an energy exchanger.

The inlet channel may be disposed at an upper corner of the support frame. The outlet channel may be disposed at a lower corner of the support frame. The upper corner may be diagonally located from the lower corner. The inlet and outlet channels may be vertical and the flow passages(s) may be horizontal. A horizontal length of the flow passage(s) may exceed half a total horizontal length of the support frame. The assembly may also include inlet and outlet members, such as headers, connected to the fluid circuit(s). The inlet and outlet members may include a liquid delivery channel and a liquid passage channel, respectively. The inlet member may be configured to modularly engage another inlet member, and the outlet member may be configured to modularly engage another outlet member. At least a portion of the membrane(s) may sealingly engage the inlet and outlet members.

Alternatively, the support frame and the membrane may be configured to be horizontally oriented within an energy exchange cavity of an energy exchanger.

The inlet channel may be disposed at one corner of the support frame. The outlet channel may be disposed at another corner of the support frame. The first corner may be diagonally located from the second corner. The inlet and outlet channels may be vertical and the flow passages(s) may be horizontal. A horizontal length of the flow passage(s) may exceed half a total horizontal length of the support frame.

The assembly may also include inlet and outlet members, such as headers, connected to the fluid circuit(s). The inlet member may fluidly engage all inlet channels and the outlet member may fluidly engage all outlet channels.

Alternatively, the flow passages in one or more panels can be fluidly connected to members, such as headers. One or more of these members can be fluidly connected to flow channels. Inlet channels can be fluidly connected to inlet members which can, in turn, be connected to flow passages. The flow passages can be fluidly connected to outlet members, such as headers, which are, in turn, connected to outlet channels.

Certain embodiments of the present disclosure provide an energy exchange system that may include a plurality of air channels configured to allow air to pass therethrough, and a plurality of liquid panel assemblies alternately spaced with the plurality of liquid panel assemblies. The system may also include a plurality of membrane support assemblies disposed within the plurality of air channels. Air within the air channels may be configured to counterflow with respect to the liquid within the one or more flow passages.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As explained in detail below, embodiments of the present disclosure provide liquid panel assemblies that are configured to balance internal liquid hydrostatic pressure and frictional forces. As such, the total pressure within the liquid panel assemblies may be reduced, negated or otherwise neutralized. Embodiments of the present disclosure provide a liquid panel assembly that may be configured, through selection of a number, orientation, shape, and/or the like of flow channels or passages, to ensure that pressure within the assembly is substantially reduced, negated, or otherwise neutralized. That is, the pressure may be reduced, negated, or otherwise neutralized to a greater extent than a negligible amount. Thus, membrane bulge is substantially reduced (that is, more than a negligible amount) or eliminated, which reduces the potential for leaks and membrane creep.

Figure 1:
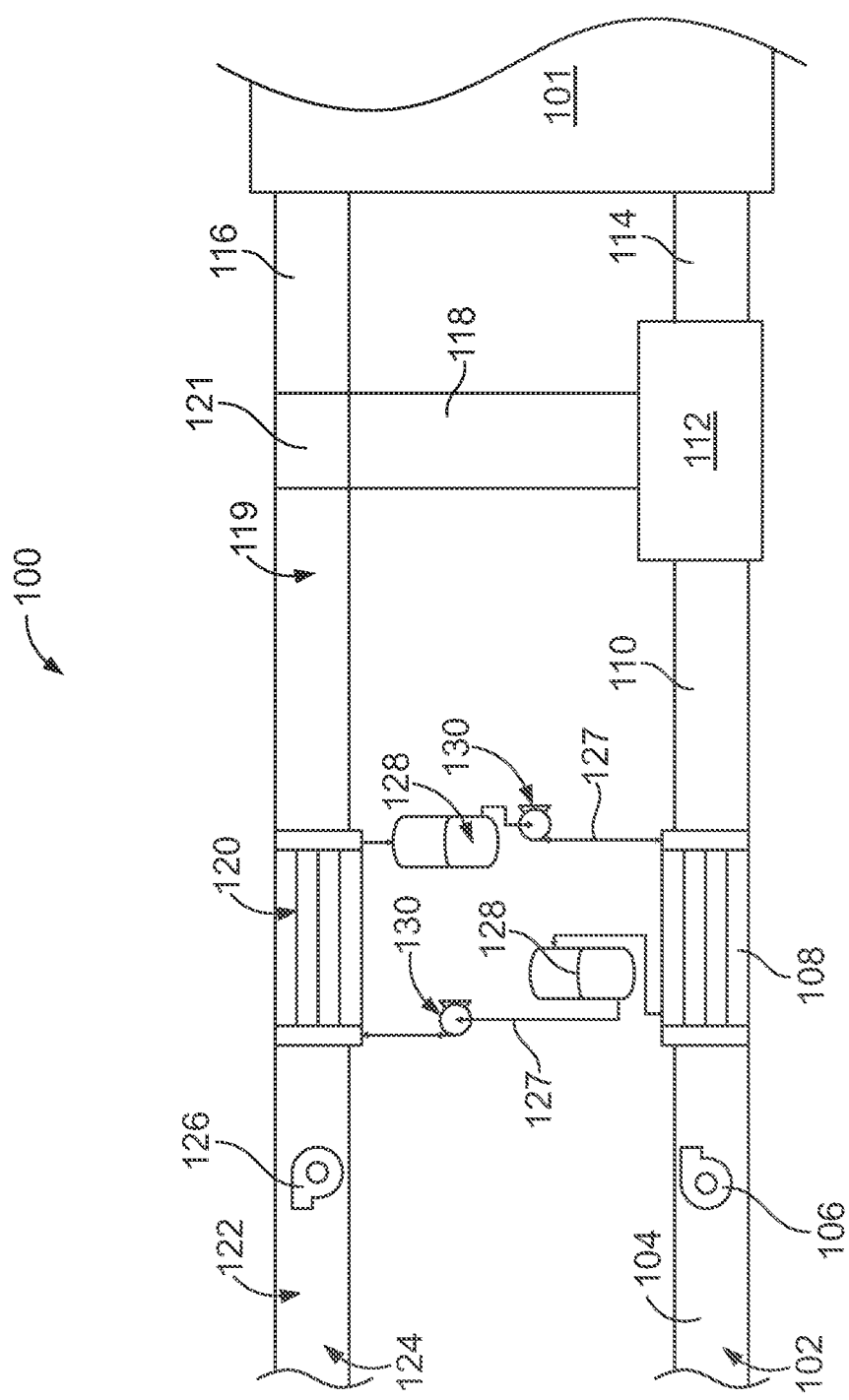
FIG. 1 illustrates a schematic view of an energy exchange system, according to an embodiment of the present disclosure.

FIG. 1 illustrates a schematic view of an energy exchange system 100, according to an embodiment of the present disclosure. The system 100 is configured to partly or fully condition air supplied to a structure 101. The system 100 may include an inlet 102 for a pre-conditioned air flow path 104. The pre-conditioned air flow path 104 may include outside air, air from a building adjacent to the enclosed structure 101, or air from a room within the enclosed structure 101. Airflow in the pre-conditioned air flow path 104 may be moved through the pre-conditioned air flow path 104 by a fan 106. The fan 106 directs the pre-conditioned air flow through path 104 to a supply air liquid-to-air membrane energy exchanger (LAMEE) 108. The supply air LAMEE 108 conditions the pre-conditioned air flow in path 104 to generate a change in air temperature and humidity (i.e. to pre-conditioned the air partly or fully) toward that which is required for a supply air flow condition to be discharged into the enclosed space 101. During a winter mode operation, the supply air LAMEE 108 may condition the pre-conditioned air flow path 104 by adding heat and moisture to the pre-conditioned air in flow path 104. In a summer mode operation, the supply air LAMEE 108 may condition the pre-conditioned air flow path 104 by removing heat and moisture from the pre-conditioned air in flow path 104. The pre-conditioned air 110 may be channeled to an HVAC system 112 of the enclosed structure 101. The HVAC system 112 may further condition the pre-conditioned air 110 to generate the desired temperature and humidity for the supply air 114 that is supplied to the enclosed structure 101.

As shown in FIG. 1, one fan 106 may be located upstream of the LAMEE 108. Optionally, the pre-conditioned air flow path 104 may be moved by a down-stream fan and/or by multiple fans or a fan array or before and after each LAMEE in the system.

Return air 116 is channeled out of the enclosed structure 101. A mass flow rate portion 118 of the return air 116 may be returned to the HVAC system 112. Another mass flow rate portion 119 of the return air 116 may be channeled to a return air or regeneration LAMEE 120. The portions 118 and 119 may be separated with a damper 121 or the like. For example, 80% of the return air 116 may be channeled to the HVAC system 112 and 20% of the return air 116 may be channeled to the return air LAMEE 120. The return air LAMEE 120 exchanges energy between the portion 119 of the return air 116 and the preconditioned air 110 in the supply air LAMEE 108. During a winter mode, the return air LAMEE 120 collects heat and moisture from the portion 119 of the return air 116. During a summer mode, the return air LAMEE 120 discharges heat and moisture into the portion 119 of the return air 116. The return air LAMEE 120 generates exhaust air 122. The exhaust air 122 is discharged from the structure 101 through an outlet 124. A fan 126 may be provided to move the exhaust air 122 from the return air LAMEE 120. The system 100 may include multiple fans 126 or one or more fan arrays located either up-stream or down-stream (as in FIG. 1) of the return air LAMEE 120.

A liquid, such as a desiccant fluid 127, flows between the supply air LAMEE 108 and the return air LAMEE 120. The desiccant fluid 127 transfers the heat and moisture between the supply air LAMEE 108 and the return air LAMEE 120. The system 100 may include desiccant storage tanks 128 in fluid communication between the supply air LAMEE 108 and the return air LAMEE 120. The storage tanks 128 store the desiccant fluid 127 as it is channeled between the supply air LAMEE 108 and the return air LAMEE 120. Optionally, the system 100 may not include both storage tanks 128 or may have more than two storage tanks. Pumps 130 are provided to move the desiccant fluid 127 from the storage tanks 128 to one of the supply air LAMEE 108 or the return air LAMEE 120. The illustrated embodiment includes two pumps 130. Optionally, the system 100 may be configured with as few as one pump 130 or more than two pumps 130. The desiccant fluid 127 flows between the supply air LAMEE 108 and the return air LAMEE 120 to transfer heat and moisture between the conditioned air 110 and the portion 118 of the return air 116.

Figure 2:
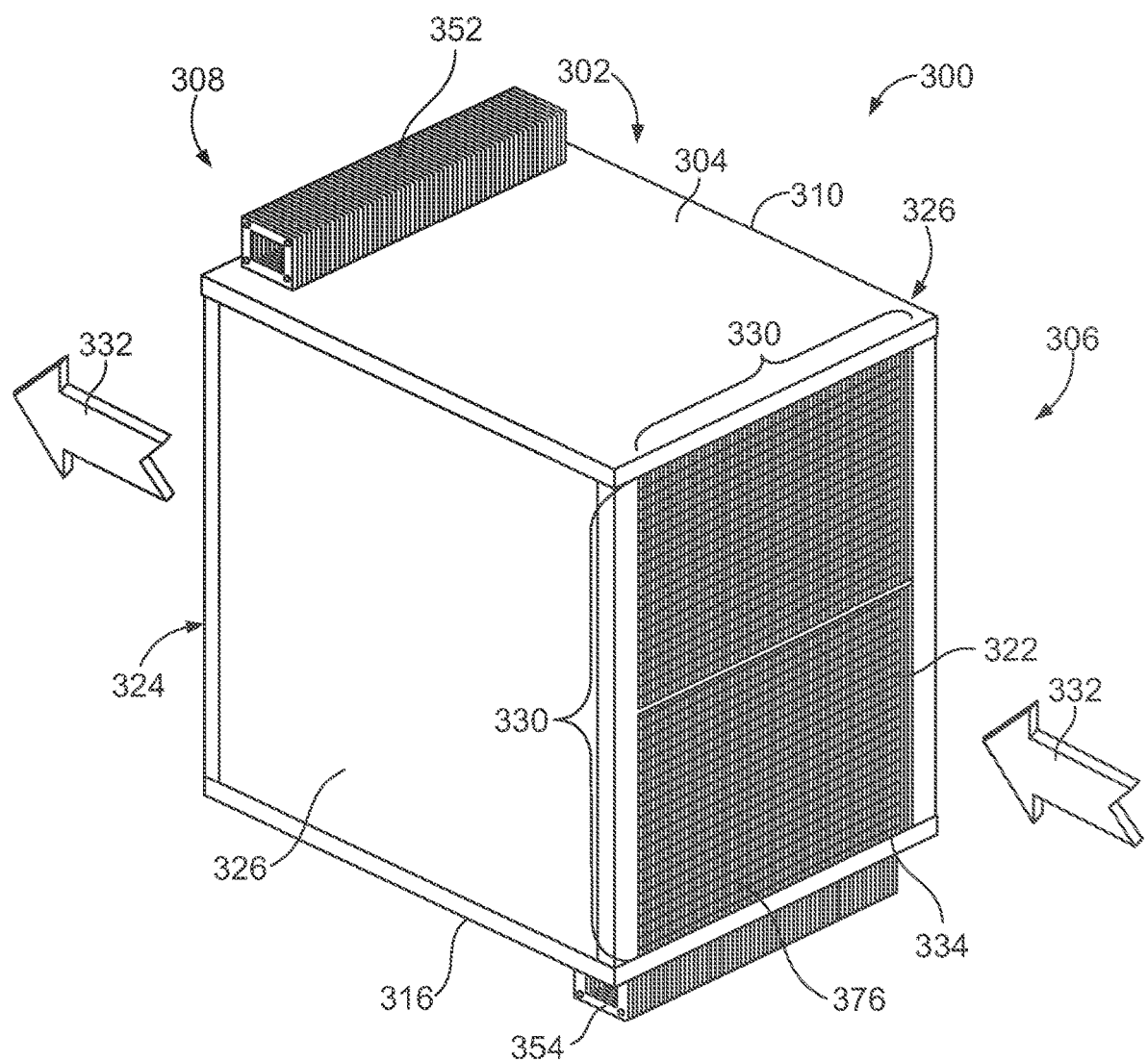
FIG. 2 illustrates a side perspective view of a liquid-to-air membrane energy exchanger, according to an embodiment of the present disclosure.

FIG. 2 illustrates a side perspective view of a LAMEE 300, according to an embodiment. The LAMEE 300 may be used as the supply air LAMEE 108 and/or the return or exhaust air LAMEE 120 (shown in FIG. 1). The LAMEE 300 includes a housing 302 having a body 304. The body 304 includes an air inlet end 306 and an air outlet end 308. A top 310 extends between the air inlet end 306 and the air outlet end 308. While note shown, a stepped-down top may be positioned at the air inlet end 306. The stepped-down top may be stepped a distance from the top 310. A bottom 316 extends between the air inlet end 306 and the air outlet end 308. While not shown, a stepped-up bottom may be positioned at the air outlet end 308. The stepped-up bottom may be stepped a distance from the bottom 316. In alternative designs the stepped-up bottom or stepped-down top sections may have different sizes of steps or no step at all.

An air inlet 322 is positioned at the air inlet end 306. An air outlet 324 is positioned at the air outlet end 308. Sides 326 extend between the air inlet 322 and the air outlet 324.

An energy exchange cavity 330 extends through the housing 302 of the LAMEE 300. The energy exchange cavity 330 extends from the air inlet end 306 to the air outlet end 308. An air stream 332 is received in the air inlet 322 and flows through the energy exchange cavity 330. The air stream 332 is discharged from the energy exchange cavity 330 at the air outlet 324. The energy exchange cavity 330 may include a plurality of panels 334, such as liquid panels configured to receive desiccant and direct the flow of the desiccant therethrough.

A desiccant inlet reservoir 352 may be positioned on the top 310. The desiccant inlet reservoir 352 may be configured to receive desiccant, which may be stored in a storage tank 128 (shown in FIG. 1). The desiccant inlet reservoir 352 may include an inlet in flow communication with the storage tank 128. The desiccant is received through the inlet. The desiccant inlet reservoir 352 may also include an outlet that is in fluid communication with desiccant channels 376 of the panels 334 in the energy exchange cavity 330. The liquid desiccant flows through the outlet into the desiccant channels 376. The desiccant flows along the panels 334 through the desiccant channels 376 to a desiccant outlet reservoir 354, which may be positioned at or proximate the bottom 316. Accordingly, the desiccant may flow through the LAMEE 300 from top to bottom. For example, the desiccant may flow into the desiccant channels 376 proximate the desiccant inlet reservoir 352, through the desiccant channels 376, and out of the LAMEE 300 proximate to the desiccant outlet reservoir 354. In an alternative embodiment, the desiccant may flow through the LAMEE 300 from bottom to top.

Figure 3:
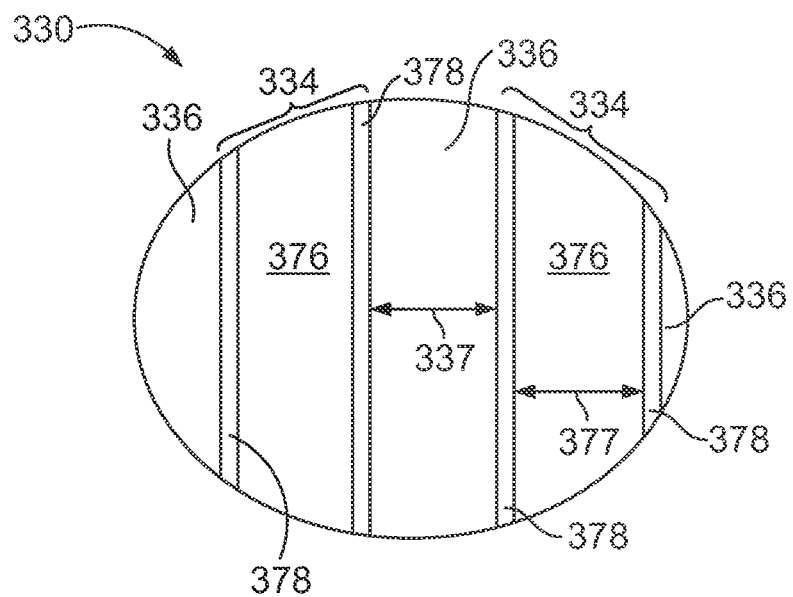
FIG. 3 illustrates a cut-away front view of panels within an energy exchange cavity of a liquid-to-air membrane energy exchanger, according to an embodiment of the present disclosure.

FIG. 3 illustrates a cut-away front view of the panels 334 within the energy exchange cavity 330 of the LAMEE 300, according to an embodiment. The panels 334 may be solution or liquid panels configured to direct the flow of liquid, such as desiccant, therethrough, as explained below. The panels 334 form a liquid desiccant flow path 376 that is confined by semi-permeable membranes 378 on either side and is configured to carry desiccant therethrough. The membranes 378 may or may not be porous or able to transfer mass. Each membrane 378 may be any flexible structure that may generally bulge under fluid pressure. The semi-permeable membranes 378 are arranged in parallel to form air channels 336 with an average flow channel width of 337 and liquid desiccant channels 376 with an average flow channel width of 377. In one embodiment, the semi-permeable membranes 378 are spaced to form uniform air channels 336 and liquid desiccant channels 376. The air stream 332 (shown in FIG. 2) travels through the air channels 336 between the semi-permeable membranes 378. The desiccant in each desiccant channel 376 exchanges heat and moisture with the air stream 332 in the air channels 336 through the semi-permeable membranes 378. The air channels 336 alternate with the liquid desiccant channels 376. Except for the two side panels of the energy exchange cavity, each air channel 336 may be positioned between adjacent liquid desiccant channels 376.

In order to minimize or otherwise eliminate the liquid desiccant channels 376 from outwardly bulging or bowing, membrane support assemblies may be positioned within the air channels 336. The membrane support assemblies are configured to support the membranes, and may promote turbulent air flow between the air channels 336 and the membranes 378.

As an example, the LAMEE 300 may be similar to a LAMEE as described in WO 2011/161547, entitled "Liquid-To-Air Membrane Energy Exchanger," filed Jun. 22, 2011, which is hereby incorporated by reference in its entirety.

Figure 4:
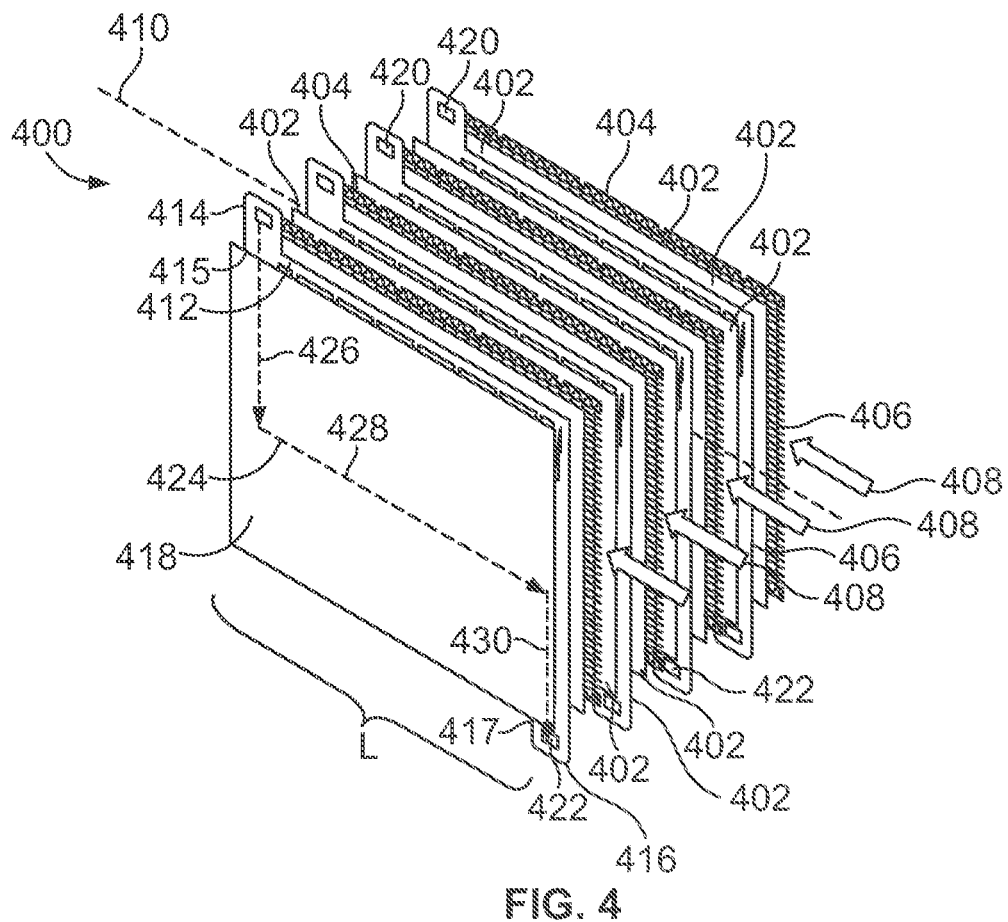
FIG. 4 illustrates an exploded isometric top view of an energy exchange cavity, according to an embodiment of the present disclosure.

FIG. 4 illustrates an exploded isometric top view of an energy exchange cavity 400, according to an embodiment. The energy exchange cavity 400 may include a plurality of liquid panel assemblies 402 spaced apart from one another by membrane support assemblies 404, such as those described in U.S. patent application Ser. No. 13/797,062, entitled "Membrane Support Assembly for an Energy Exchanger," filed Mar. 12, 2013, which claims priority to U.S. Provisional Application No. 61/692,793, entitled "Membrane Support Assembly for an Energy Exchanger," filed Aug. 24, 2012, both of which are hereby incorporated by reference in their entireties. The membrane support assemblies 404 may reside in air channels 406. For example, the membrane support assemblies 404 may prevent membranes 418 of the solution panel assemblies 402 from outwardly bulging or bowing into the air channels 406. Airflow 408 is configured to pass through the air channels 406 between liquid panel assemblies 402. As shown, the airflow 408 may generally be aligned with a horizontal axis 410 of the energy exchange cavity 400. Thus, the airflow 408 may be horizontal with respect to the energy exchange cavity 400. Notably, however, the membrane support assemblies 404 may include turbulence promoters configured to generate turbulence, eddies, and the like in the airflow 408 within the energy exchange cavity 400.

Each liquid panel assembly 402 may include a support frame 412 connected to an inlet member 414 at an upper corner 415 and an outlet member 416 at a lower corner 417 that may be diagonal to the upper corner 415. Further, membranes 418 are positioned on each side of the support frame 412. The membranes 418 are formed of a liquid impermeable, but air permeable, material. The membranes 418 sealingly engage the support frame 412 along outer edges in order to contain liquid within the liquid panel assembly 402. Alternatively, a single membrane may sealingly wrap around an entirety of the support frame 412.

Each inlet member 414 may include a liquid delivery opening 420, while each outlet member 416 may include a liquid passage opening 422. The liquid delivery openings 420 may be connected together through conduits, pipes, or the like, while the liquid passage openings 422 may be connected together through conduits, pipes, or the like. Optionally, the inlet members 414 and outlet members 416 may be sized and shaped to directly mate with one another so that a liquid-tight seal is formed therebetween. Accordingly, liquid, such as desiccant may flow through the liquid delivery openings 420 and the liquid passage openings 422. The inlet members 414 and outlet members 416 may be modular components configured to selectively couple and decouple from other inlet members 414 and outlet members 416, respectively. For example, the inlet members 414 and outlet members 416 may be configured to securely mate with other inlet members 414 and outlet members 416, respectively, through snap and/or latching connections, or through fasteners and adhesives.

As shown, the liquid panel assemblies 402, the membrane support assemblies 404, and the air channels 406 may all be vertically oriented. The liquid panel assemblies 402 may be flat plate exchangers that are vertically-oriented with respect to a base that is supported by a floor, for example, of a structure.

Alternatively, the liquid panel assemblies 402, the membrane support assemblies 404, and the air channels 406 may all be horizontally oriented. For example, the liquid panel assemblies 402 may be flat plate exchangers that are horizontally-oriented with respect to a base that is supported by a floor, for example, of a structure.

In operation, liquid, such as desiccant, flows into the liquid delivery openings 420 of the inlet members 414. For example, the liquid may be pumped into the liquid delivery openings 420 through a pump. The liquid then flows into the support frames 412 through a liquid path 424 toward the outlet members 416. As shown, the liquid path 424 includes a vertical descent 426 that connects to a horizontal, flow portion, such as a flow portion 428, which, in turn, connects to a vertical descent 430 that connects to the liquid passage opening 422 of the outlet member 416. The vertical descents 426 and 430 may be perpendicular to the horizontal, flow portion 428. As such, the liquid flows through the solution panel assemblies 402 from the top corners 415 to the lower corners 417. As shown, the length of the horizontal, flow portion 428 substantially exceeds half the length L of the liquid panel assemblies 402. The horizontal, flow portion 428 provides liquid, such as desiccant, that may counterflow with respect to the airflow 408. Alternatively, the flow portion may be a crossflow, parallel-aligned flow, or other such flow portion, for example.

The airflow 408 that passes between the liquid panel assemblies 402 exchanges energy with the liquid flowing through the liquid panel assemblies 402. The liquid may be a desiccant, refrigerant, or any other type of liquid that may be used to exchange energy with the airflow 408.

The energy exchange cavity 400 may include more or less liquid panel assemblies 402, membrane support assemblies 404, and air channels 406 than those shown in FIG. 4. The inlet and outlet members 414 and 416 may be modular panel headers that are configured to selectively attach and detach from neighboring inlet and outlet members 414 and 416 to provide a manifold for liquid to enter into and pass out of the liquid panel assemblies 402. Sealing agents, such as gaskets, silicone gel, or the like, may be disposed between neighboring inlet members 414 and neighboring outlet members 416. At least a portion of the membrane sealingly engages the inlet and outlet members 414 and 416. The liquid panel assembly 402 formed in this manner provides a fully-sealed, stand-alone unit having openings at the inlet and outlet members 414 and 416, notably the openings 420 and 422, respectively. Accordingly, the liquid panel assembly 402 may be pre-tested for leaks and membrane holes prior to being positioned within an energy exchange cavity, for example.

Figure 5:
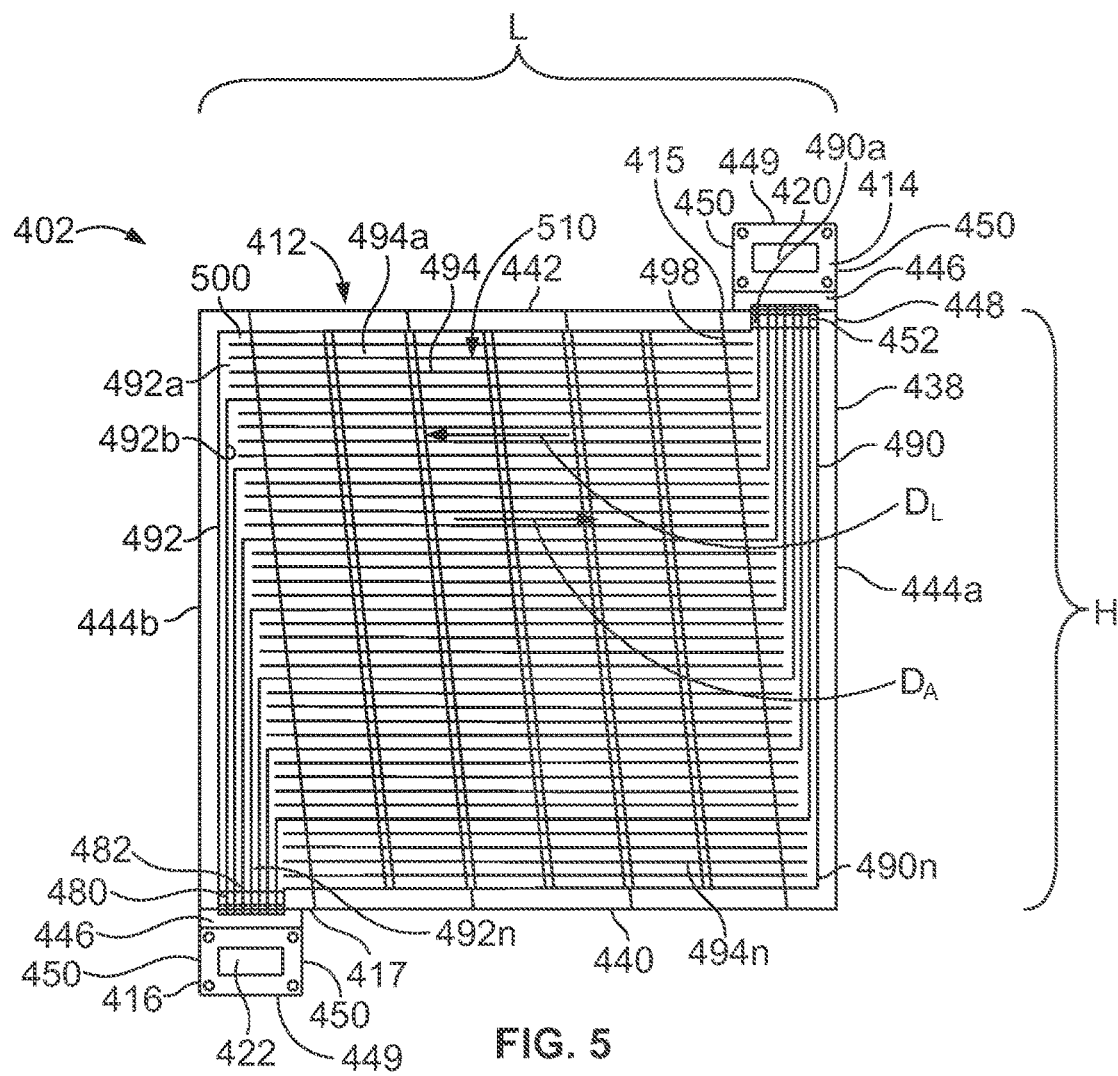
FIG. 5 illustrates a front view of a support frame of a liquid panel assembly, according to an embodiment of the present disclosure.

FIG. 5 illustrates a front view of the support frame 412 of the liquid panel assembly 400, according to an embodiment. For the sake of clarity, the membranes 418 secured to the liquid panel assembly 400 are not shown. However, it is to be understood that at least one membrane 418 is bonded to the front and back surfaces of the support frame 412. For example, the membrane 418 may be continuously bonded around the perimeter of the support frame 412, thereby creating a robust external seal.

The support frame 412 includes a main body 438 having a lower edge 440 connected to an upper edge 442 through lateral edges 444. The support frame 412 may be formed of various materials, such as injection molded plastic, metal, or a combination thereof. The support frame 412 may be integrally formed and manufactured as a single piece through a single molding process, for example. For example, the inlet and outlet members 414 and 416, respectively, may be integrally molded with the support frame 412. Optionally, the support frame 412 may be formed as separate and distinct pieces. For example, the support frame 412 may be extruded and assembled from various parts.

The inlet member 414 includes a base 446 that connects to a support inlet 448 proximate the upper corner 415. The upper corner 415 may include a channel configured to receive and retain the base 446. For example, the base 446 may fit into the channel and be securely fastened therein, such as through fasteners, adhesives, or the like. Optionally, as noted above, the base 446 may simply be integrally formed and molded with the upper corner 415. The base 446 supports and connects to an upper wall 449 through lateral walls 450. The base 446, the upper wall 449, and the lateral walls 450 define the liquid-delivery opening 420. Liquid passages (hidden from view in FIG. 5) are formed through the base 446 and connect the liquid-delivery opening 420 to a liquid-reception area 452 formed at the upper corner 415 of the support frame 412.

Figure 6:
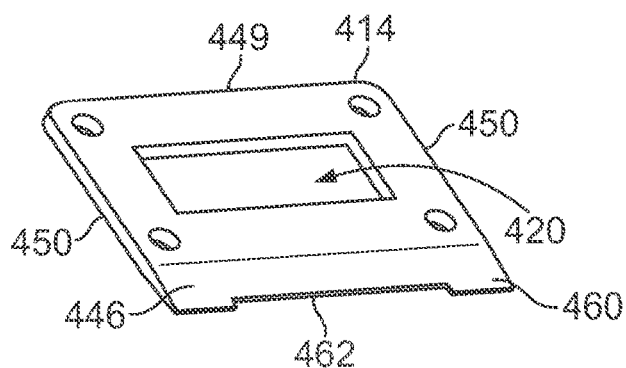
FIG. 6 illustrates an isometric top view of an inlet member, according to an embodiment of the present disclosure.

FIG. 6 illustrates an isometric top view of the inlet member 414, according to an embodiment. As shown, a lower edge 460 of the base 446 may be tapered or beveled, which allows the base 446 to be easily mated into a reciprocal channel of the support inlet 448 (shown in FIG. 5). An opening 462 is formed at a terminal end of the beveled lower edge 460. The opening 462 connects to liquid passages (hidden from view in FIG. 6) that connect to an opening (hidden from view in FIG. 6) that connects to the liquid delivery opening 420. Accordingly, liquid may pass from the liquid delivery opening 420, out through the opening 462 of the base 446 and into the support inlet 448 of the support frame 412.

Figure 7:
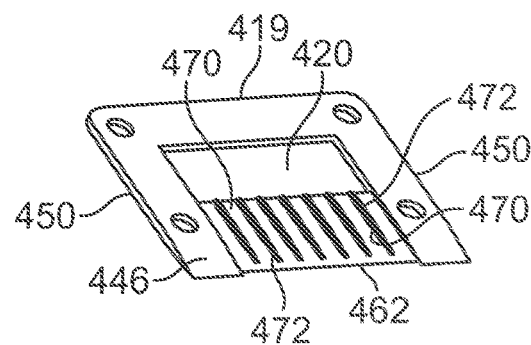
FIG. 7 illustrates an internal view of an inlet member, according to an embodiment of the present disclosure.

FIG. 7 illustrates an internal view of the inlet member 414, according to an embodiment. As shown in FIG. 7, the opening 462 is in communication with a plurality of liquid passages 470 separated by guide ribs 472. The liquid passages 470 are configured to align with liquid inlet channels of the support frame 412. While eight liquid passages 470 are shown in FIG. 7, more or less liquid passages 470 may be used, depending on the number of liquid inlet channels of the support frame 412.

Referring again to FIG. 5, the outlet member 416 is similarly constructed to the inlet member 414. The inlet and outlet members 414 and 416 are both liquid connection members configured to deliver and/or pass liquid to and/or from the support frame 412. Accordingly, similar to the inlet member 414, the outlet member 416 includes a base 446 that connects to a support outlet 480 of the support member 412 proximate the lower corner 417. The lower corner 417 may include a channel configured to receive and retain the base 446. For example, the base 446 may fit into the channel and be securely fastened therein, such as through fasteners, adhesives, or the like. Optionally, as noted above, the base 446 may simply be integrally formed and molded with the lower corner 417. The base 446 supports and connects to an upper wall 449 through lateral walls 450. The base 446, the upper wall 449, and the lateral walls 450 define the liquid-delivery opening 422. Liquid passages (hidden from view in FIG. 5) are formed through the base 446 and connect the liquid-delivery opening 422 to a liquid-passage area 482 formed at the lower corner 417 of the support frame 412. The outlet member 416 may be constructed as shown in FIGS. 6 and 7.

The inlet and outlet members 414 and 416 provide panel headers that are configured to provide passageways for liquid, such as desiccant, to pass into and out of the liquid panel assembly 402. The inlet and outlet members 414 and 416 may also provide mating surfaces to neighboring panels to create a manifold to distribute liquid to all solution panels within an energy exchanger.

Figure 8:
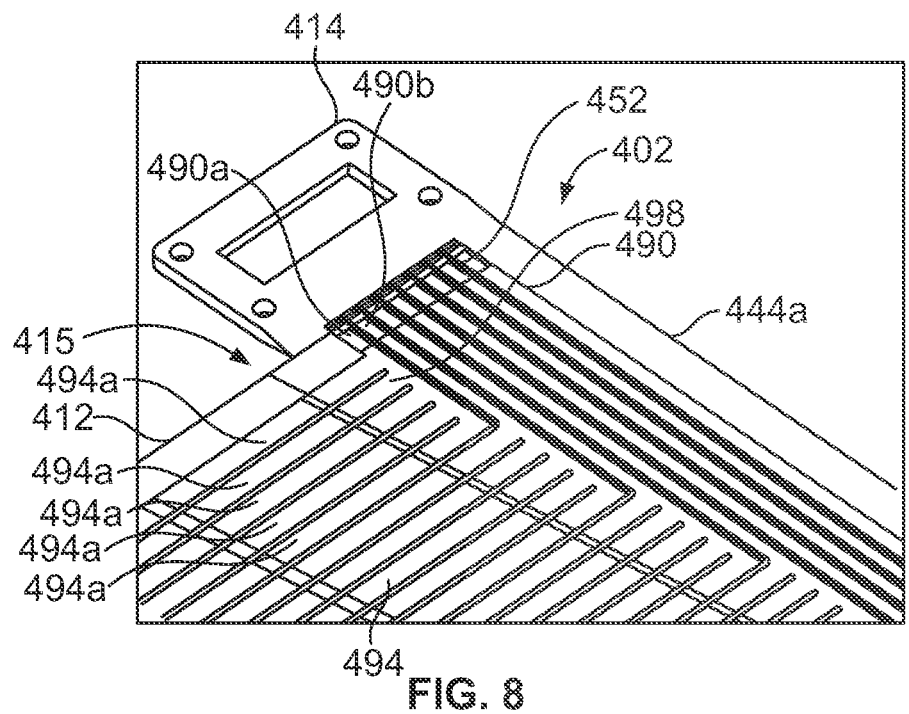
FIG. 8 illustrates an isometric view of an area proximate an upper corner of a support frame of a liquid panel assembly, according to an embodiment of the present disclosure.

FIG. 8 illustrates an isometric view of an area proximate the upper corner 415 of the support frame 412 of the liquid panel assembly 402. Referring to FIGS. 5 and 8, the support frame 412 includes vertical inlet channels 490 connected to vertical outlet channels 492 through horizontal flow passages 494. As shown, the support frame 412 may include eight vertical inlet channels 490 and eight vertical outlet channels 492. However, the support frame 412 may include more or less inlet and outlet channels 490 and 492 than those shown. Each inlet channel 490 may connect to five horizontal flow passages 494. For example, the innermost inlet channel 490a connects to the top five horizontal flow passages 494a. Similarly, the inlet channel 490b connects to the five horizontal flow passages 494 below the top five horizontal flow passages 494a. Similarly, the top five flow passages 494a connect to an outermost vertical outlet channel 492a. Accordingly, the horizontal flow passages 494 may be staggered in sets of five with respect to the support frame 412. For example, inlet ends 498 of the horizontal flow passages 494a are farther away from the lateral edge 444a of the support frame 412 than the inlet ends 498 of the set of horizontal flow passages 494 immediately below the set of horizontal flow passages 494a. However, outlet ends 500 of the horizontal flow passages 494a are closer to the lateral edge 444b of the support frame 412 than the outlet ends 500 of the set of horizontal flow passages 494 immediately below the set of horizontal flow passages 494a. Further, the length of the inlet channel 490a is shorter than the length of the inlet channel 490b adjacent the inlet channel 490a. The length of the inlet channel 490b is longer in order to connect to the set of five horizontal flow passages 494 underneath the set of five horizontal flow passages 494a. Conversely, the length of the vertical outlet channel 492a is longer than the length of the vertical outlet channel 4921) immediately adjacent the vertical distribution channel 492a.

The vertical inlet and outlet channels 490 and 492, respectively, provide continuous flow alignment vanes. Each channel 490 and 492 may be an isolated duct that allows the pressure of liquid in neighboring channels 490 and 492 to vary in order to evenly split the flow of liquid among the channels 490 and 492. As noted, each vertical distribution and passage channel 490 and 492 may feed a single horizontal flow passage 494, or a set or bank of horizontal flow passages 494. The membrane 418 (shown in FIG. 4) may also be bonded to internal edge surfaces of the support frame 412 to separate each vertical channel 490 and 492 from one another, as well as to separate each horizontal flow passage 494 from one another. Therefore, each fluid circuit, which includes an inlet channel 490, one or more flow passages 494, and an outlet channel 492, may be a separate, sealed duct.

Each of the inlet and outlet channels 490 and 492 may provide a flow alignment vane configured to direct liquid to flow along a particular path. The inlet and outlet channels 490 and 492 may be configured to provide support to the membrane. The inlet and outlet channels may be configured to provide a sealing surface for at least a portion of the membrane.

As shown in FIGS. 5 and 6, the horizontal flow passages 494 are grouped in sets of five, which are staggered with respect to one another. The sets of horizontal flow passages 494 are staggered so that the overall length of each horizontal flow passage 494 is the same. Indeed, the total length of each liquid circuit, which includes a vertical inlet channel 490 that connects to a horizontal flow passage 494, which in turn connects to a vertical outlet channel 492, is the same due to the staggered nature of the sets of horizontal flow passages 494 and the different lengths of each of the vertical inlet channels 490 and the vertical outlet channels 492. The total vertical height H of a liquid circuit is the length of a vertical inlet channel 490 plus the length of a vertical outlet channel 492 that connects to the vertical inlet channel 490 through a horizontal flow passage 494. The vertical inlet channel 490a is the shortest, while the vertical outlet channel 492a (which connects to the inlet channel 490a through the fluid passages 494a) is the longest. Conversely, the vertical inlet channel 490n is the longest, while the vertical outlet channel 492n (which connects to the inlet channel 490n through the fluid passages 494n) is the shortest. Further, the length of the vertical inlet channel 490a may, equal the length of the vertical outlet channel 492n, while the length of the vertical inlet channel 490n may equal the length of the vertical outlet channel 492a. In short, the total vertical lengths for each liquid circuit may sum to H. Moreover, the total length of each liquid circuit, which includes a vertical inlet channel 490 that connects to a vertical outlet channel 492 through a horizontal fluid passage 494, may be equal.

While particular inlet and outlet channels 490 and 492, respectively, are each shown connecting to a set of five horizontal fluid passages 494, the inlet and outlet channels 490 and 492, respectively, may connect to more or less than five horizontal fluid passages 494. For example, the sets of horizontal fluid passages 494 may be two, three, six, seven, and the like. Further, each distribution and passage channel 490 and 492, respectively, may alternatively connect to only one horizontal fluid passage 494.

The liquid circuits are of equal length in order to provide for even distribution of liquid flow through the liquid panel assembly 402. The liquid panel assembly 402 is configured to operate at low pressure. That is, the liquid panel assembly 402 provides a low pressure assembly. The liquid that flows through the liquid panel assembly 402 has a particular weight and viscosity. For example, a desiccant is a dense fluid. The weight of the liquid creates fluid pressure. As the liquid flows from the top of the liquid panel assembly 402 to the bottom, the pressure from the weight of the liquid builds. As the liquid moves through the liquid panel assembly 402, the pressure is reduced through friction, for example. For example, the faster the speed of the liquid within a liquid circuit, the greater the friction between the liquid and walls of channels and passages that define the liquid circuit. Therefore, increasing the speed of the liquid, such as through pumping, increases the frictional force. Embodiments of the present disclosure provide a liquid panel assembly that balances the loss of pressure from friction with the pressure of the weight of the liquid.

The friction head loss, $h_f$, of a fluid flowing in a channel of length L is given by the following:

$$\frac{h_f}{L} = \frac{C\mu V}{2g\rho D_h^2}$$

where C is a coefficient that depends on the duct geometry (and may also be used to represent the friction of porous material in the duct), $\mu$ is the molecular viscosity of the fluid, V is the bulk speed of the fluid in the duct, g is the acceleration due to gravity, ρ is the density of the fluid, and $D_h$ is the hydraulic diameter of the duct. The friction head loss may be synonymous with pressure drop ("head" refers to the height of a column of fluid that would produce the pressure), that is, $\Delta P = -\rho g h_f$.

Embodiments of the present disclosure provide a liquid panel assembly in which friction head loss may be the same or approximately the same as a drop in vertical elevation of the fluid as it flows downward in the channels, due to the gain in static pressure, which is given by $\Delta P = \rho g \Delta z$, where $\Delta z$ is the drop in vertical elevation (in the direction of gravity). Therefore, adding the two pressure changes together gives $\Delta P_{net} = \rho g (\Delta z - h_f)$. A closely balanced flow with low pressure would have $\Delta z \approx h_f$. Embodiments of the present disclosure provide pressure balancing channels at the ends of the panel that are oriented vertically, therefore, $\Delta z = L$. As such, the following may be consulted when selecting the size, shape, orientation, and the like of the fluid circuits:

$$\frac{h_f}{L} = \frac{C \mu V}{2 g \rho D_h^2} \approx 1$$

However, complete balance as shown in the above equation is not necessarily required. Instead, the gauge pressure may be kept low enough to meet structural limitations of the membrane and support design (keeping membrane strain and stress within acceptable limits).

In an example, the weight of the liquid produces pressure in the vertical inlet and outlet channels 490 and 492, respectively. However, it has been found that increasing the number of horizontal fluid passages 494 connecting to particular inlet and outlet channels 490 and 492 increases the rate of fluid flow within the vertical inlet and outlet channels 490 and 492, respectively. Fluid velocity is directly proportional to friction. Thus, with increased fluid velocity, friction increases. The friction diminishes the overall pressure of the liquid within the liquid panel assembly 402. Therefore, by increasing the friction of the fluid with the walls of the channels and passages of the liquid panel assembly 402, the pressure is reduced. As an example, it has been found that connecting single vertical inlet and outlet channels 490 and 492, respectively, to sets of four or five horizontal fluid passages 494 may substantially or completely offset the pressure caused by the weight of a desiccant. Because different liquids have different densities and weights, the liquid panel assembly 402 may be configured to account for the differences in densities and weights. For example, the sets of horizontal flow passages 494 may be smaller, such as set of 2 or 3, for lighter liquids, than for heavier liquids. Therefore, a number of flow passages 494 within a set of multiple flow passages 494 connected to individual channels 490 and 492 may be based on and/or determined by a weight of the liquid that is configured to flow through fluid circuits that include the sets of liquid passages and channels 490 and 492. In general, embodiments of the present disclosure are configured to offset hydrostatic pressure gain of the liquid with friction pressure loss of the flowing liquid within one or more fluid circuits to minimize or eliminate pressure within a liquid panel assembly.

Additionally, the hydraulic diameters of the inlet and outlet channels 490 and 492, as well as the hydraulic diameters of the horizontal fluid passages 494, may be adjusted to balance liquid hydrostatic pressure with friction. For example, the hydraulic diameter of each channel or passage may be directly proportional to the velocity of liquid flowing therethrough. Thus, decreasing the hydraulic diameter of the channel or passage leads to an increased velocity of pumped liquid therethrough. As noted, increasing liquid velocity increases friction, which reduces the net pressure. Therefore, the hydraulic diameter of the channels 490 and 492 may be based on and/or determined, in part, by a weight of the liquid that is configured to flow through fluid circuits that include the channels 490 and 492. In addition to the number of horizontal flow passages 494 in a set that connect to individual vertical inlet and outlet channels 490 and 492, respectively, the hydraulic diameter of the channels 490 and 492, as well as the flow passages 494 may be sized and shaped to generate a desired friction with respect to a particular liquid.

Thus, the liquid panel assembly 402 includes liquid circuits that are configured to balance the force of liquid hydrostatic pressure and friction by adjusting the number of horizontal flow passages 494 that connect to the vertical inlet and outlet channels 490 and 492, respectively, and/or the hydraulic diameter of the channels and/or passages, in order to reduce the net pressure within the liquid panel assembly 402.

The hydraulic diameters of the horizontal fluid passages 494 may be relatively wide compared to the vertical inlet and outlet channels 490 and 492, respectively. As such, the friction in relation to the liquid in the horizontal fluid passages 494 may be relatively small compared to the vertical inlet and outlet channels 490 and 492, respectively. The pressure drop in the horizontal fluid passages 494 may be relatively small. Because less friction in the horizontal flow passages 494 may be desired, the hydraulic diameters of the flow passages 494 may be wider than the hydraulic diameters of the vertical inlet and outlet channels 490 and 492, respectively. Therefore, the balancing of liquid hydrostatic pressure and friction may be achieved through the velocity of liquid through the vertical inlet and/or outlet channels 490 and 492, respectively, which may be controlled through the number of horizontal flow passages 494 connecting to each channel 490 and 492, and/or the hydraulic diameters of the channels 490 and 492.

Referring to FIGS. 4, 5, and 8, the lengths of the horizontal flow passages 494 may be substantially longer than half the length L of the support frame 412. Indeed, the lengths of the horizontal flow passages may be almost as long as the length L of the support frame 412. For example, the horizontal flow passages 494 may be the length of the support frame 412 minus the horizontal area occupied by the inlet and outlet channels 490 and 492, respectively. Accordingly, each fluid circuit may have a substantial length along a horizontal orientation. The linear, horizontal distances of the horizontal flow passages 494 increase the efficiency of energy exchange between the liquid flowing therethrough, and the airflow on either side of the membranes of the solution panel assemblies 402. As shown in FIG. 5, the horizontal flow passages 494 increase the flow of liquid in the horizontal direction so that the direction of liquid flow $D_L$ is counter to the direction of airflow $D_A$. It has been found that increasing the distance of counterflow between the liquid in the fluid circuits and the airflow increases the efficiency of energy exchange therebetween. A counterflow arrangement of the air and liquid streams provides an efficient and highly effective energy exchanger. The horizontal flow passages 494 maximize the counterflow area, and allow the liquid to distribute evenly. As noted above, however, the flow passages 494 may be alternatively be configured to provide crossflow, parallel-aligned flow, or other such flow.

Figure 9:
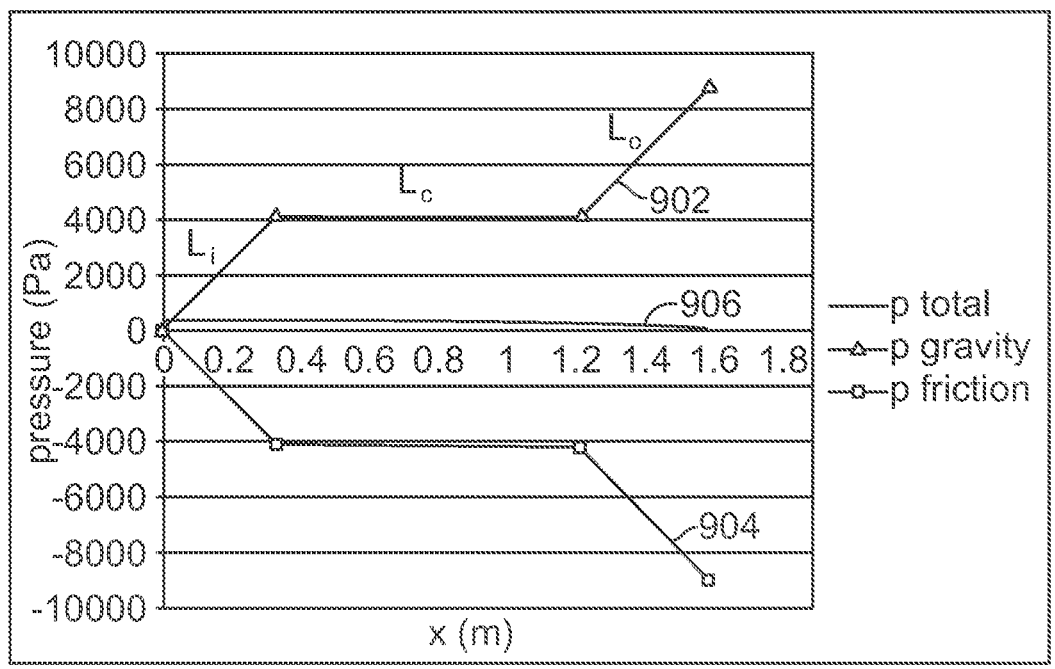
FIG. 9 illustrates a chart of fluid pressure levels within a liquid panel assembly, according to an embodiment of the present disclosure.

FIG. 9 illustrates a chart of fluid pressure levels within a liquid panel assembly 402, according to an embodiment. As shown in FIG. 9, the pressure level of liquid through an inlet length $L_i$ (over the length of the vertical inlet channel 490) increases until the liquid passes into the horizontal flow passage 494, through which the pressure level $L_C$ remains constant. The pressure of the liquid in the vertical outlet channel 492 increases. However, as shown in FIG. 9, the friction of the liquid with respect to the liquid panel assembly 402 offsets the pressure levels of the liquid. As such, the pressure force 902 of the liquid is offset by the frictional force 904, thereby yielding a neutral pressure 906 within the liquid panel assembly 402. The vertical inlet and outlet channels 490 and 492, respectively, may be considered friction control members that are used to balance the pressure within the liquid panel assembly 402.

Figure 10:
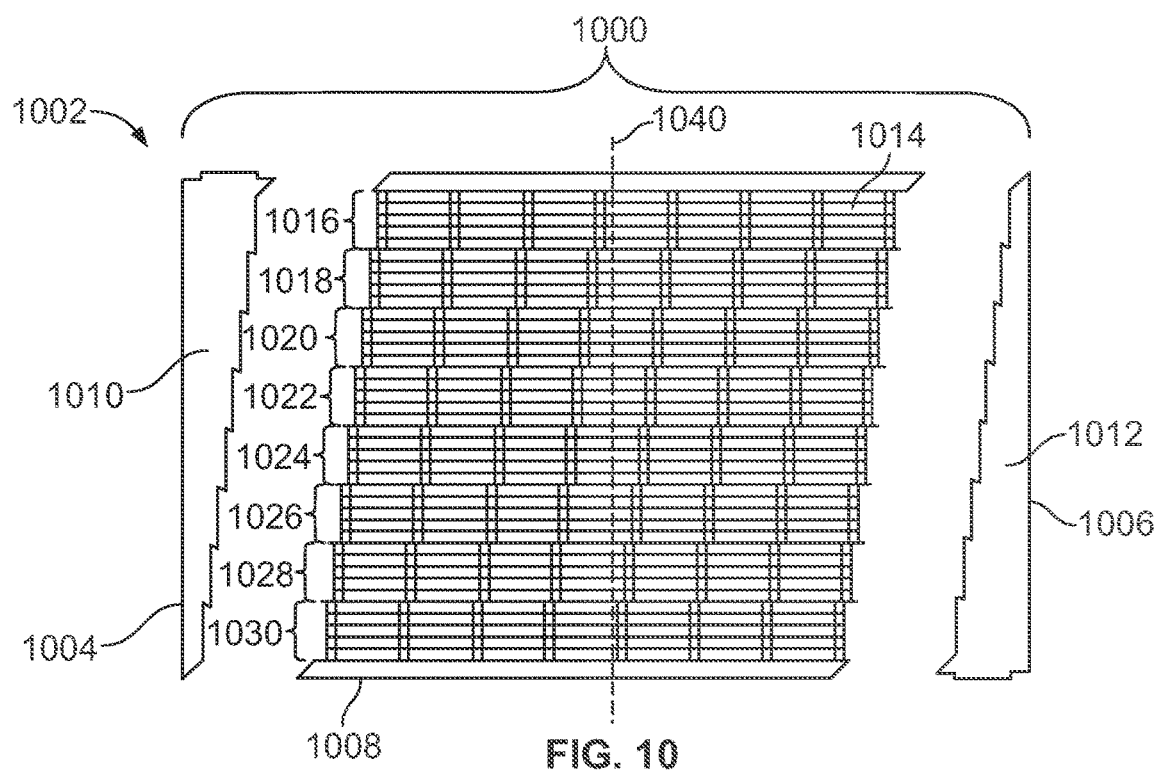
FIG. 10 illustrates a front view of a support frame of a liquid panel assembly, according to an embodiment of the present disclosure.

FIG. 10 illustrates a front view of a support frame 1000 of a liquid panel assembly 1002, according to an embodiment. The support frame 1000 may include end sections 1004 and 1006 and an intermediate body 1008. The end section 1004 may provide vertical inlet channels 1010, while the end section 1006 may provide vertical outlet channels 1012, or vice versa. The intermediate body 1008 may provide horizontal flow passages 1014. The intermediate body 1008 includes flow passage sets 1016-1030 that are staggered and/or offset with one another with respect to a vertical axis 1040 of the intermediate body 1008. Each of the end sections 1004 and 1006, as well as the intermediate body 1008 may be formed from extruded parts and assembled together, such as through fasteners, bonding, and the like. The end sections 1004, 1006, and the intermediate body 1008 may be formed by extruding a flat sheet of plastic or metal, and then embossing the channel shapes using grooved rollers, for example.

Alternatively, any of the liquid panel assemblies described above may be formed through injection molding either as separate sub-parts that are later bonded together, or as a single, unitary piece. Injection molding the liquid panel assembly as a single piece, for example, eliminates the potential for joint failure or leakage at bonded seams.

Figure 11:
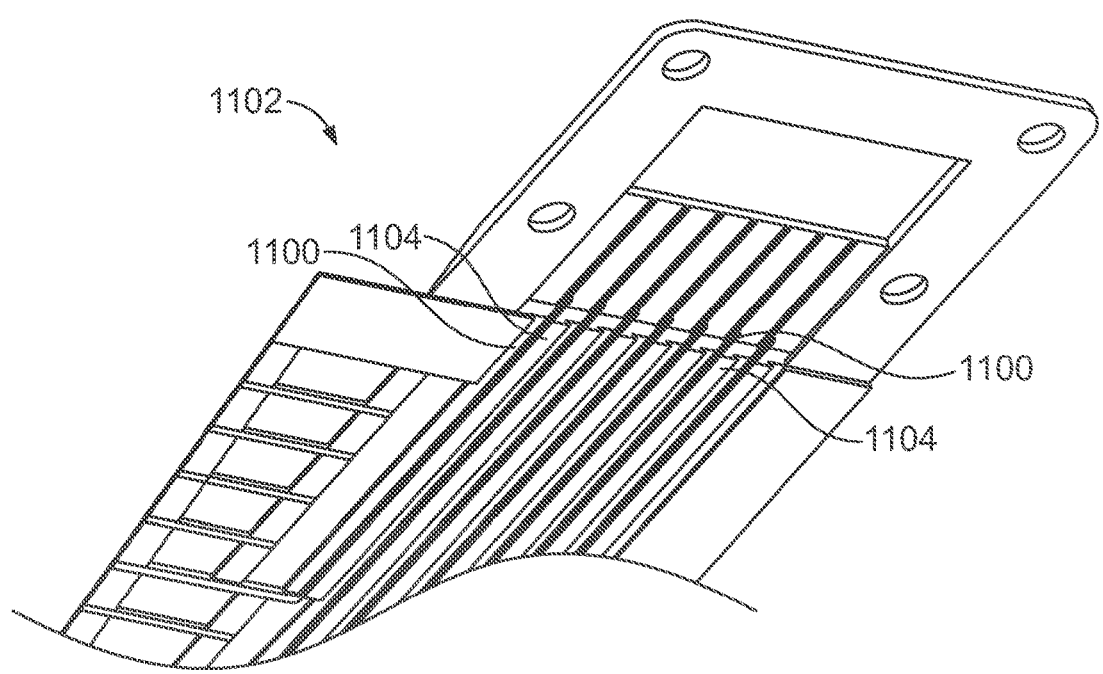
FIG. 11 illustrates an isometric top view of liquid distribution channels formed in a support frame, according to an embodiment of the present disclosure.

FIG. 11 illustrates an isometric top view of liquid inlet channels 1100 formed in a support frame 1102, according to an embodiment. As shown, the inlet channels 1100 may be grooves formed between ridges 1104 in the support frame 1102. The liquid outlet channels may be formed in a similar manner.

Figure 12:
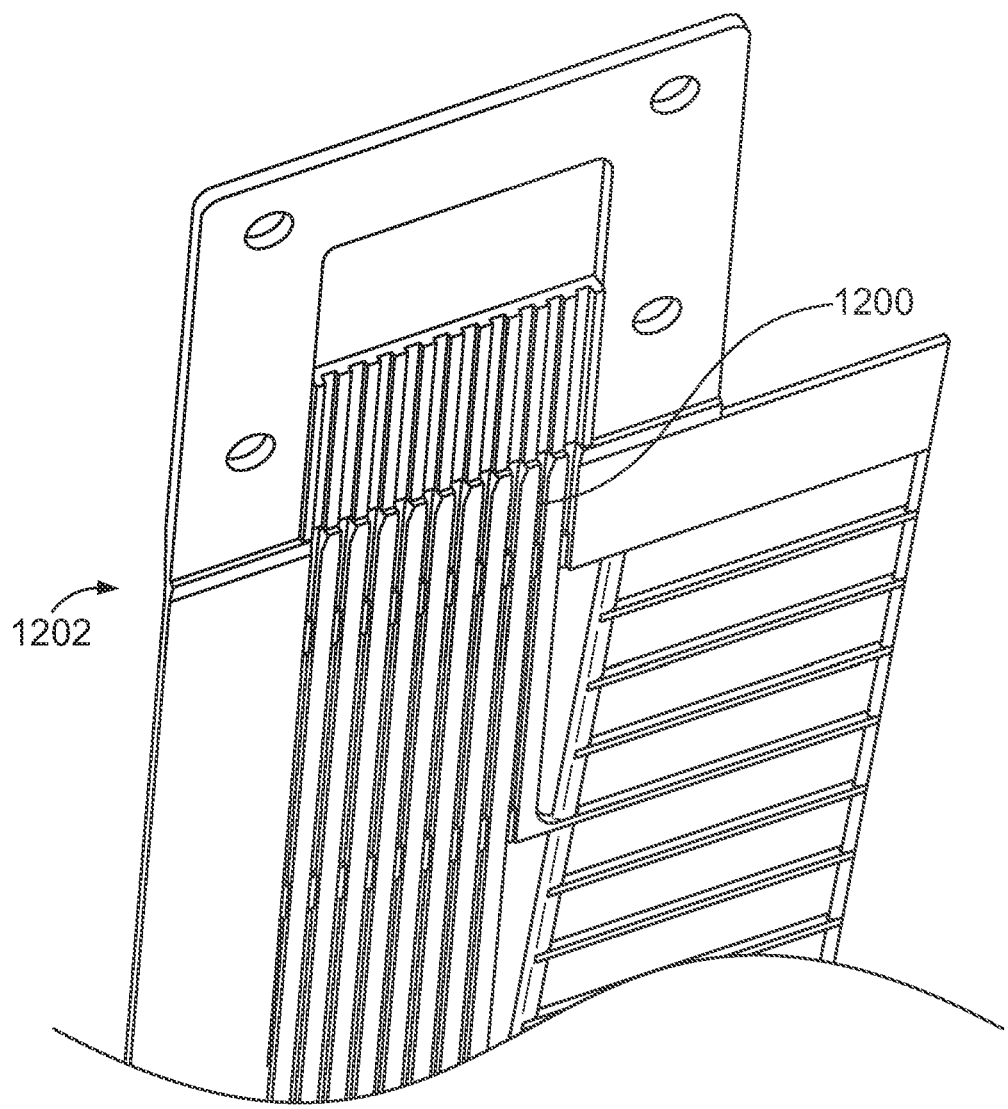
FIG. 12 illustrates an isometric top view of liquid distribution channels formed in a support frame, according to an embodiment of the present disclosure.

FIG. 12 illustrates an isometric top view of liquid inlet channels 1200 formed in a support frame 1202, according to an embodiment. In this embodiment, the inlet channels 1200 may be cut completely through the support frame 1202, thereby forming a planar channel through the support frame 1202. The liquid outlet channels may be formed in a similar manner.

Referring to FIGS. 4-12, as explained above, the inlet channels and the outlet channels of the support frame may be vertical and linear, while the flow passages may be horizontal and linear. It has been found that the linear vertical and horizontal configuration of each liquid circuit provides for efficient pressure balancing within the solution panel assemblies. However, the liquid circuits may be various other shapes and sizes. As discussed above, a liquid circuit may include a vertical inlet channel, one or a set of horizontal flow passages, and a vertical outlet channel.

Figure 13:
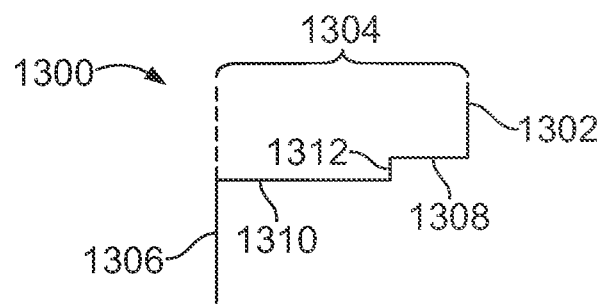
FIG. 13 illustrates a simplified view of a liquid circuit, according to an embodiment of the present disclosure.

FIG. 13 illustrates a simplified view of a liquid circuit 1300, according to an embodiment. The liquid circuit 1300 includes a vertical inlet channel 1302 connected to a vertical outlet channel 1306 through a flow passage 1304. The flow passage 1304 may include a first horizontal portion 1308 connected to a second horizontal portion 1310 through a vertical drop 1312. The vertical drop 1312 may be configured to balance liquid hydrostatic pressure, similar to the vertical inlet and outlet channels, as explained above.

Figure 14:
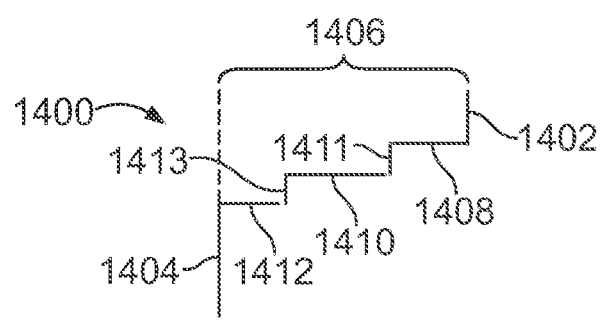
FIG. 14 illustrates a simplified view of a liquid circuit, according to an embodiment of the present disclosure.

FIG. 14 illustrates a simplified view of a liquid circuit 1400, according to an embodiment. The liquid circuit 1400 includes a vertical inlet channel 1402 connected to a vertical outlet channel 1404 through a flow passage 1406. The flow passage 1406 may include a first horizontal portion 1408 connected to a second horizontal portion 1410 through a vertical drop 1411. The liquid flow passage 1406 may also include a third horizontal portion 1412 connected to the second horizontal portion 1410 through a vertical drop 1413. The vertical drops 1411 and 1413 may be configured to balance liquid hydrostatic pressure, similar to the vertical inlet and outlet channels, as explained above. The flow passage 1406 may include more vertical drops than those shown.

Figure 15:
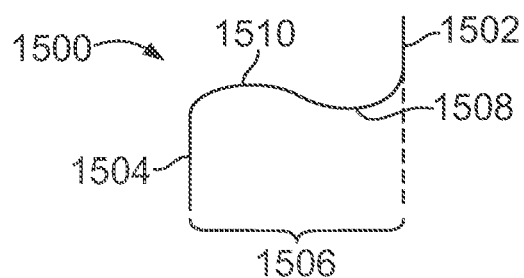
FIG. 15 illustrates a simplified view of a liquid circuit, according to an embodiment of the present disclosure.

FIG. 15 illustrates a simplified view of a liquid circuit 1500, according to an embodiment. In this embodiment, a vertical inlet channel 1502 is connected to a vertical outlet channel 1504 through a flow passage 1506, which may be non-linear. When non-linear, the flow passage 1506 may include offsetting portions such that a trough 1508 is offset by a peak 1510. That is, the depth of the trough 1508 may be the same absolute distance as the height of the peak 1510.

Referring to FIGS. 13-15, for example, the liquid circuits may or may not include horizontal passages. For example, the liquid circuits may include vertical flow channels connected to one another through various passages. Pressure balancing may occur directly in the vertical flow channels. Additionally, the liquid circuits may be angled with respect to horizontal and vertical orientations.

Figure 16:
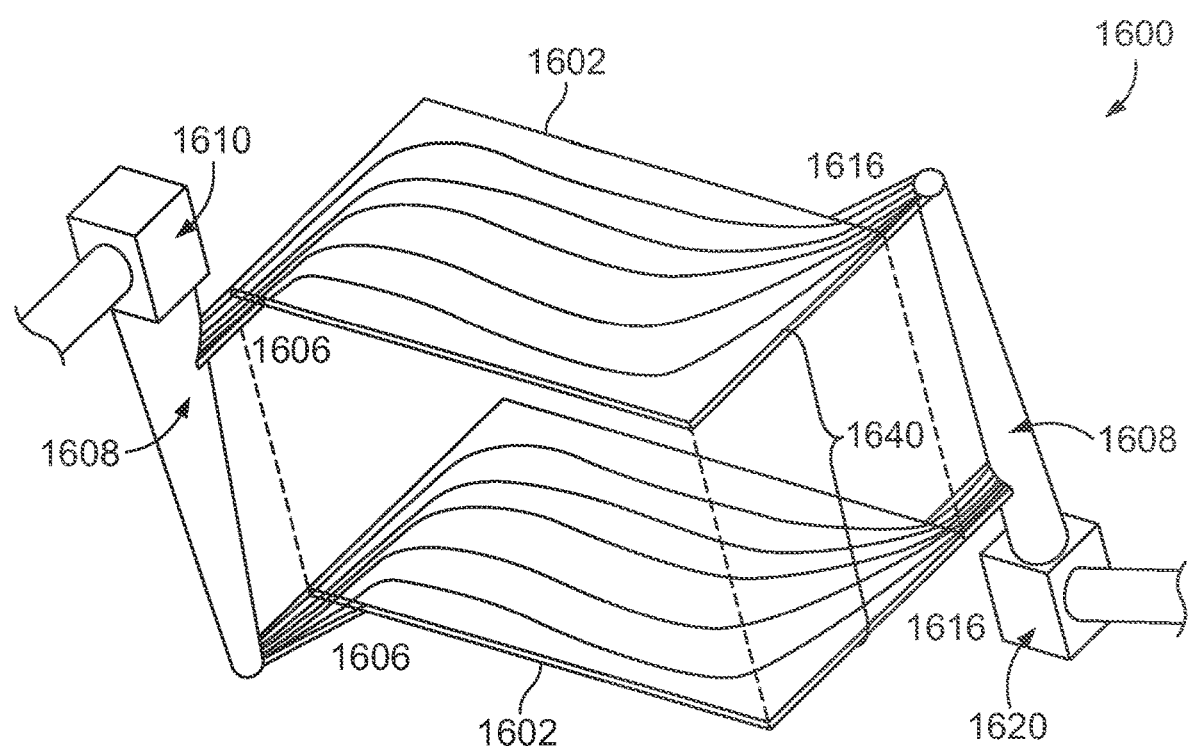
FIG. 16 illustrates an isometric view of horizontal liquid panel assemblies connected to combined inlet channels and combined outlet channels, according to an embodiment of the present disclosure.

FIG. 16 illustrates an isometric view of horizontal liquid panel assemblies connected to combined inlet channels and combined outlet channels 1600 according to an embodiment of the present disclosure. One or more panel assemblies 1602 may be stacked horizontally to form a panel stack 1640. The panel assemblies 1602 may be separated with membrane support assemblies, such as described with respect to FIG. 4. The panel assemblies 1602 may be fluidly connected proximate the left corner 1606 to an inlet channel 1608. The inlet channel 1608 may be fluidly connected to an inlet header 1610. The panel assemblies are fluidly connected proximate the right corner 1616 to an outlet channel 1618. The outlet channel 1618 is fluidly connected to an outlet header 1620. Liquid, such as a desiccant, flows from the inlet header 1610 into the inlet channel 1608 and into the panel assembly 1602 at the corner 1606. The liquid passes through the panel assembly 1602 by traveling along a liquid path, such as described with respect to FIG. 4. The liquid exits the panel assembly 1602 at the corner 1616 and flows into the outlet channel 1618 and into the outlet header 1620. The inlet channel 1608 may provide a pressure balancing function for low pressure supply to every panel assembly 1602 in the panel stack 1640. The outlet channel 1618 may provide a pressure balancing effect for low back pressure to every panel assembly 1602 in the panel stack 1640.

Figure 17:
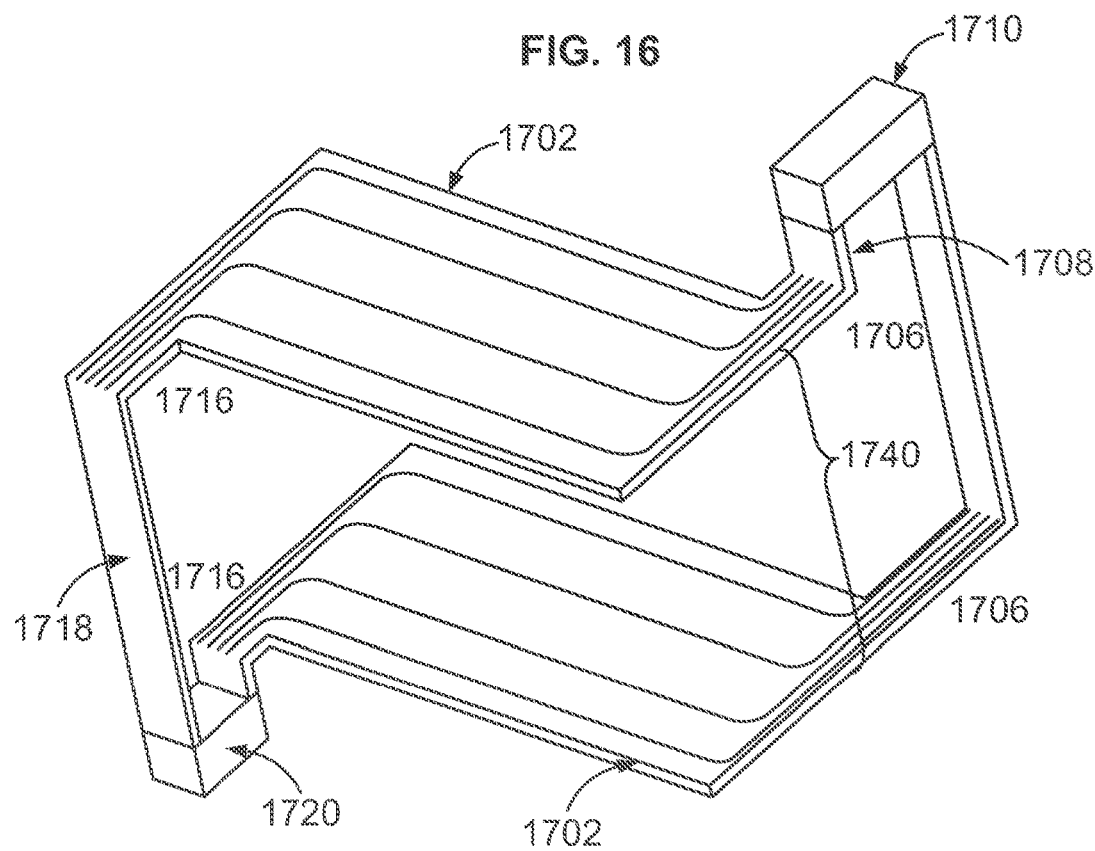
FIG. 17 illustrates an isometric view of horizontal liquid panel assemblies connected to individual inlet channels and individual outlet channels, according to an embodiment of the present disclosure.

FIG. 17 illustrates an isometric view of horizontal liquid panel assemblies connected to individual inlet channels and individual outlet channels 1700 according to an embodiment of the present disclosure. One or more panel assemblies 1702 may be stacked horizontally to form a panel stack 1740. The panel assemblies 1702 may be separated by membrane support assemblies, such as described with respect to FIG. 4. The panel assemblies 1702 may be fluidly connected proximate the right corner 1706 to an inlet channel 1708. The inlet channel 1708 may be fluidly connected to an inlet header 1710. The panel assemblies may be fluidly connected proximate the left corner 1716 to an outlet channel 1718. The outlet channel 1718 may be fluidly connected to an outlet header 1720. Liquid, such as a desiccant, flows flow from the inlet header 1710 into the inlet channel 1708 and into the panel assembly 1702 at the corner 1706. The liquid passes through the panel assembly 1702 by traveling along a liquid path, such as described with respect to FIG. 4. The liquid exits the panel assembly 1702 at the corner 1716 and flows into the outlet channel 1718 and into the outlet header 1720. The inlet channel 1708 may provide a pressure balancing function for low pressure supply to every panel assembly 1702 in the panel stack 1740. The outlet channel 1718 may provide a pressure balancing effect for low back pressure to every panel assembly 1702 in the panel stack 1740.

Figure 18:
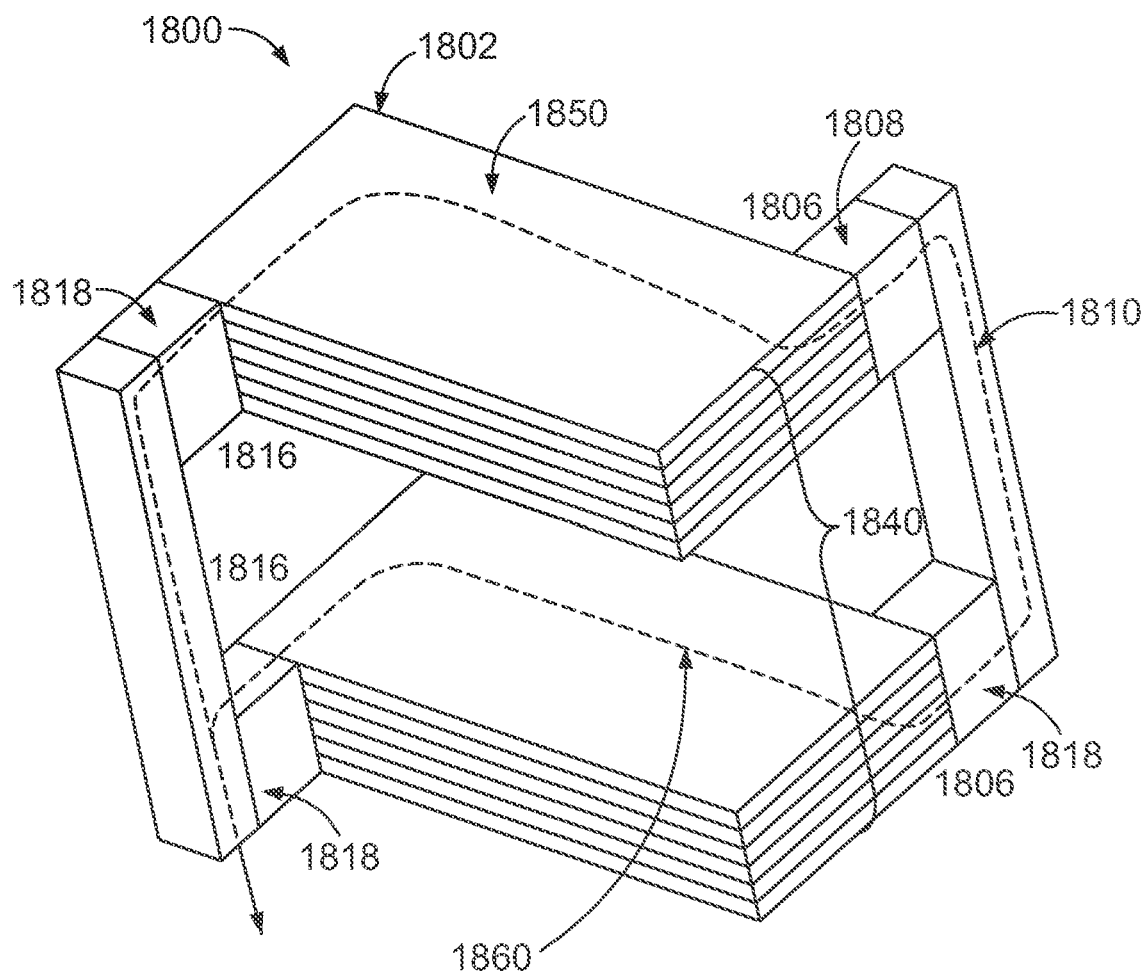
FIG. 18 illustrates an isometric view of stacked horizontal liquid panel assemblies connected to inlet headers, according to an embodiment of the present disclosure.

FIG. 18 illustrates an isometric view of stacked horizontal liquid panel assemblies connected to inlet headers 1800 according to an embodiment of the present disclosure. One or more panel assemblies 1802 may be stacked horizontally to form a panel stack 1850. One or more panel stacks 1850 may be stacked to form a stack of panel stacks 1840. The panel assemblies 1802 may be separated by membrane support assemblies, such as described with respect to FIG. 4. All panel assemblies 1802 in one panel stack 1850 may be fluidly connected proximate the right corner 1806 to one inlet header 1808. The inlet header 1808 may be fluidly connected to an inlet channel 1810. The panel assemblies may be fluidly connected proximate the left corner 1816 to an outlet header 1818. The outlet header 1818 may be fluidly connected to an outlet channel 1820. Liquid, such as a desiccant, flows to flow along a fluid path 1860 from the inlet channel 1810 into the inlet header 1808 and into each panel assembly 1802 in the panel stack 1850 at the corner 1806. The liquid passes through the panel assemblies 1802 by traveling along a liquid path, such as described with respect to FIG. 4. The liquid exits the panel assemblies 1802 at the corner 1816 and flows into the outlet header 1818 and into the outlet channel 1820. The inlet channel 1810 may provide a pressure balancing function for low pressure supply to every panel stack 1850 in the stack of panel stacks 1840. The outlet channel 1820 may provide a pressure balancing effect for low back pressure to every panel stack 1850 in the stack of panel stacks 1840.

Figure 19:
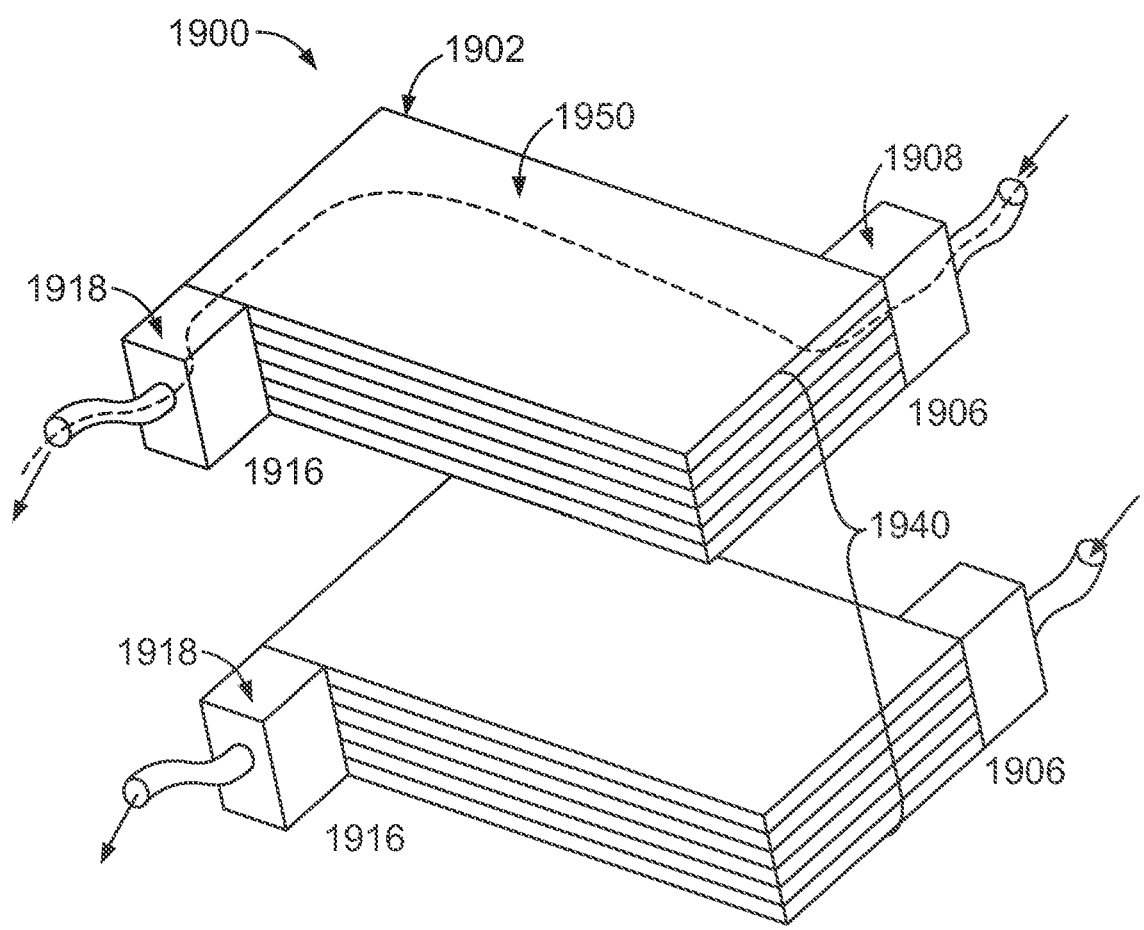
FIG. 19 illustrates an isometric view of stacked horizontal liquid panel assemblies with external pressure balancing, according to an embodiment of the present disclosure.

FIG. 19 illustrates an isometric view of stacked horizontal liquid panel assemblies with external pressure balancing 1900 according to an embodiment of the present disclosure. One or more panel assemblies 1902 may be stacked horizontally to form a panel stack 1950. One or more panel stacks 1950 may be stacked to form a stack of panel stacks 1940. The panel assemblies 1902 may be separated by membrane support assemblies such as described with respect to FIG. 4. All panel assemblies 1902 in one panel stack 1950 may be fluidly connected proximate the right corner 1906 to one inlet header 1908. The inlet header 1908 may be fluidly connected to a pressure control device such as an inline regulating valve, a pressure regulating pump or other such device capable of supplying fluid to all inlet headers at the same pressure. The panel assemblies may be fluidly connected proximate the left corner 1916 to an outlet header 1918. The outlet header 1918 may be fluidly connected to a pressure control device such as an inline regulating valve, a pressure regulating pump or other such device capable of retrieving fluid from all outlet headers at the same pressure. Fluid, such as a desiccant, flows along a fluid path 1960 from the pressure control device into the inlet header 1908 and into each panel assembly 1902 in the panel stack 1950 at the corner 1906. The liquid passes through the panel assemblies 1902 by traveling along a liquid path, such as described with respect to FIG. 4. The liquid exits the panel assemblies 1902 at the corner 1916 and flows into the outlet header 1918 and into the pressure control device. The inlet pressure control device may provide low pressure supply to every panel stack 1950 in the stack of panel stacks 1940. The outlet pressure control device may provide low back pressure to every panel stack 1950 in the stack of panel stacks 1940.

Embodiments of the present disclosure may be used with various types of energy exchangers, such as liquid-to-air or liquid-to-liquid membrane energy exchangers.

Embodiments of the present disclosure provide liquid panel assemblies that are configured to balance internal liquid hydrostatic pressure and frictional forces. As such, the total pressure within the liquid panel assemblies may be reduced, negated or otherwise neutralized. Thus, membrane bulge is substantially reduced or eliminated, which reduces the potential for leaks and membrane creep.

Embodiments of the present disclosure provide a liquid panel assembly divided into a plurality of separate liquid circuits, each of equal length and friction, so that liquid divides itself evenly among the liquid circuits and the flow through the liquid circuits is uniform. The fluid circuits promote uniform flow distribution across the liquid panel assembly, thereby providing efficient operation and performance.

Embodiments of the present disclosure provide a liquid panel assembly that creates pathways for controlled, uniform, flow distribution (such as counterflow distribution) of liquid, such as desiccant, over an internal membrane area. Further, the liquid panel assembly provides low operating pressure by offsetting the static pressure gain and friction pressure loss as the liquid moves through the liquid circuits. The vertical flow of liquid may be confined to small high speed channels, thereby reducing or eliminating the potential for buoyancy-driven mal-distribution of liquid. The flow passages may be open (no filler wick or mesh), thereby allowing for good contact of the liquid and membrane, and low friction loss.

Embodiments of the present disclosure are not restricted to energy exchangers. Instead, embodiments of the present disclosure may be used with respect to any liquid panel frame that exchanges heat and/or mass through a membrane, and where liquid pressure and flow distribution are controlled. For example, the liquid panel assemblies described above may be used with desalination systems, water purification systems, evaporative cooling systems, systems configured to transfer heat/mass between a liquid and a gas through a membrane, systems configured to transfer heat/mass between two liquid streams through a membrane, and the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A liquid panel assembly for a liquid-to-air membrane energy exchanger, the liquid panel assembly comprising:
    a support frame including a plurality of liquid circuits each of which includes an inlet channel connected to an outlet channel through a plurality of flow passages, the inlet channel being disposed at an upper corner of the support frame, and the outlet channel being disposed at a lower corner of the support frame; and
    first and second semi-permeable membranes secured to first and second sides of the support frame, wherein:
        a liquid is configured to flow through the plurality of liquid circuits and contact interior surfaces of the first and second semi-permeable membranes; and
        a hydraulic diameter of the inlet channels and the outlet channels is selected based on one or more of a density, viscosity; and flow speed of the liquid to generate a friction pressure loss of the liquid that is in a range from greater than zero to approximately equal to a hydrostatic pressure gain of the liquid as the liquid flows through the plurality of liquid circuits.

2. The liquid panel assembly of claim 1, wherein the plurality of flow passages comprises plurality of counterflow passages.

3. The liquid panel assembly of claim 1, wherein the upper corner is diagonally located from the lower corner.

4. The liquid panel assembly of claim 1, wherein each of the inlet and outlet channels provides a flow alignment vane configured to direct the liquid to flow along a particular path, wherein the inlet and outlet channels are configured to provide support to the at least one membrane, and wherein the inlet and outlet channels are configured to provide a sealing surface for at least a portion of the at least one membrane.

5. The liquid panel assembly of claim 1, wherein the inlet and outlet channels are vertical and the plurality of flow passages are horizontal.

6. The liquid panel assembly of claim 1, wherein a horizontal length of the plurality of flow passages exceeds half a total horizontal length of the support frame.

7. The liquid panel assembly of claim 1, wherein the plurality of liquid circuits comprises:
    a first plurality of flow passages connected to a first inlet channel and a first outlet channel; and
    a second plurality of flow passages connected to a second inlet channel and a second outlet channel.

8. The liquid panel assembly of claim 7, wherein the first plurality of flow passages is staggered with respect to the second plurality of flow passages.

9. The liquid panel assembly of claim 1, wherein the support frame includes an inlet member and an outlet member, both of which are connected to the plurality of liquid circuits.

10. The liquid panel assembly of claim 9, wherein the inlet member and the outlet member is integral with the support frame.

11. The liquid panel assembly of claim 9, wherein the inlet member of the support frame is configured to modularly engage additional inlet members of additional support frames of additional liquid panel assemblies, and wherein the outlet member of the support frame is configured to modularly engage additional outlet members of the additional support frames of the additional liquid panel assemblies.

12. The liquid panel assembly of claim 11, wherein the inlet member and the additional inlet members are configured to modularly engage one another to form an inlet manifold through which the liquid is configured to enter the plurality of liquid circuits of each of the support frames.

13. The liquid panel assembly of claim 11, wherein the outlet member and the additional outlet members are configured to modularly engage one another to form an outlet manifold through which the liquid is configured to exit the plurality of liquid circuits of each of the support frames.

14. The liquid panel assembly of claim 9, wherein at least a portion of the first and second semi-permeable membranes sealingly engages the inlet member and outlet member.

15. The liquid panel assembly of claim 1, wherein the liquid is a liquid desiccant or water.

* * * * *